United States Patent [19]

Perzley et al.

[11] 4,338,672

[45] Jul. 6, 1982

[54] OFF-LINE TEACH ASSIST APPARATUS AND ON-LINE CONTROL APPARATUS

[75] Inventors: William Perzley, Weston; Yung-Ming Yen-Chen, Brookfield Center, both of Conn.

[73] Assignee: Unimation, Inc., Danbury, Conn.

[21] Appl. No.: 154,439

[22] Filed: May 29, 1980

Related U.S. Application Data

[63] Continuation-in-part of Ser. No. 898,112, Apr. 20, 1978, abandoned.

[51] Int. Cl.³ .............................................. G05B 19/42
[52] U.S. Cl. ................................... 364/513; 364/193; 364/478; 318/568
[58] Field of Search ............... 364/107, 513, 474, 478, 364/120, 110; 318/568; 219/80, 124.1, 124.4; 414/730, 744 R

[56] References Cited

U.S. PATENT DOCUMENTS

| 3,909,600 | 9/1975 | Hohn .................................. 364/513 |
| 3,920,972 | 11/1975 | Corwin, Jr. et al. ............... 364/513 |
| 3,943,343 | 3/1976 | Irie ................................... 364/478 X |
| 4,011,437 | 3/1977 | Hohn .................................. 364/107 |
| 4,086,522 | 4/1978 | Engelberger et al. .......... 364/118 X |
| 4,201,937 | 5/1980 | Irie ...................................... 318/568 |

*Primary Examiner*—Joseph F. Ruggiero

*Attorney, Agent, or Firm*—Mason, Kolehmainen, Rathburn & Wyss

[57] ABSTRACT

Teach assist apparatus is provided for a programmable manipulator arm to precompute a projected fixed path solution during an initial teaching operation. The projected fixed path solution represents a desired series of manipulator arm work operations to be performed with respect to a workpiece in the minimum execution time while the workpiece is moving at a projected velocity. During the teaching operation, the manipulator arm is moved to various teach positions corresponding to the desired series of work operations relative to the workpiece. The teach assist apparatus computes the minimum execution time on the basis of the maximum dynamic capabilities of the manipulator arm being taught. The precomputed path data is stored and control apparatus is provided to reconstruct the precomputed fixed path solution in a playback work cycle in accordance with dynamic movement of the workpiece. The precomputation performed by the teach-assist apparatus is also useful to perform work operations on a stationary workpiece. In a preferred arrangement, the teach-assist apparatus determines the minimum execution time for each controlled manipulator axis for each step; the axis requiring the largest execution time being utilized to determine the minimum execution time.

81 Claims, 27 Drawing Figures

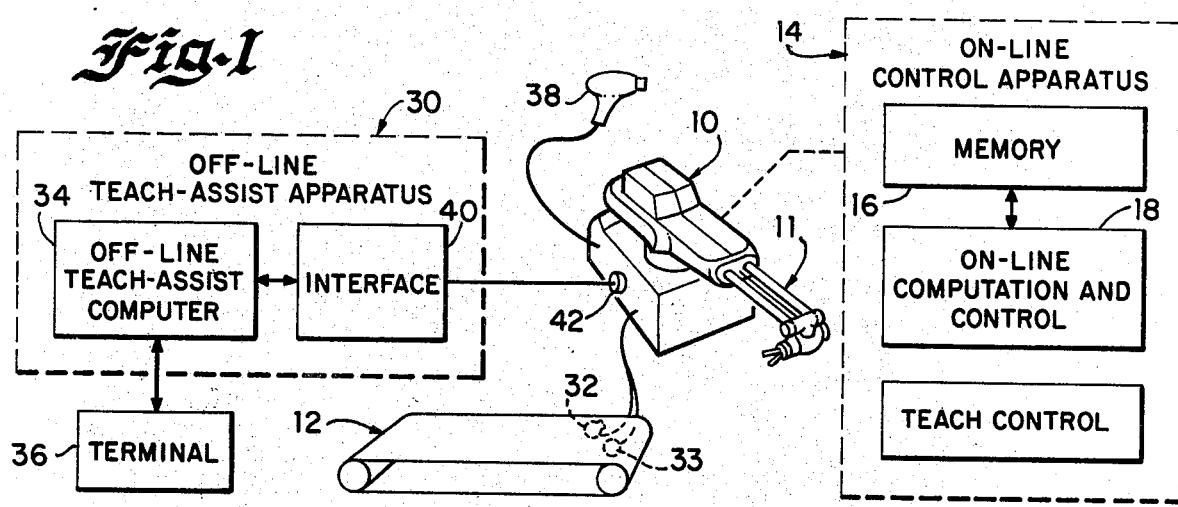
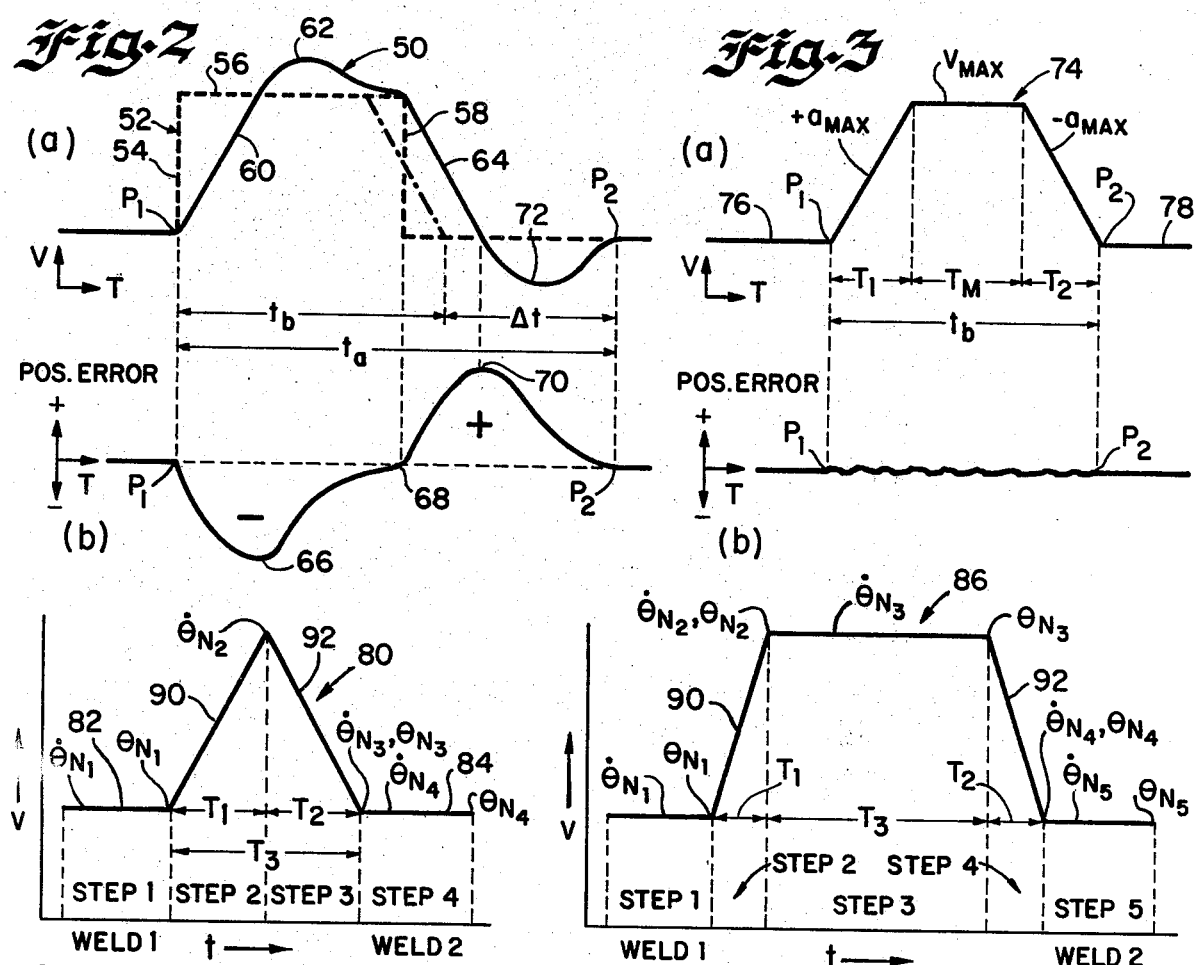
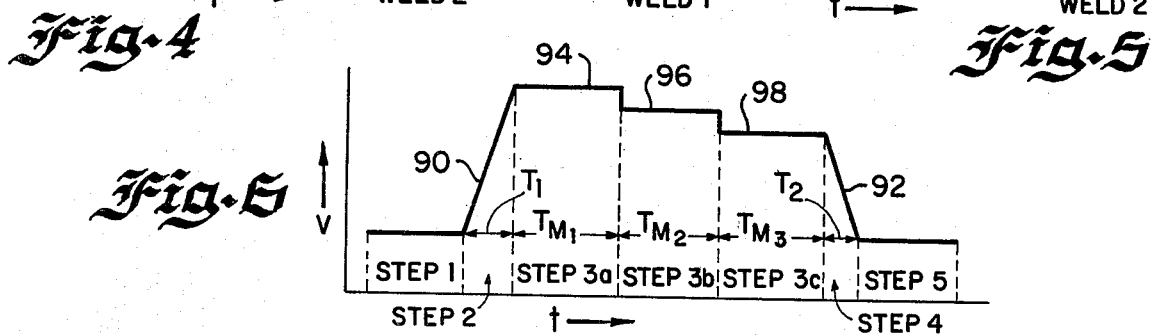

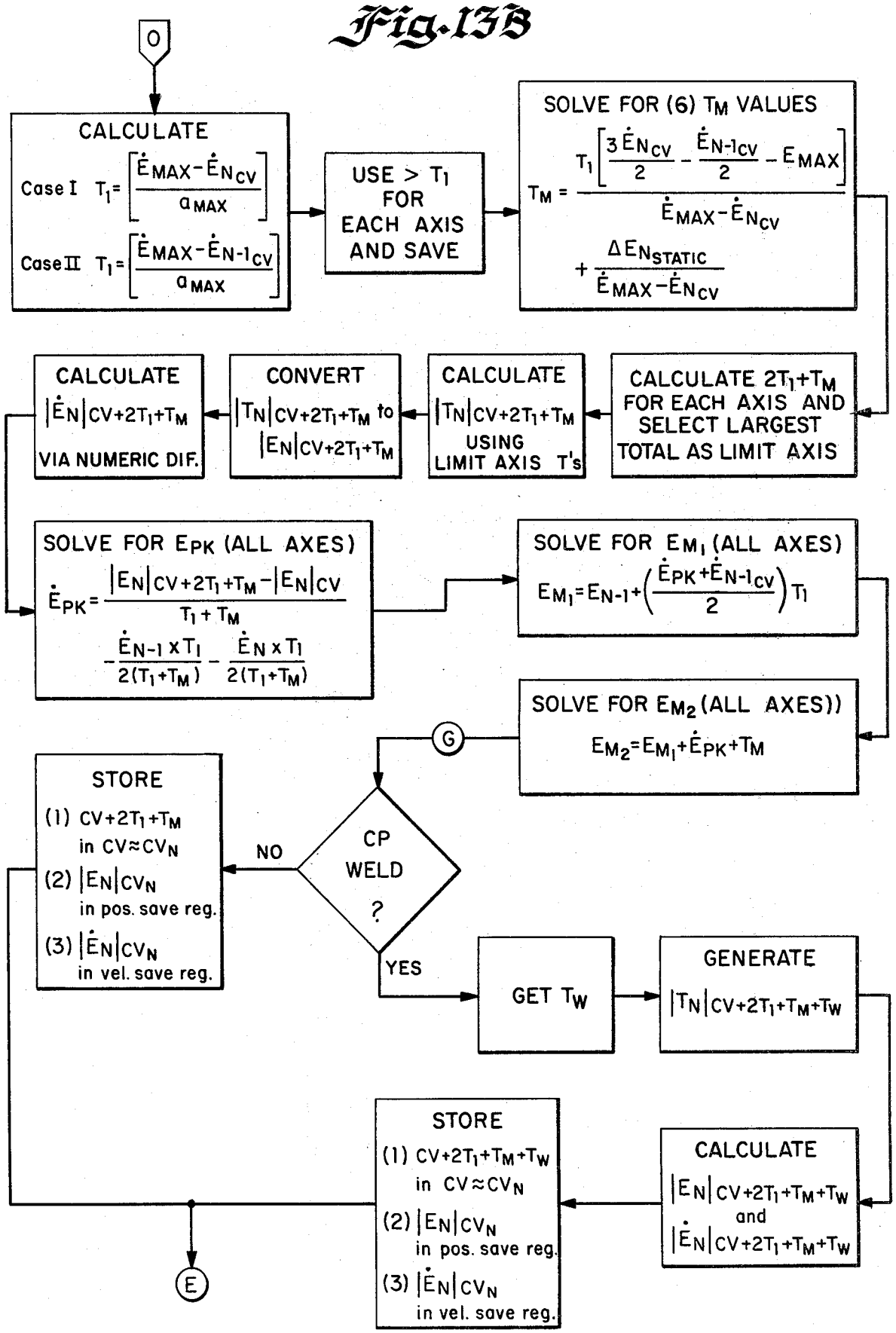

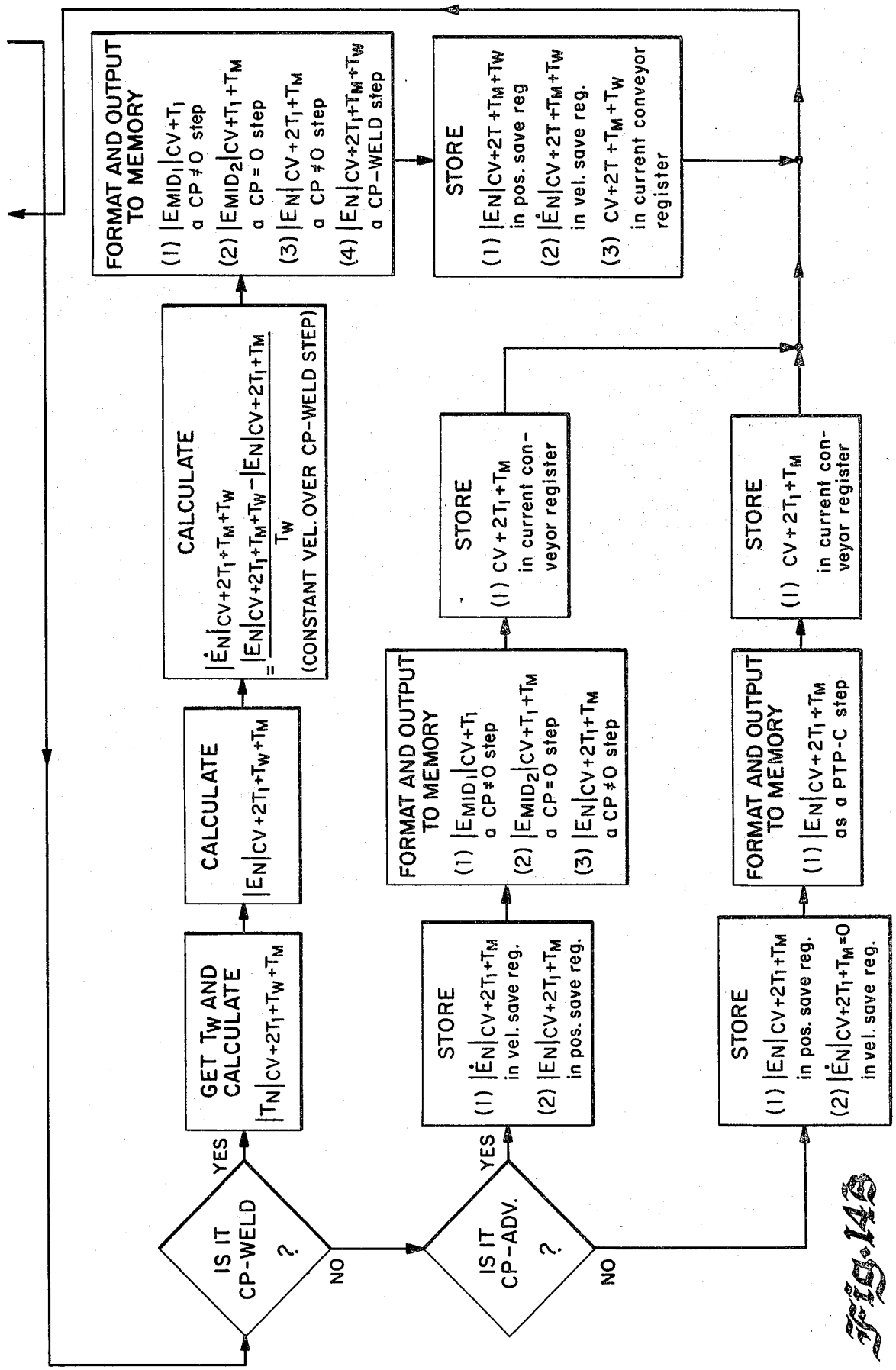

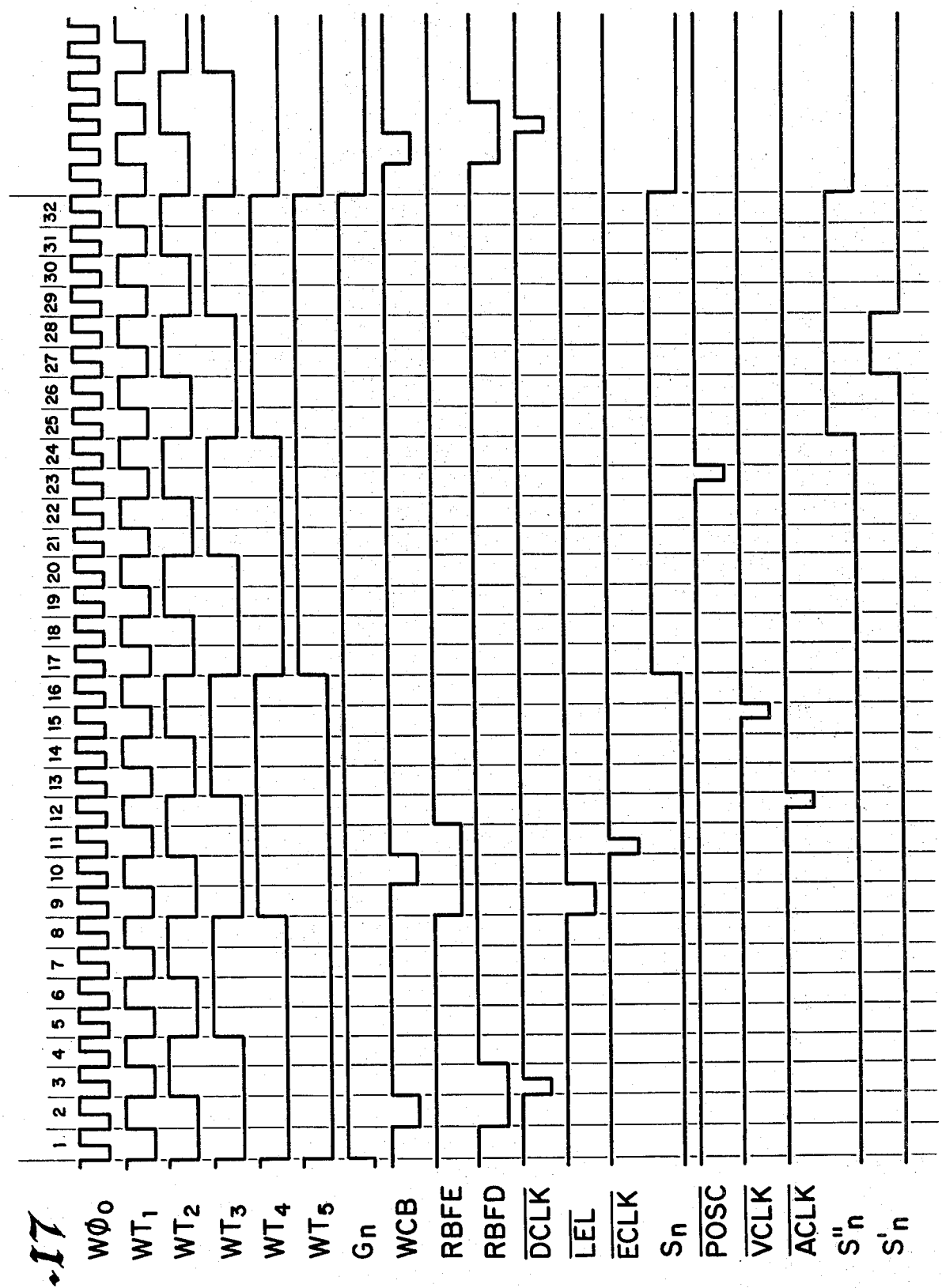

OFF-LINE TEACH ASSIST APPARATUS AND ON-LINE CONTROL APPARATUS

CROSS REFERENCE TO RELATED APPLICATIONS

This application is a continuation in part of co-pending application Ser. No. 898,112 filed on Apr. 20, 1978, now abandoned, and is related to co-pending application Ser. No. 625,932 filed by J. F. Engelberger, et al. on Oct. 28, 1975, now U.S. Pat. No. 4,163,183 and application Ser. No. 721,805 filed by J. F. Engelberger, et al. on Sept. 8, 1976, now U.S. Pat. No. 4,086,522, and these co-pending applications now issued U.S. Pat. Nos. 4,163,183 and 4,086,522 are hereby incorporated by reference for all purposes.

BACKGROUND OF THE INVENTION

A. Field of the Invention

The present invention relates to teach assist apparatus and manipulator control apparatus and more particularly to an arrangement whereby the teach assist apparatus during an initial teaching operation precomputes an optimum path of movement at the dynamic capabilities of the manipulator apparatus to perform a series of program work operations and to account for projected workpiece movement. In one arrangement, data signals representing the precomputed optimum movement of the manipulator arm in terms of conveyor movement and position are recorded into a main control memory of the manipulator apparatus and utilized during a playback work cycle by control apparatus to perform the work operations in minimum execution time and at the dynamic capabilities of the manipulator arm in accordance with dynamic conveyor movement.

B. Description of the Prior Art

Program manipulators of the type shown, for example in Dunne, et al. U.S. Pat. No. 3,661,051 have been employed in the past to perform various types of operations on conveyor carried workpieces. Thus, in co-pending application Ser. Nos. 625,932 and 721,805 now U.S. Pat. Nos. 4,163,183 and 4,086,522 respectively, arrangements are shown wherein the programmable manipulator is taught a series of work operations to be performed on a workpiece during an initial teaching phase with the conveyor stationary or at various teach positions. The static teach data is projected to account for projected conveyor movement at a predetermined conveyor velocity to translate the static taught data. The translated data is then recorded. The recorded data is utilized during a playback of the work cycle in accordance with conveyor movement to control movement of the manipulator to perform the work operations. While this arrangement is generally suitable for its intended purpose, the manipulator arm movement is not projected on the basis of optimum execution time to perform the taught program in minimum execution time at the maximum dynamic capabilities of the manipulator arm.

Another conveyor tracking arrangement is disclosed in U.S. Pat. No. 4,011,437 which issued to R. E. Hohn on Mar. 8, 1977 and which was reissued as Re. 30,016 on May 29, 1979. In this arrangement, the program is taught with a stationary conveyor and all manipulator arm positions are recorded without any calculations for projected conveyor motion during playback. During each playback cycle, various programs are executed by a data processor to correct and modify the movements of the manipulator for the motion and positions of the conveyor. Various techniques are disclosed to compensate for the queing delay of anticipated control signals which are generated by the program and for tracking error based on past performance to anticipate further tracking behavior. For example, tracking apparatus determines the position off-set as unprogrammed position change from the conveyor position at which the arm positions are recorded. The tracking apparatus then off-sets the recorded arm positions accordingly. Second apparatus determines the rate of change of conveyor motion during a fixed time interval, interrupt time, between control signals to determine tracking velocity error. Other apparatus monitors the rate of the unprogrammed change to generate a following error signal. The various following and tracking signals are utilized to modify the recorded data with all conveyor tracking operation being unprogrammed in the teach mode and entirely compensated for on-line during the playback of a work cycle. Thus, the arrangement in Hohn does not project and calculate optimum manipulator arm movement to minimize execution time in accordance with projected conveyor motion in an off-line teach mode.

Another arrangement disclosed in U.S. Pat. No. 3,909,600 which issued to R. E. Hohn on Sept. 30, 1975, discloses apparatus for controlling a manipulator arm to move at a predetermined velocity and acceleration along a predetermined path in space between two predetermined points. In a teach mode, the manipulator arm coordinates for the two points are recorded along with a predetermined path velocity. In a playback cycle, a data processor operating on a fixed sampling time for use with a fixed time interval, servo interrupt control circuit calculates path movement data by determining appropriate incremental positional changes to be moved in the fixed sample times. The initial and final velocities of the movement between the two steps is utilized along with the distance between the two points to determine required acceleration or deceleration movement of the arm. A number of direction numbers and incremental displacement intervals are calculated to define the path during playback in real time operation of the manipulator. The span between any required acceleration and deceleration spans is programmed at a constant predetermined path velocity. While this arrangement is also generally suitable for its intended purpose, it does not precompute optimum manipulator arm movement for minimum execution time to project arm movement in accordance with projected conveyor motion in an off-line teaching mode. The arrangement in Hohn 3,909,600 also requires a relatively complex and high speed computer for the path computations performed during the playback of the work cycle.

U.S. Pat. No. 3,920,972 which issued to M. D. Corwin, Jr., et al. on Nov. 18, 1975 is directed to teach apparatus wherein a cycle of operation is taught by actuation of manual teach controls to move the robot arm to the selected points. At the selected points, operational data including a selected operational velocity are selected and inputted by various sections of the teach program and by input controls on a keyboard (FIG. 6 of patent). The selection and storage of the velocity and the incremental position data are stored in memory for use during playback. The selection of a velocity and the entry thereof in the stored data are discussed at various locations in the patent at columns 10 through 22. Various coordinate transformations are also employed as shown in U.S. Pat. Nos. 4,163,183 and 4,086,522 discussed hereinbefore.

U.S. Pat. No. Re. 30,132 (U.S. Pat. No. 3,943,343 reissued on Oct. 30, 1979) to Irie discloses a linear interpolation system for use in the program control of manipulators, similar to the apparatus and the interpolation performed in the aforementioned U.S. Pat. Nos. 4,163,183 and 4,086,522.

U.S. Pat. No. 4,140,953 which issued to M. J. Dunne on Feb. 20, 1979, U.S. Pat. No. 4,021,651 which issued to K. Mitsuhashi, et al. on May 3, 1977, and U.S. Pat. No. 4,025,838 which issued to T. Watanabe on May 24, 1977 are directed to memory format address modifications and program data modifications.

U.S. application Ser. No. 894,562 filed by A. Irie on Apr. 7, 1978, U.S. Pat. No. 4,201,937 is directed to control apparatus for a programmable manipulator for performing work operations with respect to a movable workpiece while the workpiece is moving or is stationary along a predetermined workpath. Stored data from a teach phase includes two or more series of signals representing the manipulator arm positions to accomplish the predetermined pattern of work operations with respect to the workpiece at two or more respective positions of the workpiece. The control apparatus performs a linear interpolation between the signals from the two series of signals and the present position of the workpiece.

U.S. Pat. No. 4,076,131 which issued to L. Dahlstrom, et al. on Feb. 28, 1978 is directed to an industrial robot including transducers arranged to sense the position of a tool mounted on the arm of the robot relative to the arm. Control means are regulated to position the tool in response to the transducers. The tool is movable with respect to the arm against prestressed spring members when the moving force exceeds a minimum value.

U.S. Pat. No. 4,166,543 which issued to L. Dahlstrom on Sept. 4, 1979 is directed to robot control apparatus with programmed positioning that is modified by a sensor sensing position error, force or the like. A normalized correction is computed relating a sensor output to each robot axis of freedom to employ sensor generated signals to modify programmed positioning where sensor and robot degrees of freedom are different.

SUMMARY OF THE INVENTION

It is therefore a principal object of the present invention to provide a new and improved programmable manipulator arrangement which may be employed with a moving conveyor or a stationary workpiece and wherein one or more of the above described disadvantages of the prior art arrangements are eliminated.

It is another object of the present invention to provide a new and improved programmable manipulator arrangement wherein the manipulator arm is initially programmed in an off-line teaching mode to teach a number of work operations to be performed in a playback or work cycle on a moving workpiece or a stationary workpiece; the off-line teach assist apparatus precomputes an optimum fixed path for manipulator arm movement on the basis of the maximum dynamic capabilities of the manipulator arm to accomplish the work operations in minimum execution time and to account for projected workpiece movement when the manipulator operates with a moving workpiece.

It is a further object of the present invention to provide a new and improved on-line manipulator control apparatus to control movement of a manipulator arm to execute a predetermined series of work operations with respect to a moving workpiece or a stationary workpiece from recorded, precomputed data; the on-line control apparatus during a replay of the work operations reconstructing a fixed path solution of arm movement as precomputed during an initial off-line teaching mode to perform the work operations in replay in minimum execution time and in accordance with dynamic workpiece movement for a moving workpiece situation.

It is another object of the present invention to provide control apparatus for a programmable manipulator wherein the control apparatus computes manipulator arm movement in the controlled manipulator axes to achieve minimum execution time of all manipulator arm movements by determining the minimum execution time for each controlled manipulator axis for each movement of a work operation without exceeding the maximum dynamic parameters of each axis, the axis that requires the largest execution time being denoted the limit or critical axis and the projected path of arm movement in each of the axes being determined on the basis of the limit axis execution time.

Briefly in accordance with one important aspect of the present invention, teach-assist apparatus is provided for a programmable manipulator arm to precompute a projected fixed path solution during an initial teaching operation. The projected fixed path solution represents a desired series of work operations of the manipulator arm to be performed with respect to a workpiece in the minimum execution time while the workpiece is moving at a projected velocity.

The teach-assist apparatus computes the minimum execution time on the basis of the maximum dynamic capabilities of the manipulator arm being taught. The teach-assist apparatus receives input data representing the positions of the arm relative to the workpiece as the arm is moved during the initial teaching operation to different positions of the stationary workpiece. The teach positions of the arm correspond to the desired series of work operations of the manipulator relative to the stationary workpiece.

The teach-assist apparatus then formats the precomputed path data for storage into a control memory of the programmable manipulator. The stored data also includes projected workpiece positions in terms of basic linear displacement units corresponding to positions of the workpiece.

During an on-line playback of the series of work operations, control apparatus is provided to reconstruct the precomputed fixed path solution from the stored data in accordance with dynamic movement of the workpiece. The control apparatus performs arithmetic computations in accordance with a stored program as determined by the data recorded in the main control memory.

The precomputation performed by the teach-assist apparatus to precompute a fixed path solution on the basis of minimum execution time is also useful for work operation on a static workpiece; i.e., precomputing manipulator arm trajectory at the maximum dynamic capabilities of the manipulator arm to perform on-line work operations in minimum execution time on a stationary workpiece.

In a preferred arrangement, the teach-assist apparatus utilizes computation methods that determine the minimum execution time for each controlled manipulator axis that is required for each particular step of the work operation. The axis that requires the largest execution time is denoted the limit or critical axis. This limit axis determines the minimum execution time of each particular step with the projected path of arm movement in each of the axes being precomputed on the basis of the limit axis execution time. In this way, coordinated axis control for movement of the manipulator arm is achieved. Further, the limit axis moves at the maximum dynamic parameters of the limit axis and the movement of the other axes are slaved, scaled or coordinated to move at respective dynamic parameters for coordinated arm movement in time. Thus, all movements of the manipulator arm are performed at the maximum dynamic parameters of the manipulator arm; i.e., each movement of the manipulator arm is performed in minimum execution time and without exceeding the maximum dynamic parameter of any axis of the manipulator arm. Other less accurate methods of computing arm movement either exceed the maximum dynamic parameters of one or more axes in various movements or include a safety factor method to constrain the arm from moving at the maximum dynamic parameters and thus do not execute a desired work operation in minimum execution time.

BRIEF DESCRIPTION OF THE DRAWINGS

The invention both as to its organization and method of operation together with further objects and advantages thereof will best be understood by reference to the following specification taken in connection with the accompanying drawings in which:

FIG. 1 is a diagrammatic perspective view and block diagram representation of the off-line teach-assist apparatus and the on-line control apparatus for teaching and controlling movement of a manipulator apparatus in working location alongside a conveyor;

FIG. 2 is a diagrammatic representation of the dynamic response of a manipulator to a control signal;

FIG. 3 is a diagrammatic representation of the dynamic response of a manipulator and the corresponding control signal as calculated in an off-line teaching mode and generated during an on-line, real time playback operation in accordance with the apparatus of the present invention of FIG. 1;

FIGS. 4, 5 and 6 are diagrammatic representations of various dynamic profiles illustrating velocity versus time relationships in accordance with the apparatus of the present invention of FIG. 1;

FIGS. 13A and 13B when assembled to form FIG. 13 and FIGS. 14A and 14B when assembled to form FIG. 14 are flow diagram representations of one calculation or predict method utilized by the teach-assist apparatus of the present invention of FIG. 1 in connection with FIG. 7;

FIG. 16 is a logic and block diagram representation of portions of the control circuitry of FIG. 15; and FIG. 17 is a diagrammatic representation of various timing signals and waveforms occurring in the circuitry and control apparatus of FIGS. 15 and 16.

DESCRIPTION OF THE PREFERRED EMBODIMENT

Figure 7:
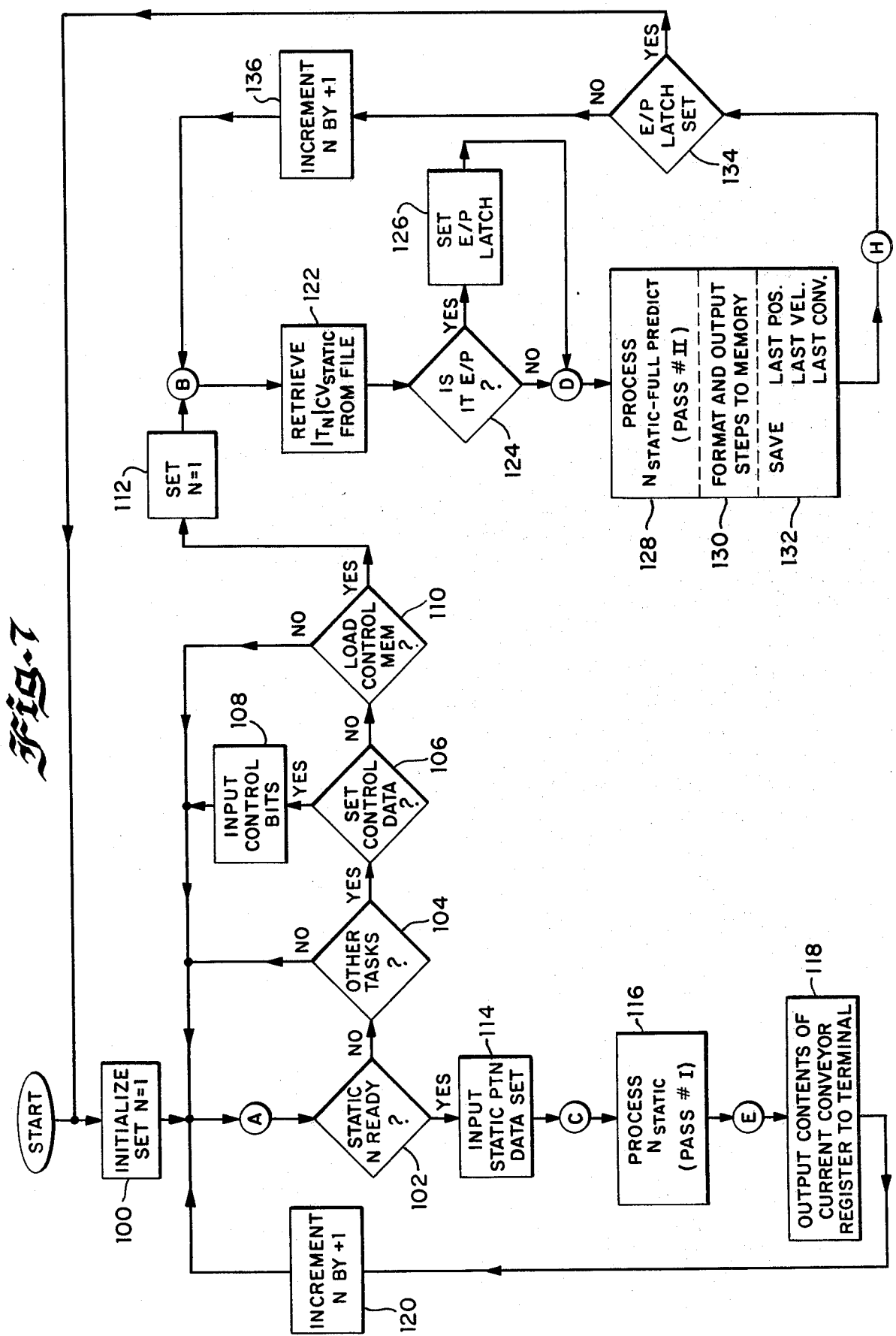
FIG. 7 is a flow diagram representation of the general operation of the off-line teach-assist apparatus of FIG. 1.

In accordance with the present invention and referring to FIG. 1, a programmable manipulator generally referred to at 10 is illustrated in a working relationship alongside a conveyor generally referred to at 12. The manipulator apparatus 10 includes a manipulator arm 11 that is controllable in a plurality of axes to perform a predetermined series of work operations referred to as a work cycle on a workpiece carried by the conveyor 12. The work cycle, for example is a series of spot and/or seam welds performed on a car body carried by the conveyor 12.

The manipulator arm 11 is moved in synchronism with movement of the conveyor 12 by on-line control apparatus connected to the manipulator 10 and generally referred to at 14. Program data representing the predetermined work cycle in minimum execution time as a precomputed fixed path in space is stored in a control memory 16 of the on-line control apparatus 14. During the replay or playback of a work cycle, the stored program data is read out of the control memory 16 to an on-line computation and control unit 18 of the overall control apparatus 14. The on-line computation and control unit 18 reconstructs the precomputed fixed path in space from the data read out of the memory 16 and controls movement of the manipulator arm 11 by generating position, velocity and acceleration controls.

The program data stored in the memory 16 and representing the predetermined work cycle is calculated during an off-line teaching mode by off-line teach apparatus referred to generally at 30. The term off-line is utilized only to denote teaching operation as opposed to playback work cycle operation. The off-line teaching may be performed at the conveyor location or at a separate simulated conveyor. During the off-line teaching mode, the manipulator arm 11 is moved over the series of work operations to be taught with respect to the workpiece. Conveyor position data is generated by a conveyor encoder 32 and manipulator arm position data is generated by manipulator encoder apparatus.

The conveyor encoder data and the manipulator encoder data is utilized by an off-line teach assist computer 34 of the off-line teach apparatus 30 in accordance with a stored program to generate data that represents a fixed path in space to achieve execution of the predetermined work cycle with optimal dynamic movement of the manipulator arm 11 with respect to movement of the conveyor 12. The dynamic movement of the manipulator arm 11 is characterized by the maximum dynamic capabilities and response of the manipulator arm. The off-line teach-assist computer 34 calculates projected data that represents real time manipulator arm positions and corresponding conveyor positions accounting for projected conveyor motion. Thus, the data inputted during the off-line teaching mode under static conditions is optimally projected into real time on-line operation to define an optimum fixed path solution to be executed by the manipulator arm in accordance with dynamic conveyor motion and in optimal execution time. The projected data calculated by the off-line teach assist computer 34 is then stored in the memory 16 for use by the on-line computation and control unit 18 during an on-line playback of the work cycle. The on-line computation and control unit 18 reconstructs the fixed path solution from the data read out of the memory 16 to control movement of the manipulator arm 11 to describe the work cycle in accordance with movement of the conveyor 12.

In accordance with other aspects of the present invention, the manipulator apparatus 10 is arranged to perform a predetermined series of work operations referred to as a work cycle on a stationary workpiece. Further, the teaching mode for stationary workpiece operation in the preferred arrangement of the present invention includes the storage of data representing the precomputed fixed path in space to perform the work operations on the stationary workpiece in minimum execution time as defined by the taught manipulator arm position.

Thus, in the preferred arrangement, the off-line teaching mode for stationary workpiece operation is similar in general respects to the teaching mode for the moving workpiece. However, the precomputations during the off-line teaching mode are performed on the basis of the taught points and no computations are involved to account for projected workpiece movement since the workpiece is stationary.

In an alternate arrangement for stationary or moving workpiece operation, the off-line teaching mode involves only the input of data representing the taught manipulator arm position and the data is stored for on-line manipulator arm path computation during the execution of the work cycle on the stationary or moving workpiece. However, even in this alternate arrangement, it has been found useful for the teach-assist computer 34 to precompute the manipulator arm path at least to the extent of verification of appropriate path control and obstacle avoidance so as to ensure adequate teaching of the work cycle for optimum performance.

Concerning work cycles for both moving workpiece and stationary workpiece and in accordance with important aspects of the present invention, the manipulator arm path computations in a preferred computation method are performed to achieve minimum execution time of all manipulator arm movements by determining the minimum execution time for each controlled manipulator axis for each movement of a work operation without exceeding the maximum dynamics parameters of each axis. The axis that requires the largest execution time is denoted the limit axis and the projected path of arm movement in each of the axes is determined on the basis of the limit axis execution time.

A data terminal 36 is provided for the control of the off-line teach-assist computer unit 34 and also to control the input of the conveyor positional data and the manipulator arm positional data to the off-line teach-assist computer 34. A teach gun control 38 is interconnected with the manipulator 10 and the off-line teach apparatus 30. The teach gun control unit 38 is utilized to control movement of the manipulator arm 11 with respect to the workpiece during the teaching mode. The manipulator apparatus 10 for example is of the general type described in U.S. Pat. No. 3,661,051 and co-pending application Ser. Nos. 721,805 and 625,932, now U.S. Pat. Nos. 4,086,522 and 4,163,183, to which reference may be made for a more detailed discussion of the teach control apparatus, manipulator apparatus and the general form of the on-line control apparatus.

The off-line teach-assist computer 34 is connected to the conveyor encoder 32, the manipulator 10, and the associated control apparatus 14 by an interface stage 40 for control of the input and output of data. For moving workpiece applications, a conveyor tachometer 33 inputs line speed data to the on-line control apparatus 14. The interface stage 40 is connected to the manipulator apparatus 10 via a detachable connector 42. Thus, during the off-line teaching mode, the off-line teach apparatus 30 is connected to the manipulator apparatus 10. Upon conclusion of the teaching mode, the off-line teach apparatus 30 is disconnected for use at another location for teaching another manipulator apparatus 10. The off-line teach-assist apparatus 30 may be utilized to teach the same or various other work cycles. When not in use, the off-line teach-assist apparatus 30 may be removed from the conveyor work station and placed at a storage location.

In the preferred arrangement and during playback of the work cycle to be performed on either a stationary workpiece or a workpiece carried by the conveyor 12, the manipulator arm 11 is controlled by the on-line control apparatus 14 to perform the predetermined work cycle in real time in accordance with the precomputed data stored in the memory 16. The precomputed data is generated by off-line teach-assist computer unit 34 during the off-line teaching mode. During an on-line playback of the work cycle, the on-line computation and control unit 18 reconstructs and computes real time position, velocity and acceleration command signals from the stored program data to control movement of the manipulator arm 11 to perform the predetermined work cycle with respect to a stationary workpiece or a moving workpiece on the conveyor 12 in accordance with the actual dynamic conveyor movement.

Thus, during the off-line teaching mode, the relatively powerful off-line teach-assist computer unit 34 in the preferred arrangement performs precomputations and calculations without time restrictions. In playback, the on-line computation and control unit 18 performs arithmetic computations by processing the stored data at a high data rate speed in comparison to powerful general purpose computers. The on-line computation and control unit 18 is capable of reconstructing the precomputed fixed solution from the stored data to optimally control movement of the manipulator arm 11 in real time. Thus in the preferred arrangement, the on-line computation and control unit 18 is not required to perform the complicated time consuming computations in real time to calculate the dynamic path of the manipulator arm 11 with respect to the moving conveyor 12.

In accordance with important aspects of the preferred arrangement of the present invention, the relatively complex computations requiring the major portion of the compute time to define the optimum real time dynamic path of the manipulator arm trajectory are performed during a teaching mode by the off-line teach apparatus 30. The on-line real compute time for reconstructing the precomputed optimal fixed path solution of manipulator arm movement with respect to the workpiece and in synchronism with the conveyor line 12 for moving workpieces is minimized to allow execution of a work cycle limited only by the dynamic capabilities of the manipulator apparatus and not by the real time compute burden. If it were attempted to perform all the necessary calculations to define optimum dynamic manipulator arm movement during real time in the on-line mode, the real time compute burden would necessitate either approximate solutions and dynamic following routines that are not optimal solutions or an expensive, complicated, extremely high speed computer.

Considering FIG. 2a, the plot 50 illustrates the approximate velocity versus time response characteristic when a manipulator arm is commanded to move from one point $P_1$ to another point $P_2$ in response to a command signal 52. The command signal 52 is approximately a square wave (a step function of velocity) with a sharp leading edge 54 that commands infinite acceleration, a maximum velocity command portion 56 and a sharp trailing edge 58 commanding infinite deceleration when the manipulator controls indicate that the commanded point $P_2$ has been reached. In response, the manipulator accelerates from the point $P_1$ at the maximum acceleration rate of the manipulator up the sloped portion 60 of the plot 50, overshoots the maximum desirable velocity 56 at point 62, and decelerates at the maximum deceleration rate of the manipulator down the sloped portion 64 after the command signal 52 indicates that the desired position $P_2$ has been reached.

Thus, the manipulator arm initially lags the commanded signal (slope 60), then overshoots (portion 62), and then lags the command signal (slope 64). In terms of positional error and referring now to FIG. 2b, the initial lag in response at 60 of FIG. 2a results in the lagging positional error portion 66 of FIG. 2b. Then, as the manipulator overshoots in velocity at 62 of FIG. 2a, the positional following error is reduced toward zero at 68 of FIG. 2b. However, the manipulator is now commanded to decelerate instantaneously at an infinite deceleration rate as the point $P_2$ is reached and passed. Thus, the manipulator overshoots creating the positional error denoted at 70. The positive positional error under 70 indicates that the manipulator has overshot or moved beyond the commanded point $P_2$. Accordingly, the manipulator attempts to correct the positional overshoot. The correction of the positional overshoot portion under 70 corresponds to the velocity response portion 72 indicating a negative velocity with respect to the initial forward velocity.

In terms of execution time to move from $P_1$ to $P_2$, the total time referred to at $t_a$ is required to finally settle at the commanded point $P_2$ as measured from the start of the command at $P_1$. The additional execution time $\Delta t$ is the control lag time required for the correction of the overshoot response with respect to the optimum execution time $t_b$.

In accordance with important aspects of the preferred embodiment of the present invention and referring now to FIG. 3a, the optimum execution time $t_b$ is achieved by controlling movement of the manipulator by a command signal 74 precomputed in the off-line teaching mode by the teach-assist apparatus 30 and reconstructed in a real time, on-line playback mode by the on-line control apparatus 14. The control signal 74 is calculated on the basis of the maximum dynamic capabilities of the manipulator and on the basis of the desired positional move; the distance between the points $P_1$ and $P_2$.

The representations in FIGS. 2 and 3 are representative of manipulator arm movement of a single axis of the manipulator or the behavior in a single Cartesian coordinate axis of the manipulator arm.

Thus in accordance with one particular predict method, the off-line teach-assist computer 34 precomputes the real time command signal 74 between the two taught points $P_1$ and $P_2$ between which the manipulator is to be moved. The maximum dynamic capabilities of the particular manipulator arm 11 being controlled are identified as $+a_{MAX}$ corresponding to the maximum acceleration rate of the manipulator arm 11, $-a_{MAX}$ corresponding to maximum arm deceleration, and $V_{MAX}$ corresponding to maximum arm velocity. The off-line teach-assist computer 34 then precomputes the optimum command signal 74 to move from point $P_1$ to point $P_2$ corresponding to a fixed path solution executed in the minimum, optimal time. The command signal 74 commands the manipulator arm 11 during a first predetermined time interval $T_1$ to accelerate at the maximum acceleration $+a_{MAX}$ to the maximum velocity $V_{MAX}$ at the end of the time interval $T_1$. The command signal 74 then commands the manipulator arm to move at the maximum velocity $V_{MAX}$ for a second predetermined time interval $T_M$. At the end of the time interval $T_M$, the command signal 74 then commands the manipulator arm to decelerate during a third predetermined time interval $T_2$ at the maximum deceleration rate $-a_{MAX}$. Thus, the command signal 74 is precomputed during the off-line teaching mode to project a real time, fixed path solution for movement between the points $P_1$ and $P_2$ in minimum execution time; the manipulator arm being commanded to move at maximum dynamic characteristic throughout the entire time interval $t_b$.

Accordingly, the manipulator arm 11 in response to the command signal 74 is commanded to move within its dynamic capabilities to describe a path form $P_1$ to $P_2$ without the overshoot and settling time $\Delta t$ of FIG. 2a. Thus, the execution time $t_b$ to move from $P_1$ to $P_2$ in response to the command signal 74 is less than the execution time $t_a$ in response to the command signal 52 by a substantial factor $\Delta t$. The response characteristic of the manipulator arm 11 is approximately the same as the command signal 74. The small positional error of the manipulator arm in following the command signal 74 is depicted in FIG. 3b. Thus, the small positional error and optimal, minimum execution time to move from $P_1$ to $P_2$ is achieved by precomputing the command signal 74. The area under the velocity versus time command signal 74 defines the positional change described by the manipulator arm (in one manipulator axis or in one Cartesian coordinate axis) between the points $P_1$ and $P_2$. The times $T_1$, $T_M$ and $T_2$ are calculated by the off-line teach-assist computer 34.

In accordance with further important aspects of the present invention concerning a moving workpiece, the off-line teach-assist computer 34 also precomputes the minimum execution time to move between the two points $P_1$ and $P_2$ on the workpiece carried by the conveyor 12 accounting for projected conveyor motion. Thus, the off-line teach-assist computer 34 accounts for and precomputes on the basis of a move from the point $P_1$ to the point $P_2$ while the point $P_2$ is moving at the projected conveyor velocity. This is accomplished by projecting the conveyor position to a point in space and in time corresponding to the precomputed manipulator arm positions to traverse from $P_1$ to $P_2$. Further, the off-line teach-assist computer 34 in response to input commands from the data terminal 36 precomputes the manipulator arm movement with respect to projected conveyor motions to perform welds at the points $P_1$ and $P_2$.

Thus, the off-line teach-assist computer 34 precomputes the weld tracking command signal portions 76 and 78 of the command signal 74 to perform welds at the points $P_1$ and $P_2$ respectively.

During the on-line playback of the work cycle with respect to the workpiece on the moving conveyor, the on-line computation and control unit 18 in the preferred embodiment reconstructs the fixed path solution from the data stored in the memory 16 that is precomputed by the off-line teach-assist computer 34. The on-line computation and control unit 18 generates position, velocity and acceleration command signals in accordance with conveyor movement. Referring now to FIGS. 4, 5 and 6, the off-line teach-assist computer 34 in a preferred embodiment is programmed to calculate and precompute fixed path solutions of optimum manipulator arm trajectory with minimum execution times. The optimal fixed path solutions define the minimum execution time in terms of conveyor following behavior for a moving workpiece to execute a predetermined work cycle. The optimization of the execution time is limited only by the dynamic characteristics of the manipulator arm and the specific precomputation method that is utilized. The calculation of velocity, acceleration and position along with dynamic tracking data is all computed from static teach data and is performed in an off-line teaching mode without compute time restrictions. In this way, the precomputation programs performed by the off-line teach-assist computer 34 may be easily modified in accordance with the desired optimum accuracy to be achieved without affecting the complexity of the on-line computation control unit 18. Various precomputation and predict analyses may then be achieved by modifying the programming of the off-line teach-assist computer 34 while utilizing the same on-line computation and control unit 18. The computations concerning a stationary workpiece are similar to that of the moving workpiece situation as will be explained in more detail hereinafter.

For example, in FIG. 4 the dynamic characteristic plot 80 of velocity versus time describes the movement of the manipulator arm 11 in one axis as the arm moves between two points $P_{W1}$ and $P_{W2}$ on the moving workpiece. The velocity versus time characteristic 80 represents the optimum fixed path manipulator axis movement as precomputed in the off-line teaching mode in accordance with a particular stored program and with respect to projected conveyor movement.

The velocity characteristic 80, also referred to as a velocity profile, is computed according to the stored program in the off-line teach-assist computer 34 as a short move analysis when the distance between the two points $P_{W1}$ and $P_{W2}$ is within a predetermined short move distance. The coordinates of the initial point $P_{W1}$ identified at $\theta_{N1}$ represent any general point in a work cycle at which a weld has been completed on the workpiece. The nearly horizontal portion 82 of the velocity profile 80 represents the weld performed at the point $P_{W1}$ during the time portion referred to at weld 1.

Throughout a predetermined weld time interval, the manipulator arm welding tip accurately tracks the movement of the conveyor to weld at the point $P_{W1}$. The weld 1, step 1 illustrates the weld tip tracking the workpiece at the tracking velocity $\dot{\theta}N_1$ along the nearly horizontal velocity profile portion 82. At the end of the weld 1, step 1, the manipulator arm in accordance with the predetermined work cycle is to traverse to a new static point $P_{W2}$ on the workpiece to perform the next designated weld, weld 2, identified by the profile portion 84.

During the off-line teaching mode, the manipulator 11 is moved in accordance with the teach gun control 38 to the static point $P_{W1}$ on the workpiece. Next a weld 1 step is programmed by inputting a weld command from the teach controls 38 or the data terminal 36 into the off-line teach-assist computer 34. The off-line teach assist computer 34 calculates the weld 1, step 1 data to track the moving point $P_{W1}$ of the workpiece on the conveyor 12 and generates the data to define the tracking portion 82 at nearly constant velocity $\dot{\theta}N_1$ to complete the weld at the point $P_{W1}$ at the calculated manipulator arm coordinates $\dot{\theta}N_1$. The weld 1, step 1, is computed by tracking the conveyor 12 for a predetermined number of conveyor encoder linear displacement units referred to as LSD's as discussed in more detail in the aforementioned application Ser. No. 721,805 now U.S. Pat. No. 4,086,522. The weld 1, step 1 calculations are precomputed at a projected maximum conveyor velocity $V_c$ to provide a minimum welding time at the maximum allowed conveyor velocity $V_c$ to ensure a satisfactory weld.

Next, the teach controls 38 are utilized to move the welding tip on the manipulator arm 11 to the workpiece point $P_{W2}$, the next weld point to be performed in the predetermined work cycle. The off-line teach-assist computer 34 then computes the fixed path, optimal solution in the off-line teaching mode to perform the traverse from point $P_{W1}$ to point $P_{W2}$ accounting for projected conveyor motion and in terms of a number of conveyor displacement units, LSD's.

In accordance with the calculations to be discussed in detail hereinafter and considering a moving workpiece operation, the off-line teach-assist computer 34 computes the minimum execution time $T_S$ to move the manipulator weld tip between the static points $P_{W1}$ and $P_{W2}$ as projected into real time and accounting for projected conveyor movement. For the short move analysis illustrated in FIG. 4, the off-line teach-assist computer 34 computes the move between the projected points $P_{W1}$ and $P_{W2}$ by defining an acceleration step 2 for a predetermined time interval $T_1$ to the coordinates $\theta N_2$, followed by a deceleration step 3 for a predetermined time interval $T_2$ to the coordinates $\theta N_3$. The point $\theta N_3$ represents the projected coordinates in real time of the point $P_{W2}$. The off-line teach-assist computer then computes a weld 2, step 4, to weld and track the point $P_{W2}$ on the moving conveyor 12. The computed weld 2, step 4, continues from $\theta N_3$ to the manipulator arm coordinates $\theta N_4$ corresponding to the projected point $P_{W2}$ moving in real time during the time of the weld 2, step 4. The acceleration step 2 is referred to at the velocity profile portion 90 and the deceleration step 3 is referred to at the velocity profile portion 92. The sum of the times $T_1$ and $T_2$ equals the minimum execution time $T_s$ of the traverse between the projected points $P_{W1}$ and $P_{W2}$ moving at the conveyor velocity $V_c$.

Figure 8:
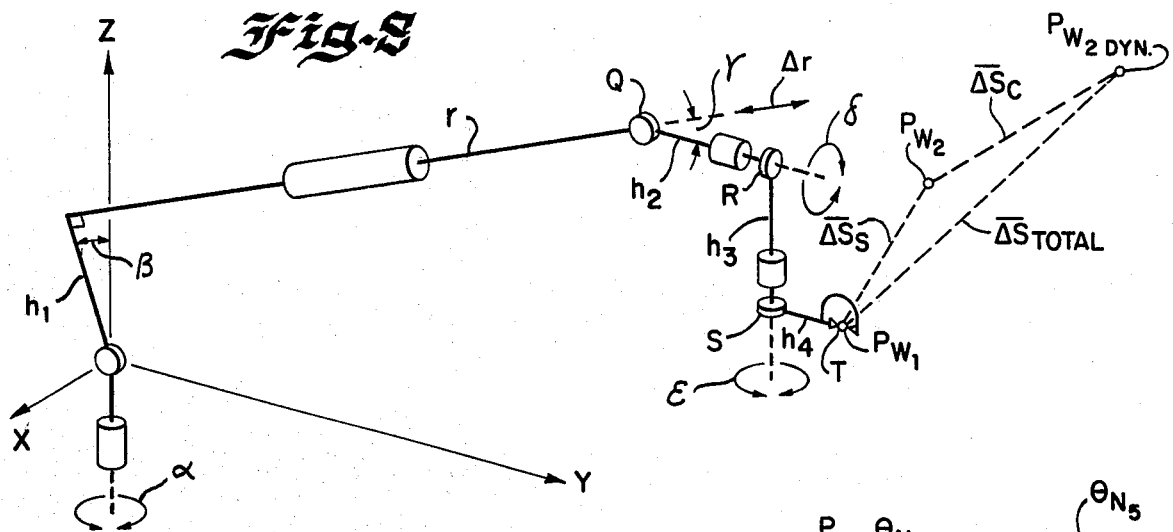
FIG. 8 is a diagrammatic perspective representation of the manipulator apparatus of FIG. 1 and illustrating calculations performed during the off-line teaching mode by the present invention.

Referring now to FIG. 8, the projected move between the points $P_{W1}$ and $P_{W2}$ is diagrammatically illustrated in an XYZ coordinate system in conjunction with one type of manipulator arm having six controlled degrees of freedom or control axes. The manipulator arm is represented by the vector segments $h_1$, r, $h_2$, $h_3$ and $h_4$ and the control axes are represented by the angles $\alpha$, $\beta\gamma\delta\epsilon$ and the vector r. The angle $\alpha$ represents rotary axis movement of the arm segments $h_1$ and r about the Z axis of the XYZ generalized coordinate system. The angle $\beta$ represents up-down (tilt) axis movement of the arm segments $h_1$ and r away from the Z axis. The vector r represents in-out axis movement of the arm segment r to define the wrist point Q of the manipulator system. The angle $\gamma$ represents wrist bend axis movement of the hand segment $h_2$ with respect to the longitudinal axis of the arm segment r. The end of the segment $h_2$ defines the point R. The angle $\delta$ represents yaw (wrist swivel) axis movement of the hand segment $h_3$ about the segment $h_2$ to define the point S at the end of the segment $h_3$. The angle $\epsilon$ represents hand swivel axis movement of the hand segment $h_4$ about the $h_3$ segment. The hand segment $h_4$ in the case of a welding manipulator is fitted with a welding gun to define the point T at the engagement of the welding tips of the welding gun.

In FIG. 8, the manipulator welding gun tip, point T, is illustrated as positioned to the point $P_{W1}$ on the workpiece carried by the conveyor 12. As discussed hereinbefore, the off-line teaching mode may be conducted at any arbitrary conveyor position or positions. However, for simplicity and for illustrative purposes, it is assumed that the manipulator arm as shown in FIG. 8 corresponds to the precomputed projected point $P_{W1}$ at the projected conveyor location in real time also as computed by the off-line teach-assist computer 34.

However, it should be realized that the manipulator and conveyor during the off-line teaching mode are not necessarily advanced to these projected positions while teaching. Periodically, the manipulator arm and the conveyor are approximately advanced to the projected positions for foreseeability considerations to ensure against collision problems when teaching a work cycle on a three dimensional workpiece. Thus, the positioning of the manipulator arm and advancement of the conveyor to the projected point $P_{W1}$ as illustrated in FIG. 8 may occur in the off-line teach mode only as represented by the data in the off-line teach-assist computer 34 as projected, precomputed coordinate data.

In any case, the point $P_{W1}$ in FIG. 8 defines the static workpiece point $P_{W1}$ at the real time conveyor position $D_{W1}$ in the program work cycle corresponding to the end of completion of the weld 1, step 1. Thus, the vector $\Delta S_s$ between $P_{W1}$ and the next weld point $P_{W2}$ defines a static workpiece distance $\Delta S_s$ representing the distance between the points $P_{W1}$ and $P_{W2}$. For simplicity it is assumed that the conveyor is oriented along the X coordinate axis although it should be understood that any conveyor orientation or shape of conveyor is contemplated by the present invention. The vector segment defined between the points $P_{W2}$ and $P_{W2}$ dyn. represents the projected movement of the workpiece point $P_{W2}$ due to projected conveyor displacement at maximum conveyor velocity $V_c$ during the execution time $T_s$ of the manipulator arm traverse between points $P_{W1}$ and $P_{W2}$; i.e., the point $P_{W2}$ is moving along $\Delta S_c$ at the conveyor velocity while the arm is moving between the points $P_{W1}$ and $P_{W2}$ dynamic. Thus the vector $\Delta S_c$ represents dynamic projected conveyor movement during the execution time $T_s$. The vector segment $\Delta S$ TOTAL defined between the points $P_{W1}$ and $P_{W2}$ dyn. represents the total distance moved by the manipulator arm tip between the points $P_{W1}$ and $P_{W2}$dyn. during the execution time $T_s$ with projected conveyor movement.

After the off-line teach-assist computer 34 computes the minimum execution time $T_s$ for the arm to traverse from point $P_{W1}$ to point $P_{W2}$dyn. in accordance with the optimum predict stored program, the vector $\Delta S$ TOTAL and thus the coordinates of the point $P_{W2}$dyn. are computed. Next, the coordinate data defined by the point $P_{W2}$dyn., corresponding to point $\theta N_3$ in FIG. 4, are converted from the XYZ coordinate system to the manipulator axis coordinates $\theta_1$ through $\theta_6$, for a six axis manipulator machine.

The off-line teach-assist computer 34 then computes a weld 2, step 4, to perform the weld at the point $P_{W2}$ to define the coordinate point $\theta N_4$ at the end of the weld 2 step, again in manipulator axis coordinates $\theta_1-\theta_6$. The minimum execution time $T_s$ along with the data $\theta N_1$ and $\theta N_3$ are utilized along with the maximum allowable acceleration and deceleration of the manipulator arm to precompute and define the acceleration portion 90 over time interval $T_1$ and the deceleration portion 92 over time interval $T_2$. Thus, the sum of the time intervals $T_1+T_2$ equals the minimum execution time $T_s$. The acceleration or deceleration portions 90 and 92 are also utilized to define the coordinates of the point $\theta N_2$ at which the manipulator in the fixed path solution exits the acceleration phase 90 and enters the deceleration phase 92.

It should be noted that the vector $\Delta S_c$ corresponds to the number of conveyor displacement units moved by the conveyor during the execution time $T_s$ in terms of the maximum conveyor velocity, $\Delta S_c = V_c \cdot T_s$. The off-line teach-assist computer 34 then has precomputed the coordinate points for each axis of the manipulator, i.e. $\theta_1$ through $\theta_6$ values, for the projected points $\theta N_1$, $\theta N_2$, $\theta N_3$ and $\theta N_4$. The move to the next weld point in the work cycle, e.g. $P_{W3}$ after the point $P_{W2}$, is then taught and calculated in the same manner as described hereinbefore and as illustrated in FIG. 4. The $P_{W2}$dyn. point corresponds to the point $\theta N_3$ in FIG. 4. After teaching a series of such weld points, $P_{W1}$-$P_{WN}$, the off-line teach-assist computer 34 upon a command from the data terminal 36 transfers the precomputed, projected manipulator coordinates and corresponding projected conveyor positions to the main control memory 16 for use in reconstructing the optimal, precomputed, projected fixed path solution in the on-line work cycle.

Considering now movement between two weld points $P_{W1}$ and $P_{W2}$ on the workpiece that represents a distance in space greater than the predetermined distance for a short move analysis, a dynamic velocity profile 86 as illustrated in FIG. 5 is precomputed by the off-line teach-assist computer 34 in accordance with a long move analysis of the stored programs. The representation in FIG. 5 describes the behavior of the manipulator arm 11 in a single manipulator axis or in a single Cartesian coordinate axis. Thus, for manipulator arm movement between static workpiece points representing a distance greater than the predetermined maximum short move distance, a constant velocity step, step 3, is precomputed at the maximum tip velocity $V_m$ between the acceleration portion 90 and the deceleration portion 92. The overall optimal, execution time of the move $T_s$ is then the sum of $T_1$, $T_m$ and $T_2$. Referring now to FIG. 6, where high positional accuracy is required during a long move traverse between the points $P_{W1}$ and $P_{W2}$, a predetermined number of constant velocity steps are precomputed by the off-line teach-assist computer 34 and inserted between the acceleration portion 90 and the deceleration portion 92. For example, in FIG. 6, three constant velocity steps, steps 3a, 3b and 3d, referred to at 94, 96 and 98 respectively, are computed and inserted between the acceleration portion 90 and the deceleration portion 92. The times of the constant velocity midsteps 94, 96 and 98 are $T_{m1}$, $T_{m2}$ and $T_{m3}$ respectively. The positional accuracy considerations and the computation method to insert the constant velocity midsteps will be discussed in detail hereinafter.

In the on-line playback operation and considering the preferred embodiment, the on-line computation and control unit 18 reconstructs the fixed path solution as represented by the stored data in the memory 16. The details of the on-line computation and control unit 18 are discussed in more detail hereinafter.

Briefly, the on-line control apparatus 14 controls operation of the manipulator 10 in several modes, PTP, PTP(c), CP (ACC=0), CP (ACC≠0) and also various teach modes. Reference may be made to the aforementioned application Ser. Nos. 721,805 and 625,932 for a general discussion of these operational modes. The CP (ACC=0) mode is utilized for continuous path movement of the manipulator arm to accomplish welding such as steps 1 and 5 in FIG. 5, constant manipulator axis velocity movement such as step 3 in FIG. 5 and other continuous path movements where the precomputed accelerations is zero or approximately zero. For a weld step the mode is designated CPW. The CP (ACC≠0) is utilized for constant acceleration steps such as steps 2 and 4 in FIG. 5. The various modes are assigned and coded in the data stored in the memory 16 as precomputed by the off-line teach-assist computer 34.

The on-line playback operation of the on-line computation and control unit 18 to generate the position, velocity and acceleration command signals to reconstruct the velocity command signals illustrated in FIGS. 3 through 6 are described by the following relationships:

MODE
PTP:     POS = $\theta_n$
         VEL = 0
         ACC = 0

CP:
ACC = 0:  POS = $\theta_{n-1} + \frac{m}{N}(\theta_n - \theta_{n-1})$
          VEL = $\frac{\Delta \theta K_v 64}{N}$
          ACC = 0
          $\Delta \theta = \theta_n - \theta_{n-1}$ CP:
ACC ≠ 0:  $\theta$; POS = $\theta_{n-1} + \frac{1}{2}(\dot{\theta}_m + \dot{\theta}_{n-1})\frac{(m)}{(N)}\frac{(1)}{(K_v)}\frac{(N)}{(64)}$ $\dot{\theta}_{NEW}$; VEL = $\frac{2 \Delta \theta K_v 64}{N} - \dot{\theta}_{OLD}$ $\dot{\theta}$; VEL = $\dot{\theta}_{n-1} + \frac{m}{N}(\dot{\theta}_n - \dot{\theta}_{n-1}) = \dot{\theta}_m$ $\ddot{\theta}$; ACC = $\frac{\Delta \dot{\theta} K_v 64}{N}$ $\Delta \dot{\theta} = \dot{\theta}_n - \dot{\theta}_{n-1}$ where    m = interp. count
         N = the number of interpolation intervals in the step
         $\dot{\theta} = \Delta \theta/64$ LSD conveyor change
         $K_v = \frac{\text{number of interpolation intervals/step}}{\text{number of conveyor LSD's/step}}$
         $\theta_n$ = next position (next data $D_n$, the end -continued
of step n)
$\theta_{n-1}$ = previous position (previous data $D_{n-1}$, the end of step n − 1)
$\dot{\theta}_{NEW} = \dot{\theta}_n$ = next velocity (end of step n)
$\dot{\theta}_{OLD} = \dot{\theta}_{n-1}$ = previous velocity (end of step n − 1)
$\dot{\theta}_m$ = present velocity (commanded)
n = present step identification The symbol $\theta_{n-1}$ in on-line operation is always utilized to refer to the previous position at the end of the last step data $D_{n-1}$. The symbol $\theta_n$ is utilized to refer to the precomputed position at the end of the present step data $D_n$ to which the manipulator arm is to be moved during the step n. This convention is utilized within the on-line computation and control unit 18 regardless of whether the step is a CP (ACC=0) or CP (ACC≠0) mode step.

Referring now to FIG. 7, the off-line teach-assist computer 34 in one embodiment for a moving workpiece situation operates according to the general flow diagram illustrated therein to perform the off-line pre-computations, calculations and teach-assist functions as discussed hereinbefore. The overall teach-assist program flow proceeds from the START designation through an INITIALIZE block 100 wherein an internal program step counter of the computer 34 is set to the first point, n equals 1. After the INITIALIZE block 100 the program flow proceeds through the A program branch marker to a decision block 102 to determine whether the STATIC point N data is READY?. If the determination for the entry of new static data input is no, the program proceeds to another decision block 104 to determine whether OTHER TASKS? are to be performed at this time. If the determination is no in the decision block 104, the program flow proceeds back to the A branch marker. If the determination in the block 104 is yes, i.e. other tasks are to be performed, the program flow proceeds to a decision block 106 wherein the determination is made as to whether or not the control data has been entered into the terminal 36, SET CONTROL DATA?. If the control data has been entered the determination in the decision block 106 is yes and the control data is entered as denoted by the process block 108 INPUT CONTROL DATA. After the control data is entered, the program flow returns to the program branch marker A. If the determination in block 106 is no, signifying that control data has not been entered at the terminal 36, a decision block LOAD MAIN CONTROL MEMORY? 110 is entered. If the determination is yes, the program flow proceeds through a process block 112 where the internal program counter is set to N=1 and on to a B program branch marker.

Returning now to the program branch A, if the determination in the STATIC point N READY? decision block 102 is yes signifying that the entry of new static point data is ready according to the data terminal 36, the program flow in branch A proceeds through an INPUT STATIC POINT N DATA SET process block 114 wherein the static data from the manipulator encoders and the conveyor encoder for the point N is entered into the off-line teach-assist computer 34. The program proceeds through the process block 114 after the entry of data to a marker C and into a PASS #1, PROCESS N STATIC block 116, denoting the processing of static data at the point N. In the process block 116, a full precomputation of the optimal execution time for movement to the point N from the previous program point N-1 is determined in accordance with a particular program stored in the computer 34. The details of the PASS #1, PROCESS N STATIC block 116 are shown in FIG. 13 and will be explained in more detail hereinafter.

Thus in the PASS #1 block 116, the execution time and fixed path solution for movement between the two points N-1 and N and a weld to be performed after reaching the new point N are computed, assuming a weld command has been entered on the data terminal 36 for the point N. In the process block 116, the dynamic parameters as discussed in connection with FIGS. 4 through 6 are computed and projected with respect to conveyor movement, i.e., the teach-assist computer 34 calculates the real time, projected coordinates for the point N and the corresponding real time, projected conveyor position. At this point in the program flow, the program proceeds through the PASS #1 process block 116 through a reference marker E to an OUTPUT CONTENTS OF CURRENT CONVEYOR REGISTER block 118 wherein the projected conveyor position for the point N is outputted to the data terminal 36. The projected conveyor position is utilized by the operator to either advance the conveyor or to merely indicate the projected conveyor position for the taught point N to the operator. This projected conveyor position corresponds to completion of this weld at point N in real time. The program flow continues through the process block 118 to a process block 120 wherein the internal program counter is incremented by one from the point N to the next point, N=2 for example. The program flow continues through the process block 120 to the marker A.

Resuming the program flow at marker B, when a command from the data terminal 36 is entered to load the main control memory with the previous taught points, $\Sigma N$, as accumulated in the computer 34, the program flow through branch B proceeds to a RETRIEVE $/T_N/C_V$ STATIC FROM FILE process block 122. In the process block 122, the static data for each point N in Cartesian transform format referred to as $/T_N/C_V$ is recalled by the computer 34. The $/T_N/C_V$ data was calculated and stored in the PASS #1 process block 116. The program flow continues through an END OF PROGRAM? determination block 124 to determine if the end of program has occurred. If the end of program has not been entered at the particular point N identified by the program counter, the program flow continues to the reference marker D. The end of program is entered for a particular point $N=N_{E/P}$ by the data terminal 36 and stored in the computer 34. If the end of program has been detected for the point N being processed, the end of program latch would be set denoted by process block 126. The program flow then proceeds to the reference marker D.

Proceeding from the reference marker D, the teach-assist computer program proceeds to a PASS #2, PROCESS N STATIC process block 128. In process block 128, a full predict or precomputation of the fixed path solution to accomplish the commanded move, N-1 to N, is accomplished as shown in more detail in FIG. 14 and as will be explained in more detail hereinafter. Briefly, the PASS=2 process block 128 performs the precomputation of the optimum execution time and the fixed path solution to project into real time the dynamic behavior of the manipulator arm in each of the control axes and a corresponding conveyor position to accomplish the dynamic profiles as described hereinbefore and illustrated in FIGS. 4 through 8. The particular program stored in the teach-assist computer 34 determines the exact computations performed in the PASS #2 process block 128. Several optimum predict methods or programs will be discussed in detail hereinafter.

After the full data has been calculated to accomplish the move from the previous point N-1 to the next point N, the real time, projected coordinates for the point N in each of the manipulator axes along with the projected conveyor position are formated and outputted to the memory 16 as indicated by the process block 130.

The data outputted to the memory 16 represents the program data utilized by the on-line computation and control unit 18 to reconstruct the optimum, fixed path solution in accordance with dynamic conveyor movement in the real time work cycle. A process block 132 represents the storage of the outputted data for the point N by the teach-assist computer 34 for use in precomputing the move from the point N to the next taught point N+1 during the next program loop through the PASS #2 process block 128.

In a preferred embodiment, additional data is also calculated and outputted to the main control memory 16. The additional data includes a predetermined number of interpolation intervals that are calculated and assigned to each of the acceleration, deceleration, constant velocity and weld steps calculated for the move from the point N-1 to the point N as discussed hereinbefore and as illustrated in FIGS. 4 through 6. The number of assigned interpolation intervals in one specific embodiment is one of a predetermined set of binary multiples of 16. The number of interpolation intervals assigned to a particular step is equal to the next lowest binary multiple of 16 in the set below the number of conveyor LSD's calculated from the step. For example, considering a long move analysis, FIG. 5, each of the steps 2 through 5 for the move from the point N-1 to N (corresponding for example to $P_{W1}$ to $P_{W2}$) is assigned one number in the set of interpolation intervals in accordance with the calculated number of projected conveyor displacement units for each of the steps 2 through 5. Additionally a $K_v$ velocity constant is also calculated for each of the steps and outputted to the memory 16 in a specific embodiment. The $K_v$ constant is equal to the number of assigned interpolation intervals divided by the number of projected conveyor LSD's as discussed in the aforementioned application Ser. No. 721,805.

After the outputting of data into the memory 16, the program flow of FIG. 7 proceeds through a reference marker H to a determination block 134 to determine if the end of program latch has been set. If the determination is yes, the program flow proceeds from the determination block 134 to the START designation of the overall flow program of the teach-assist computer 34. If the determination in block 134 is no, i.e., the end of program latch has not been set, the program flow continues from the determination block 134 through a process block 136. In process block 136, the internal counter is incremented from the point N to the point N+1. The program flow proceeds through the process block 136 to the reference marker B.

Thus, the program flow continues through the program reference markers, B-D-H-B, for all the stored and taught points $\Sigma N$ to retrieve stored data in the computer 34, to compute the data representing the optimum dynamic move parameters for each point N, to compute the manipulator axis coordinates of each of the projected points and the corresponding projected conveyor position, and to output the data to the memory 16.

Thus, when the data terminal 36 inputs a load command to the off-line teach-assist computer 34, all the previously taught, stored points are processed to precompute the fixed path solutions corresponding to the taught points and to load the data into the memory 16. At this point, the main control memory 16 has stored therein the appropriate data to reconstruct the fixed path solution as calculated by the off-line teach-assist computer 34. The data in the memory 16 is then utilized by the on-line computation and control stage 18 in the on-line or playback mode to reconstruct and perform the taught, fixed path solution in optimal execution time to move over the taught points and to perform the taught welds in correspondence to movement and displacement of the conveyor 12.

The details of several precomputation methods utilized by the off-line teach-assist computer 34 for both moving and stationary workpiece situations to calculate the optimum execution times for the work cycle will now be considered.

SIMPLIFIED CARTESIAN PREDICT AND GENERAL PREDICT CONSIDERATIONS

Considering first a simplified Cartesian predict method for a moving workpiece and referring now to FIGS. 8 through 11, an optimum execution time $T_s$ is computed for each of the moves between successive weld points in the work cycle on the basis of the maximum dynamic capabilities of the particular manipulator apparatus that is utilized. As discussed hereinbefore, the maximum dynamic parameters are identified as $+a_{MAX}$, $-a_{MAX}$ and $V_{MAX}$. Considering one specific manipulator apparatus, the maximum composite tip velocity $V_{MAX}$ in the Cartesian domain is 30 inches per second. To perform the predict method calculation, it is also necessary to know the permissible range of the conveyor line velocity for moving working operations. The maximum conveyor line velocity $V_c$ is utilized to insure that the optimum time execution will not command the manipulator arm to exceed the maximum composite tip velocity and also to calculate the projected conveyor displacement during the execution time. The smaller the overall variation (range) in permissible conveyor velocity, the higher the optimization of the precomputed move in terms of execution time by the manipulator and the efficiency of the overall work cycle; i.e., the maximum number of welds and work operations that can be performed in the overall work cycle for a given conveyor displacement and manipulator work station. In any case, if the maximum conveyor velocity $V_c$ is 6 inches per second, for example, along a predetermined orientation, $V_c=6$ inches per second is utilized in the precomputation method. The nominal conveyor line for example is 5 inches per second.

In the simplified Cartesian predict method under discussion, the maximum conveyor velocity $V_c$ of 6 inches per second is subtracted from the maximum composite tip velocity $V_{MAX}$ of 30 inches per second to result in a relative maximum composite tip velocity $V_{MR}$ of 24 inches per second. This approach assumes the worse case wherein the direction of conveyor movement is aligned with the direction of movement of the manipulator tip, i.e., the vectors $V_c$ and $V_{MAX}$ are aligned and subtracted.

The first step in the simplified Cartesian predict method determines whether a short move analysis or a long move analysis is required. The determination as discussed hereinbefore is made on the basis of the static distance on the workpiece between the two successive points $PW_1$ and $PW_2$, $\Delta S_s$ in FIG. 8. The $PW_1$ point corresponds to the previous welded point at the projected, real time conveyor position and the point $PW_2$ corresponds to the next weld to be performed at the projected real time conveyor position at the time the $P_{W1}$ weld is finished. The vector $\Delta S_s$ corresponds to the static distance between the points $P_{W1}$ and $P_{W2}$ and is calculated by the teach-assist computer 34 from the manipulator encoder data as the teach operator teaches the two points $P_{W1}$ and $P_{W2}$ by moving the manipulator tip between the two points by use of the teach controls 38. The manipulator encoder data is inputted under control of the data terminal 36 and the teach control 38 to the teach-assist computer 34. It should be realized that the distance $\Delta S_s$ is the same regardless of the conveyor position in the teaching mode.

In accordance with the parameters defined above, if the $\Delta S_s$ static distance between the two workpiece points $P_{W1}$ and $P_{W2}$ is greater than five inches, the teach-assist computer 34 defines and calculates a long move analysis. If the $\Delta S_s$ static distance is less the five inches, a short move analysis is utilized.

The maximum short move distance is calculated from the relationship $\Delta S_s$ maximum equals $V_{MR}$ multiplied by one-half the total time to execute the acceleration and deceleration steps:

$$\Delta S_{s\,MAX.} = 24\frac{(T_1 + T_2)}{2} \tag{1}$$

where $T_1$ equals the time to accelerate to maximum tip velocity from tracking velocity and $T_2$ is the time required to decelerate from maximum tip velocity to tracking velocity. In accordance with the maximum acceleration/deceleration parameters for a particular manipulator, the times $T_1$ and $T_2$ of each of the acceleration and deceleration steps are defined in effective time units corresponding to the number of conveyor encoder basic linear displacement units or LSD's of motion required to effect the desired arm motion with the conveyor moving at a maximum conveyor speed of 6 inches per second. The units for a $\dot{\theta}$ or velocity command are bits change/64 conveyor LSD's change and the units for $\ddot{\theta}$ or acceleration command are bits change/(64 conveyor LSD's change)$^2$. In one embodiment, the basic linear displacement unit, LSD, is 0.019563102 inches. If an $a_{MAX}$ of 115.01248 inches/sec.$^2$ is assigned equal to:

$$\frac{24\text{ inches/sec.}}{.01956312''/\text{LSD} \times \frac{1}{6''/\text{sec.}} \times 64\text{ conv. LSD's}}$$

then $T_1=T_2=0.208672$ secs. Thus, $T_1$ is approximately equal to 64 LSD's of change to accelerate from 6"/sec. to 30"/sec. If the maximum tip velocity $V_{MAX}$ of 30 inches per second equals 3000 bits per second (BPS) in terms of the encoder output readings, the particular manipulator apparatus is then capable of accelerating between a tracking velocity to the maximum relative velocity of 24 inches per second at a constant acceleration during the time the conveyor moves 64 conveyor LSD units at a maximum conveyor velocity of 6 inches per second. The maximum acceleration $+a_{MAX}$ and deceleration $-a_{MAX}$ then corresponds to a velocity change ΔV of 2400 BPS in a time interval Δt of 0.208672 seconds or the time for the conveyor to move 64 LSD's at maximum conveyor velocity. This corresponds to an acceleration of 12,500 BPS² at a maximum conveyor velocity of 6 inches per second. Substituting the above parameters, $T_1 = T_2 = 0.208672$ seconds into equation (1), the $\Delta S_{sMAX}$ is found to be 5.008 inches.

Considering the short move analysis for movements between static weld points of less than 5 inches, the acceleration and deceleration steps as illustrated in FIG. 4 are executed over time intervals $T_1$ and $T_2$ less than the time of 0.20876 seconds to traverse 64 LSD's. Thus, the manipulator tip does not reach the maximum composite velocity $V_{MAX}$ in a short move. The times $T_1$ and $T_2$ for the acceleration and deceleration steps are less than the 0.208672 seconds and are calculated in terms of the minimum execution time to traverse the distance between the points $P_{W1}$ and $P_{W2}$ at the projected conveyor velocity corresponding to a predetermined number of conveyor linear displacement units, LSD's. The details to calculate $T_1$ and $T_2$ for a short move analysis will be explained in more detail after a consideration of the more generalized long move analysis.

For execution in real time in the on-line mode, the acceleration and deceleration steps are accomplished in an assigned number of interpolation intervals, either 32 or 64 interpolation intervals in accordance with one aspect of the present invention. As explained in more detail in the aforementioned application Ser. No. 721,805, 32 interpolation intervals are assigned to a step wherein it has been calculated that 32 to 63 conveyor LSD's will be traversed during the execution time of the step at a maximum conveyor velocity of 6 inches per second. In that case, some of the interpolation intervals in accordance with operation of the on-line computation and control unit 18 correspond to 1 LSD of conveyor displacement and a second predetermined number of the 32 interpolation intervals correspond to two conveyor LSD's as will be explained in detail hereinafter.

In one embodiment, the transition or determination point between a long move or a short move analysis may be modified such that a 64 interpolation interval step may be assigned in a short move analysis for a $\Delta S_s$ greater than 5 inches when it has been calculated that between 64 and 127 LSD's of conveyor motion at the maximum conveyor speed are required to execute each of the acceleration and deceleration steps. This method might be used where the length of the constant velocity middle step for a long move is below a predetermined minimum for optimum execution.

Considering now the details of the simplified Cartesian predict method and an example of a long move analysis, the optimum execution time $T_s$ for the move between the weld points $P_{W1}$ and $P_{W2}$ (FIG. 5) on the workpiece is calculated from the following equation:

$$T_s = T_1 + T_2 + T_M \tag{2}$$

where $T_M$ is the time required for the constant velocity middle step between the acceleration and deceleration steps.

The teach-assist computer 34 in accordance with the precomputation predict program stored therein, in this case the simplified Cartesian method, proceeds to determine if a short or long move analysis is required on the basis of the $\Delta S_s$ distance calculated from the manipulator encoder data defining the points $P_{W1}$ and $P_{W2}$. As discussed hereinbefore, if the $\Delta S_s$ distance is determined to be greater than 5 inches, a long move analysis is indicated. For illustrative purposes assume that the $\Delta S_s$ distance is calculated to be 11 inches.

After determining the $\Delta S_s$, 11 inches for example, the optimum total execution time $T_s$ is calculated by substituting the known quantities into equation (2), $T_s = 2(0.208672) + T_M$ sec. Thus, to define the overall time of the step $T_s$, it is necessary to calculate $T_M$, the time required for the constant velocity midstep, step 3 in FIG. 5, between the acceleration and deceleration steps. In this regard, the following expression defines the time of the midstep $T_M$ in terms of the acceleration and deceleration step times $T_1$, $T_2$ and the $\Delta S_s$ static distance between the points $P_{W1}$ and $P_{W2}$:

$$\Delta S_s = \frac{V_{MR} T_1}{2} + \frac{V_{MR} T_2}{2} + V_{MR} T_M \tag{3}$$

This may be rewritten as follows:

$$T_M = \frac{\Delta S_s}{V_{MR}} - \tfrac{1}{2}T_1 - \tfrac{1}{2}T_2 \tag{4}$$

Further, the time for the step $T_s$ is solved from equation (2) as:

$$T_s = 2(0.208672) + 0.2496613 = 0.6670053 \text{ seconds.}$$

Referring now to FIG. 8, to define the XYZ coordinates of $P_{W2dyn.}$, the point $P_{W2}$ projected in real time with conveyor movement, it is necessary to solve the following equation:

$$\overline{\Delta S_{TOTAL}} = \overline{\Delta S_s} + \overline{\Delta S_c} \tag{5}$$

where $\Delta S_{TOTAL}$ is the vectorial sum in three dimensional space of the two components $\Delta S_s + \Delta S_c$. The $\Delta S_c$ corresponds to movement of the static workpiece reference $P_{W2}$ during the time of execution of the overall movement including the acceleration step 2, the constant velocity step 3, and the deceleration step 4. Thus, $\Delta S_{TOTAL}$ defines the manipulator tip movement from the point $P_{W1}$ to the projected point $P_{W2dyn.}$ with conveyor movement at the maximum conveyor velocity. The time of the step $T_s$ and the maximum conveyor velocity $V_c$ defines the quantity $\Delta S_c$:

$$\Delta S_c = T_s \cdot V_c \tag{6}$$

Solving equation (6), $\Delta S_c$ equals (0.6670053) (6) or 4.00203 inches. Substituting this value of $\Delta S_c$ into equation five, for simplicity in the present example assume that the conveyor movement is directly aligned with the X axis corresponding to a $\bar{i}$ vector:

$$\overline{\Delta S_{TOTAL}} = \overline{\Delta S_s} + \bar{i}\, 4.00203 \tag{7}$$

Equation (7) defines the total move from points $P_{W1}$ to $P_{W2dyn.}$. The teach-assist computer 34 has stored the calculation of $\Delta S_s$ as follows:

$$\overline{\Delta S_s} = \bar{i}\Delta S_x + \bar{j}\Delta S_y + \bar{k}\Delta S_z \tag{8}$$

Thus, in vector notation, the coordinates of the translated and projected point $P_{W2}$ dynamic can be written as follows:

$$\overline{P_{W2dyn.}} = \overline{P_{W1dyn.}} + \overline{\Delta S_{TOTAL}} \quad (9)$$

Referring to the dynamic profile of FIG. 5, the point $P_{W2}$ at the start of the weld 2 step defines the XYZ coordinates that represent the manipulator position in the various controlled axes at $\theta N_4$. The positional data in each of the coordinate axes may be obtained from the XYZ coordinates of the point $P_{W2dyn.}$ through a transformation process as described in the aforementioned application Ser. Nos. 721,805 and 625,932. The projected conveyor location corresponding to the point $P_{W2dyn.}$ ($\theta N_4$) at the start of the weld 2 is also defined as follows:

$$\Sigma D_{\theta N4} = \Sigma D_{\theta N1} + \Sigma D_S \quad (10)$$

where $\Sigma D_{\theta N4}$ is the projected conveyor location at point $P_{W2}$ dynamic and $\Sigma D_{\theta N1}$ is the projected conveyor location previously calculated and stored by the teach-assist computer 34 corresponding to the projected point $P_{W1}$ (The point $P_{W1}$ may also be referred to as $P_{W1dyn.}$). The term $D_s$ corresponds to the conveyor displacement in LSD's during the total time of the step $T_s$ for the manipulator tip to move the distance $\Delta S_{TOTAL}$. Thus, the term $D_s$ is the projected conveyor movement in LSD's during the execution of the acceleration step, the constant velocity step, and the deceleration step and is defined as follows:

$$D_s = T_s \cdot V_{c/\Delta/LSD} \quad (11)$$

where $\Delta/LSD = 0.019563102$ inches.

In the above example, the conveyor displacement $D_s$ during the time $T_s$ of execution of the total step is calculated as 0.6670053 seconds times 6 inches per second equal to 4.0020318 inches or 204 conveyor LSD's for the overall movement; 64 LSD's for each of the steps 2 and 4, and 76 LSD's for the constant velocity step 3. The number of LSD's for the constant velocity step 3 is calculated as $$D_{\theta N3} = \frac{T_M}{T_{LSD}} = \frac{.2496613}{.0032605} = 76.56 \text{ or } 76 \text{ LSD's.}$$

An interpolation interval code representing 64 interpolation intervals is assigned to this step; the next lowest binary multiple of 16. The total number of LSD's for the overall movement is defined:

$$D_s = D_{\theta N2} + D_{\theta N3} + D_{\theta N4} = \frac{T_s}{T_{LSD}} = \frac{\Delta S_c}{\Delta/LSD} \quad (12)$$

where $D_{\theta N2}$ is the number of LSD's for the acceleration step 2, $D_{\theta N4}$ is the number of LSD's for the deceleration step, $T_{LSD}$ is 0.0032605 seconds, the time to traverse one conveyor LSD at the maximum conveyor velocity, and $\Delta/LSD$ denotes the positional change per LSD of the conveyor movement equal to 0.019563102 inches.

The projected conveyor displacement for each calculated step of the move in the program including the weld steps is outputted for storage into the memory 16 along with the manipulator axes data as an absolute, accumulated conveyor displacement in terms of the number of conveyor LSD's. For example, if the projected conveyor data $\Sigma D_{\theta N1}$ corresponding to the point $\theta N_1$ was 1857 conveyor LSD's, the number of displacement units represented by the quantity $D_s$ 204 LSD's for example, is added to obtain $\Sigma D_{\theta N4}$. Then $\Sigma D_{\theta N4} = 204 + 1857 = 2061$ LSD's. Similarly, $\Sigma D_{\theta N2}$ is equal to $1857 + 64$ or 1921. For $\Sigma D_{\theta N3}$, the result is $1921 + 76 = 1997$. It should be apparent that in equation (12) the ratio of time quantities and the ratio of distance quantities can be equated since the time is calculated at maximum conveyor velocity and the distances are derived from the execution times and correspond to the displacement of the conveyor at maximum conveyor velocities.

Further, knowing the real time, projected coordinates of the point $P_{W2dyn.}$ or $\theta N_4$ in manipulator axis joint data and the corresponding projected conveyor position, the weld 2, step 5 can also be calculated. The calculation of the end point $\theta N_5$ of the weld 2 is performed by translating the manipulator coordinates of the point $P_{W2dyn.}$ to track this $P_{W2dyn.}$ for a predetermined interval of time again based on a maximum conveyor velocity to perform a weld. This results in the coordinates $\theta N_5$ at the end of the weld 2 and a corresponding projected conveyor position.

The next step in the simplified Cartesian predict method for a long step analysis is the computation of the coordinates for each of the manipulator axes and the corresponding conveyor position for the points $\theta N_2$ and $\theta N_3$, referring to FIG. 5. At this point, the coordinates of the points $\theta N_1$, $\theta N_4$ and $\theta N_5$ are defined along with the corresponding projected conveyor positions. Up to this point, the analysis has been performed with Cartesian XYZ coordinates; the $\theta N_1$, $\theta N_4$, $\theta N_5$ coordinate data being transformed into joint coordinate data after calculation in the XYZ domain. The profile of FIG. 5 describes manipulator tip movement in one Cartesian component direction of the XYZ domain. The representation in FIG. 8 describes a translation or movement in Cartesian space.

Figure 9:
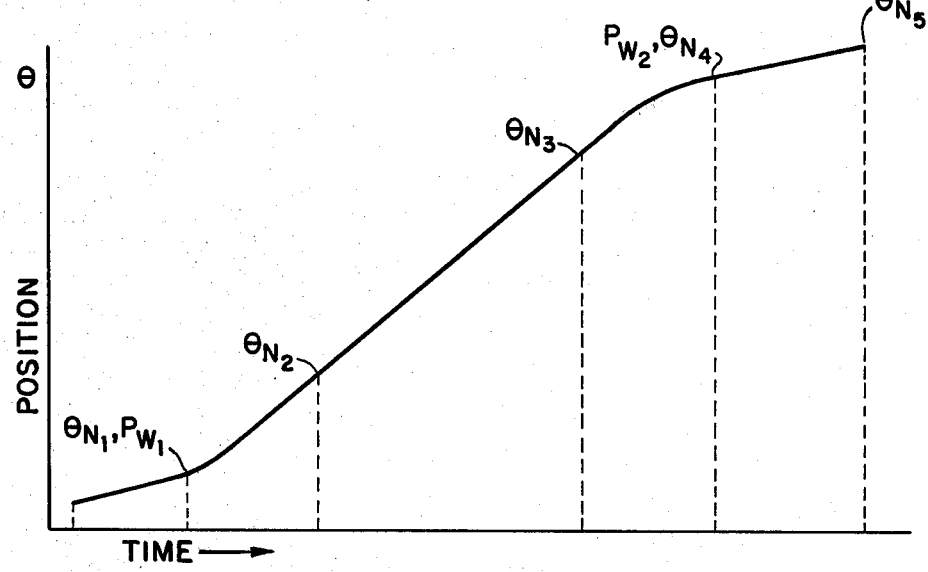
FIGS. 9, 10 and 11 are diagrammatic representations of the respective position, velocity, and acceleration profiles calculated by the off-line teach-assist apparatus of the present invention.
Figure 10:
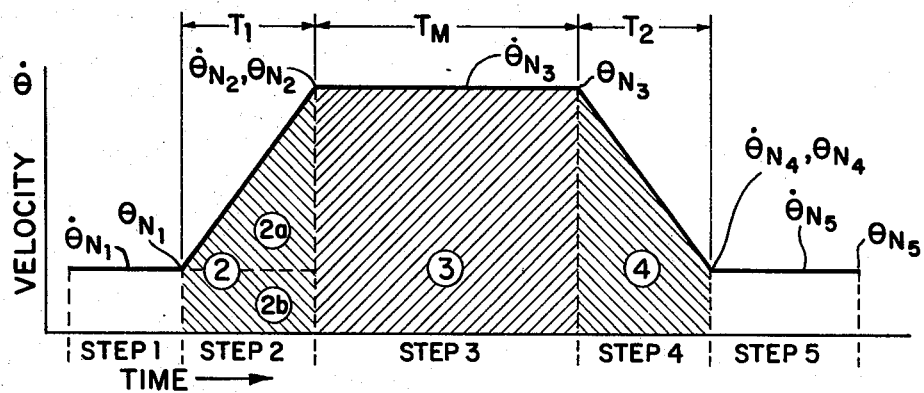
Figure 11:
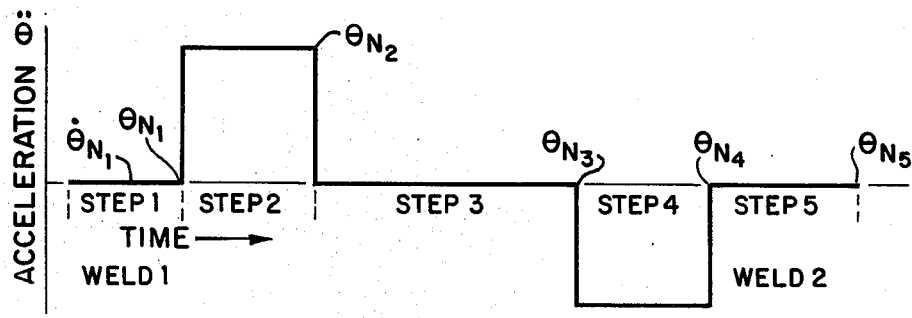

Considering the calculation of the coordinates for the points $\theta N_2$, $\theta N_3$ and referring now additionally to FIGS. 9 through 11, FIG. 10 similarly to FIG. 5 represents a manipulator axis velocity profile with respect to time. Each axis is accurately described by the profile of FIG. 10 according to a scaling factor. Briefly, to summarize the overall velocity profile of FIG. 10 for a long move analysis, step 1 corresponds to the weld 1 performed with the manipulator tracking the point $P_{W1}$ on the workpiece. The weld 1 ends at $\theta N_1$ corresponding to $P_{W1}$. At this point, at the start of step 2, the velocity ramps up at a constant acceleration during the time interval $T_1$ from the point $\theta N_1$ to the point $\theta N_2$ corresponding to a transition from the velocity $\dot{\theta} N_1$ to $\dot{\theta} N_2$ defining the slope in step 2. In step 3 the manipulator moves in each of the joint axes at a constant velocity $\dot{\theta} N_3$ during the $T_M$ time interval from the points $\theta N_2$ to $\theta N_3$. In step 4, each of the joint axes decelerates from the velocity $\dot{\theta} N_3$ to a tracking velocity $\theta N_4$ defining the point $P_{W2}$ the start of the weld 2. The manipulator during step 5, weld 2 at point $P_{W2}$, tracks the point $P_{W2}$ on the workpiece at the velocity $\dot{\theta} N_5$ to the point $\theta N_5$.

Referring now to FIG. 9, the accumulated position change in each joint axis is illustrated corresponding to the points in the velocity profile of FIG. 10. Thus, the position on the ordinate axis of the position profile corresponds to the integral of the velocity profile of FIG. 10. The position profile of FIG. 9 describes the total positional change with respect to time of any joint axis as the manipulator tip moves through the first weld, weld 1, the acceleration step 2, the constant velocity step 3, the deceleration step 4 and the weld step 5. Referring now to the acceleration profile of FIG. 11, the acceleration is plotted versus time and at any point is the differential of the velocity profile of FIG. 10. During the weld 1, step 1, the acceleration is approximately zero as the manipulator is tracking the conveyor to perform a weld at a nearly constant velocity $\dot{\theta}N_1$ to the point $\theta N_1$. In step 2, the acceleration is constant from $\dot{\theta}N_1$ to $\dot{\theta}N_2$ to the point $\theta N_2$. At $\theta N_2$, the acceleration returns to zero at the start of the constant velocity step 3. In step 4, each joint axis decelerates from $\dot{\theta}N_3$ to $\dot{\theta}N_4$ to the point $\theta N_4$. At $\theta N_4$, the acceleration returns to approximately zero during the weld 2 step 5 to perform the weld through the point $\theta N_5$.

Considering now the calculation of the coordinates of the points $\theta N_2$ and $\theta N_3$, the following equation is utilized to determine the total positional change $\Delta \theta N$ equal to $\theta N_4 - \theta N_1$ during the steps 2, 3 and 4 for each joint axis:

$$\Delta \theta N = [\theta_{N4} - \theta_{N1}] = \frac{(\dot{\theta}_{N3} + \dot{\theta}_{N1})}{2} T_1 + \dot{\theta}_{N3} \cdot T_M + \frac{(\dot{\theta}_{N3} + \dot{\theta}_{N5})}{2} T_2 \quad (13)$$

$$\quad\quad\quad ② \quad\quad ③ \quad\quad ④$$

The various quantities in equation (13) as discussed hereinabove are identified in FIG. 10. The quantities ②, ③ and ④ correspond to the areas 2, 3 and 4 identified in FIG. 10 and are the positional change in the particular axis profile during the respective steps 2, 3 and 4. For example, the first area ② on the right hand side of equation (13) defines the area under the curve for step 2 in accordance with the principles of analytical geometry and graphic analysis. The composite area ② during the step 2 interval from $\theta N_1$ to $\theta N_2$ is defined by the triangular area ②a and the rectangular area ②b. The overall composite area relationship is illustrated in the following equation (setting $T_1 = T_2$ in the simplified Cartesian predict analysis):

$$\quad ② \quad\quad ②b \quad\quad ②a \quad (14)$$
$$\frac{(\dot{\theta}_{N3} + \dot{\theta}_{N1})}{2} T_1 = \dot{\theta}_{N1} \cdot T_1 + \tfrac{1}{2}(\dot{\theta}_{N2} - \dot{\theta}_{N1}) \cdot T_1$$

The triangular area of 2a is given by the formula for the area of a triangle; $\tfrac{1}{2}$ the base times the height. The base of the triangle is $T_1$ and the height of the triangle is $\dot{\theta}_{N2} - \dot{\theta}_{N1}$.

Solving equation 13 for $\dot{\theta}_{N3}$ results in the following expression:

$$\dot{\theta}_{N3} = \frac{(\theta_{N4} - \theta_{N1})}{T_1 + T_M} - \frac{(\dot{\theta}_{N1} + \dot{\theta}_{N5})}{2} \cdot \frac{T_1}{T_1 + T_M} \quad (15)$$

In examining equation 15, it can be seen that $\dot{\theta}_{N3}$ can be calculated for each of the axes from the above expression since the quantities $\theta_{N1}$, $\theta_{N4}$, $\dot{\theta}_{N1}$, $\dot{\theta}_{N5}$, $T_1$ and $T_M$ are known quantities previously calculated and stored. The $\dot{\theta}_{N1}$ and $\dot{\theta}_{N5}$ velocities are calculated from the respective end points in step 1 and step 5 for each of the welds knowing the time and positional change in each joint axis; for example $$\dot{\theta}_{N5} = \frac{\theta_{N5} - \theta_{N4}}{T_W},$$

where $T_W$ is the time of the weld 2 step 5.

To complete the solution for $\theta_{N2}$ and $\theta_{N3}$, the following equations are utilized to define these parameters in terms of the previously known and calculated quantities:

$$\theta_{N2} = \theta_{N1} + \tfrac{1}{2} T_1 (\dot{\theta}_{N2} + \dot{\theta}_{N1}) \quad (16)$$

$$\theta_{N3} = \theta_{N2} + \dot{\theta}_{N3} \cdot T_M \quad (17)$$

Equations 16 and 17 are derived from similar graphical analyses and the areas discussed hereinbefore.

Thus, in accordance with the simplified Cartesian predict method, the velocity profile for minimum execution time to move between the point $P_{W1}$ and $P_{W2}$ is calculated along with the welds 1 and 2. For the long move analysis, the calculated, real time projected positional data for each of the manipulator axes is recorded, $$\theta_{N2\,(1-6)}, \theta_{N3\,(1-6)}, \theta_{N4\,(1-6)} \text{ and } \theta_{N5\,(1-6)}.$$

In response to the teach operator moving the manipulator tip between the points $P_{W1}$ and $P_{W2}$ on the static workpiece, the teach-assist computer 34 in response to an input command to teach the next point, calculates the above positional data for each of the coordinate joint axes and defines a fixed path solution represented by the velocity profile in FIG. 10 corresponding to the acceleration step 2, the constant velocity step 3, the deceleration step 4 and the weld step 5. The aforementioned calculated positional data is then loaded into the main control memory 16 for use by the on-line computation and control unit 18 to reconstruct the precomputed optimum fixed path solution during replay of the program in accordance with movement of the conveyor. The corresponding conveyor data as discussed hereinabove is also computed and formated for recording into the main control memory with the positional joint axis data points.

For example, considering the long move analysis example discussed hereinbefore, the following would be recorded into the memory 16:

| STEP | MODE | DATA | INTERP. INTERVALS | Kv |
|---|---|---|---|---|
| STEP 1 | WELD 1 | $\theta N_{1(1-6)}, \Sigma D_{\theta N1}$ | $2^N$ | $\frac{2^N}{WD}$ |
| STEP 2 | CP(ACC $\neq$ O) | $\theta N_{2(1-6)}, \Sigma D_{\theta N2}$ | 64 | 1 |
| STEP 3 | CP(ACC = O) | $\theta N_{3(1-6)}, \Sigma D_{\theta N3}$ | 64 | 64/76 |
| STEP 4 | CP(ACC $\neq$ O) | $\theta N_{4(1-6)}, \Sigma D_{\theta N4}$ | 64 | 1 |
| STEP 5 | WELD 2 | $\theta N_{5(1-6)}, \Sigma D_{\theta N5}$ | $2^N$ | $\frac{2^N}{WD}$ | where WD is the number of LSD's (conveyor encoder basic displacement units) of motion assigned to a weld step ($2^N < WD < 2^{N+1}$).

The teach-assist computer 34 in addition to calculating the above quantities also checks to insure that the maximum specified velocity in each joint axis is less than the specific maximum for the particular manipulator apparatus such as $\pm 3,000$ BPS. Further, a check is also made to ensure that the accelerations commanded are within the specified limits such as less than $\pm 2500$ BPS $\Delta/64$ LSD's or approximately $\pm 12,500$ BPS$^2$.

It should be noted that all the above calculations are made utilizing maximum conveyor line speed to insure that the maximum velocities will not be exceeded and that the weld time will be suitable to perform acceptable welds even at maximum conveyor line speed. If the conveyor line speed varies below the maximum line speed, the actual execution times on-line to perform the precomputed fixed path solution will be longer relative to the calculated times. The precomputed dynamic profile discussed hereinabove is synchronized to conveyor advancement and also to conveyor velocity.

Therefore, the precomputations are optimized for maximum conveyor line speed. However, it can be seen that if the line velocity is considerably slower than the maximum line velocity, no significant overall loss of program optimization is involved. As the workpiece moves more slowly past the manipulator station at less than the maximum conveyor speed, the program is performed proportionately more slowly. However, the program is easily accomplished during the time the workpiece is within the range of the manipulator. Thus, it is insured that the manipulator will easily complete the precomputed fixed path solution in accordance with conveyor line speed and is compensated for line speed variations by the synchronization. Further, in the on-line playback, the position, velocity and acceleration commands issued by the on-line computation and control unit 18 (as reconstructed from the data in the memory 16) are appropriately adjusted with respect to the actual conveyor velocity to insure optimum dynamic behavior of the manipulator.

In accordance with the above simplified Cartesian predict method, it should be noted that the calculations performed by the teach-assist computer program maintain exact position and velocity integrity at the beginning and end of each of the acceleration, deceleration or constant velocity steps; i.e. linear algebra in the $\theta$ domain is utilized to match the defined termination parameters. Thus, the absolute position accuracy between the end points of the various steps may depart somewhat from that projected or desired.

In accordance with the desired positional accuracy of the manipulator tip to be maintained between weld points, the magnitude of the position error may be checked by the teach-assist computer 34. For example, higher positional accuracy may be required where collision problems are more severe or when the movement between points is large. Thus, when considering a long move analysis as described hereinbefore in connection with FIGS. 9 through 11, the positional error is calculated at the center of the constant velocity step 3 and compared to the projected position to determine the magnitude of the positional error. If the positional error is beyond a predetermined acceptable limit, such as plus or minus 0.5 inches in a particular embodiment, the constant velocity step 3 is redefined by the teach-assist computer 34 into two or more constant velocity steps of appropriate scaled velocities. For example, if the positional error calculated is in the range of 1 to 2 times the desired maximum positional deviation, two constant velocity steps are used instead of step 3. Similarly, if two to three times the allowable error is detected, three steps are used as illustrated in FIG. 6. For a range of three to four times the allowable error, four steps are used. In considering the above checking programs for velocity, acceleration and position, it should be noted that the off-line compute time and the complexity of the computer required are not critical. The operations in the preferred embodiment are all performed off-line in the teaching mode and the computer is not required for on-line operation and is not dedicated to the manipulator apparatus. The off-line teach-assist apparatus 30 is detachable and portable.

The following equations define the calculations performed by the teach-assist computer 34 when it is desired to define two constant velocity steps 3a and 3b in lieu of the single step 3, the constant velocities calculated are designated as $\dot{\theta}_{N3a}$ and $\dot{\theta}_{N3b}$ for the two steps 3a and 3b respectively, $\theta_{N3a}$ defines the position between the steps 3a and 3b:

$$\dot{\theta}_{N3a} = \frac{2(\theta_{N3a} - \theta_{N1}) - \dot{\theta}_{N1} \cdot T_1}{T_1 + 2T_{M1}} \tag{18}$$

$$\dot{\theta}_{N3b} = \frac{2(\theta_{N4} - \theta_{N3a}) - \dot{\theta}_{N4} \cdot T_1}{T_1 + 2T_{M2}} \tag{19}$$

The details of the simplified Cartesian predict method performed by the off-line teach-assist computer 34 for a short move analysis will now be considered, i.e. where the static distance on the workpiece $\Delta S_s$ between two points $P_{W1}$ and $P_{W2}$ is less than 5 inches. The 5 inch maximum for a short move analysis and the transition point to a long move analysis is determined by calculating the maximum distance that can be traversed without exceeding the 24 inches per second $V_{MR}$ of the manipulator tip and with maximum acceleration and deceleration. This time $T_1 + T_2$ for the maximum short move as discussed hereinbefore is approximately $0.208672 \times 2 = 0.417344$ secs. at the maximum conveyor speed of 6 inches per second. This time corresponds to a conveyor displacement of $2 \times 64$ conveyor LSD's at the maximum conveyor line speed. In a specific embodiment where the lowest number of interpolation intervals assigned to a step is 16, the long move analysis may be utilized whenever the projected conveyor LSD's calculated for the overall step is greater than 144 $(2 \times 64 + 16)$ to thereby insure a minimum $T_M$ constant velocity step of 16 LSD's. For a step where the calculated number of LSD's is 144 or less, the short move analysis is utilized.

The short move analysis in the simplified Cartesian predict method proceeds similarly to the long move analysis discussed hereinbefore. However, since no constant velocity step is required, the calculations are simplified. The time required for the step $T_s$ equals $T_1 + T_2$. In one arrangement, the time $T_s$ for all short move steps is fixed for simplicity at 0.417344 seconds, 2(0.20872 seconds), at the maximum conveyor line speed of 6 inches per second. Thus, the $\Delta S_c$ referring to FIG. 8 is also fixed from equation 6 as $T_s \times V_c = 2(0.208672 \times 6$ inches per second$) = 2.50406$ inches. The $\Delta S$ total for the step is similarly calculated according to equation (5) and the coordinates of the point $P_{W2}$, referring to FIG. 4, the start of the next weld $\theta_{N3}$ are then found in XYZ coordinates from equation (9) in terms of the previous point data and the $\Delta S_{TOTAL}$. The corresponding conveyor position is also calculated by adding 128 conveyor LSD's to the previous conveyor location at $\theta N_1$. Further, the weld step 2 is calculated to obtain the coordinates of the point $\theta_{N4}$ and the corresponding conveyor location. All the coordinate data for the overall move of steps 1, 2, 3 and 4 are now known including $\theta N_1$, $\theta N_3$ and $\theta N_4$ and the time of the step $T_s$. The only quantity remaining to be calculated is the end point of step 2 $\theta N_2$ the transition between the acceleration and deceleration steps 2 and 3, and the corresponding velocity $\dot{\theta}N2$. The velocity $\dot{\theta}N2$ is derived from the following equations by defining the areas as shown in FIG. 4 similarly to that in accordance with the long move analysis above in equations (13) through (15).

$$\Delta\theta_N = \theta N_3 - \theta N_1 = \tfrac{1}{2}(\dot{\theta}N_2 + \dot{\theta}N_1)T_{-1} + \tfrac{1}{2}(\dot{\theta}N_2 + \dot{\theta}N_3)T_1 \quad (20)$$

$$\dot{\theta}N_2 = (\theta N_3 - \theta N_1)/T_1 - \tfrac{1}{2}\dot{\theta}N_1 - \tfrac{1}{2}\dot{\theta}N_3 \quad (21)$$

Equation (21) is a simplified form of equation (20). After obtaining $\dot{\theta}N_2$, $\theta N_2$ is calculated from equation (16) as discussed in the long move analysis. Thus, for the short move analysis, the data recorded for steps 1, 2, 3 and 4 of FIG. 4 are the same parameters recorded concerning the long move analysis in steps 1, 2, 4 and 5 of FIG. 5.

In the alternate arrangement, the short move analysis for a movement between points corresponding to 32–63 LSD's of conveyor movement may be calculated deriving $T_1$ and $T_2$ and assigning 32 interpolation intervals to each of the acceleration and deceleration steps. Those short move steps corresponding to less than 32 LSD's of conveyor movement are then assigned 32 interpolation intervals. However, the increase in execution time is very slight for these very short moves.

Thus, the simplified Cartesian predict or precomputation method described hereinbefore describes one calculation or precomputation program that may be utilized for moving workpiece operations by the off-line teach assist computer 34 to project and precompute the fixed path solution in the off-line teaching mode from the statically entered teach data as the operator moves the manipulator tip over the taught points. While the aforementioned simplified Cartesian method provides accurate data for a spot welding program and has been found satisfactory for most work cycle applications of this type, it should be realized that other predict methods utilizing different calculation programs to define the dynamic profiles including welding steps, acceleration steps, constant velocity steps and deceleration steps are also possible where more precise program optimization is desired.

In this regard it should be realized that even the simplified Cartesian predict method provides a tremendous increase of the utilization of program execution time to execute the moves. Thus, precomputed fixed path solutions defining dynamic profiles for movement of the manipulator apparatus are calculated wherein the manipulator tip is accurately commanded to move in minimum execution time with minimum overshoot and settling time requirements. This is achieved by the commanded signals corresponding to a physically realizable command signal that the manipulator can accurately follow in calculated minimum time limited only by the maximum dynamics of the manipulator apparatus.

GENERAL PREDICT CONSIDERATIONS

Other precomputation methods differ only in that they utilize more precise calculations to further optimize the minimum time calculations without exceeding the maximum dynamic parameters during real time execution.

For example, another precomputation method referred to as a simplified axis predict method (entitled thus only for reference purposes) determines the minimum execution time based on the approximation of the dynamic movement for each axis of the manipulator. Next the resulting execution time for each axis is examined to determine the critical or limit axis; i.e. the axis that requires the highest execution time is the critical axis and determines the time of the step. The simplified axis predict method then performs a check to insure that the dynamic capabilities of the manipulator are not exceeded. If the dynamic capabilities are exceeded, the simplified axis predict method recalculates the data to bring the dynamic parameter maximums within the acceptable dynamic limits.

A second predict method referred to as an intermediate axis predict method proceeds on a total solution basis for all long and short move cases and utilizes less simplifying assumptions than the simplified axis predict method to calculate the minimum execution time in a more precise fashion.

A third predict method referred to as a refined axis predict proceeds similarly to the intermediate axis method but utilizes still less simplifying assumptions than the other methods to calculate the minimum execution time and manipulator arm trajectory in a more precise fashion and also more accurately calculates axis data to ensure that the maximum dynamic parameters of any axis are not exceeded.

A fourth predict method referred to as a modified axis predict method proceeds similarly to the simplified axis method but calculates the minimum execution time in a more precise fashion than the simplified axis method and utilizes less simplifying assumptions.

The four axis predict methods, simplified axis, intermediate axis, refined axis, and modified axis each calculate the minimum execution time for each manipulator arm movement by determining the minimum execution time for each controlled axis without exceeding the maximum dynamic parameters of each axis. The axis that requires the largest execution time for a manipulator arm movement is denoted the limit or critical axis and the projected path of movement in each of the axes for the manipulator arm movement is determined on the basis of the limit axis execution time.

The limit axis determination is employed for all manipulator arm movements whether a moving or stationary workpiece operation is involved.

Further, the limit axis determination is also useful for determining minimum execution times of a work cycle without exceeding the maximum dynamic parameters of any axis in both the preferred off-line precomputation method and the alternate on-line, real-time computation method.

Figure 13A:
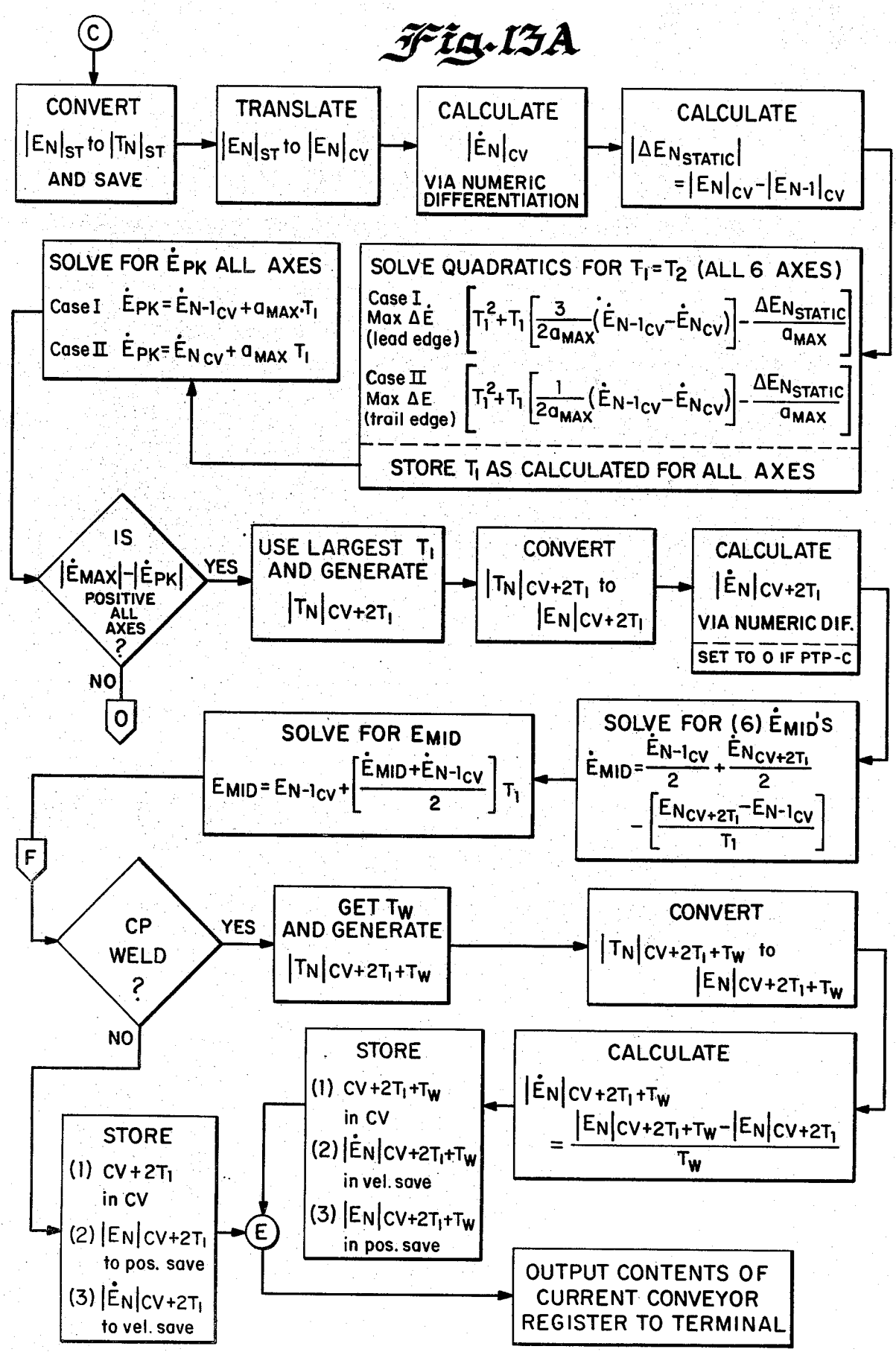
Figure 14A:
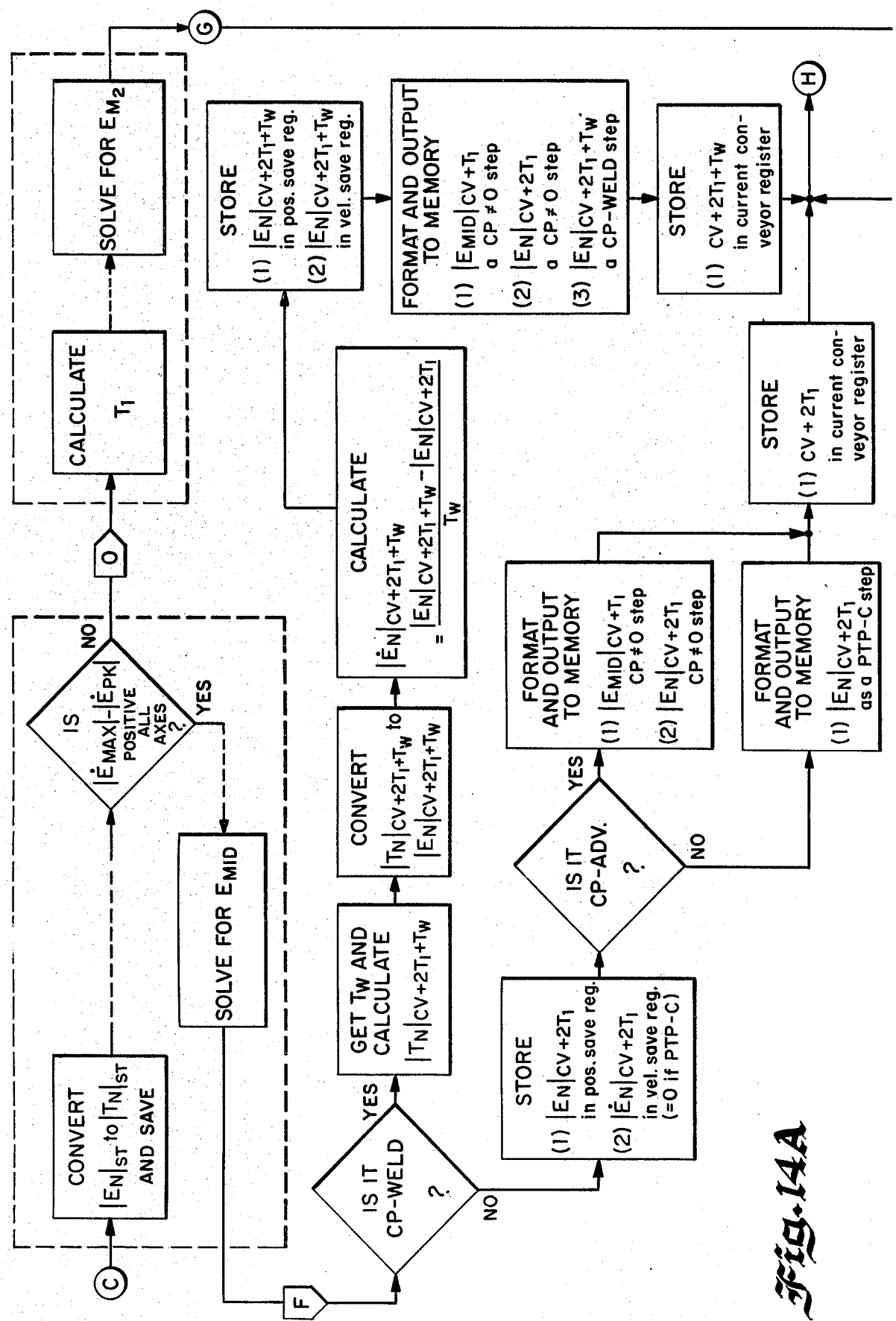

Referring now to FIG. 7, one example of the detailed flow process steps and computations to implement the PASS #1 process block 116 and the PASS #2 process block 128 in accordance with the simplified axis predict method is illustrated in FIGS. 13 and 14 respectively. A diagrammatic representation of the computation points in any of the manipulator axes is illustrated in FIG. 12.

The following definitions and relationship are useful in considering the operations described in the flow charts FIGS. 13 and 14 and the diagrammatic representation of FIG. 12.

N represents the current point for which the precomputations of the fixed path solution are being performed, i.e. the move from N-1 to N;

N-1 represents the previous point for which the precomputations have been performed to move to the point N-1;

$/E_N/_{CV}$ represents the set of manipulator axis data in each of the controllable axes that defines the point N and that correspond to the projected conveyor position (CV) stored in the conveyor register i.e. CV is equivalent to the symbol $\Sigma D$ as discussed hereinbefore;

$/T_N/_{CV}$ represents the Cartesian transform of the data $/E_N/_{CV}$ at the point N with vector definition of the manipulator hand of the manipulator e.g. the Cartesian coordinates of the point S in FIG. 8 and the direction cosines in each coordinate axis for the vector segments RS and ST;

$/\dot{E}_N/_{CV}$ represents the set of manipulator axis data in each of the axes that defines the velocity of each axis at the point N corresponding to the projected conveyor position stored in the conveyor register;

$E_{MID1}$, $\dot{E}_{MID1}$, $E_{MID2}$, $\dot{E}_{MID2}$ represents the corresponding positions and velocities at the end points of the middle constant velocity step for advance to the point N as illustrated in FIG. 12.

SIMPLIFIED AXIS PREDICT

Figure 12A:
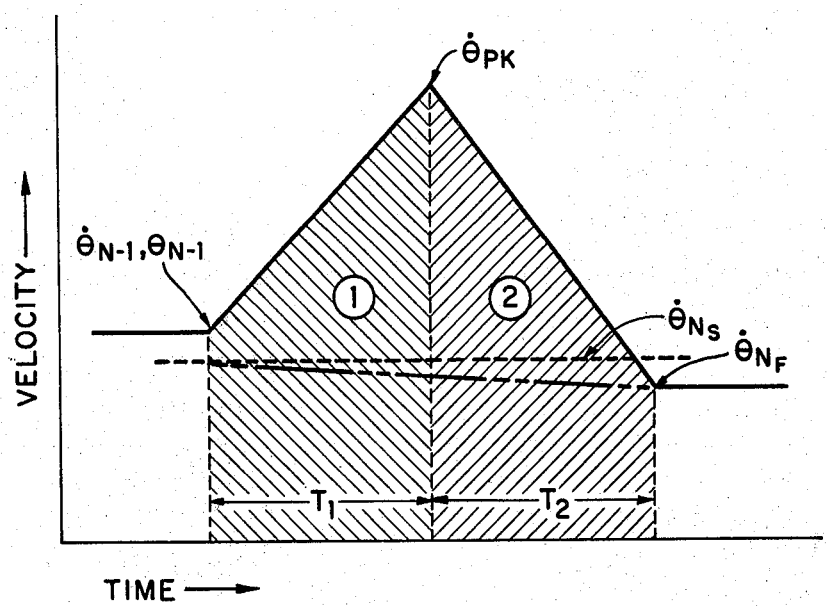
FIGS. 12A and 12B are diagrammatic representations of velocity profiles illustrating the teach-assist calculations performed by the off-line teach apparatus of the present invention.
Figure 12B:
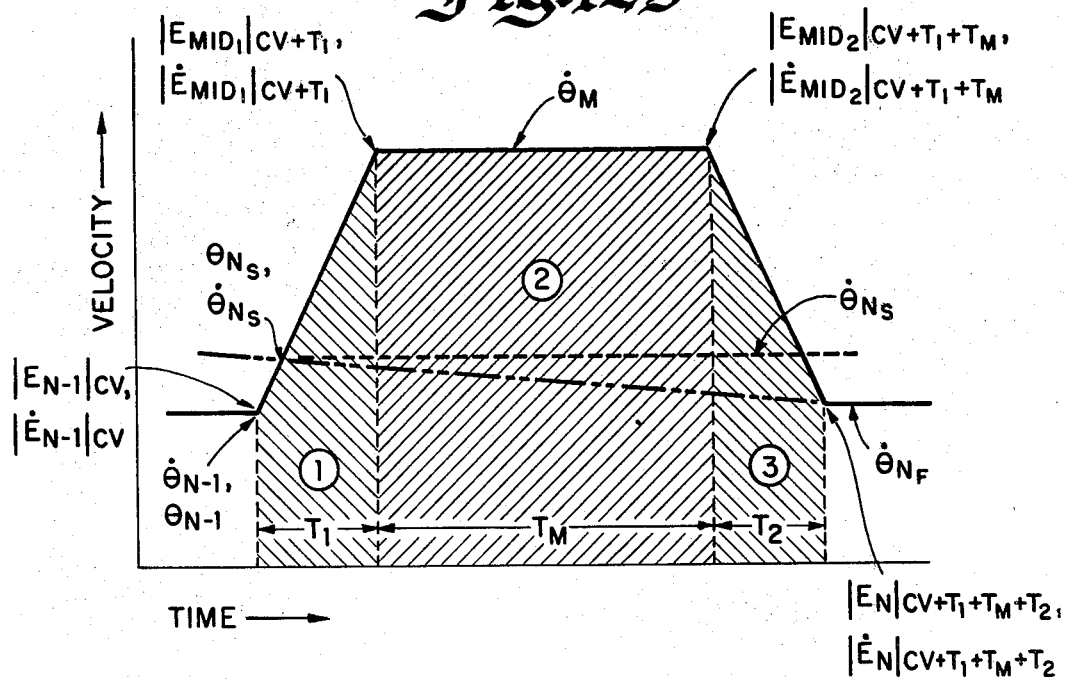

Considering now the basic calculations and operations performed for the simplified axis predict method illustrated in FIGS. 13 and 14, reference is made to FIGS. 12A and 12B. In FIG. 12A, the short move analysis is diagrammatically represented and in FIG. 12B the long move analysis is diagrammatically represented.

In the case of the short move analysis, FIG. 12A, the following relationship describes the basis for calculating the execution time for each manipulator axis:

$$\Delta\theta N_s + \Delta\theta_{dyn} = \Sigma\Delta\theta_{TOTAL} \tag{28}$$

where $\Delta\theta_{dyn} = \dot{\theta}N_s \cdot 2T_1$ and $\Delta\theta N_s = \theta N_s - \theta_{N-1}$. Thus, the total positional change $\Sigma\Delta\theta_{TOTAL}$ for each manipulator axes for the total move from point N-1 to point N is calculated by summing the portion $\Delta\theta_{dyn}$ representing the tracking of the point N as the conveyor moves with projected motion during the time of the move, $T_1 + T_2 = 2T_1$ (assume $T_1 = T_2$) and the portion $\Delta\theta N_s$ representing the movement of the manipulator between the points N-1 and N with the conveyor stopped at the position corresponding to $\theta_{N-1}$; i.e. $\Delta\theta N_s$ represents the static positional change. The quantity $\Sigma\Delta\theta$ of equation (28) may be rewritten as follows:

$$\Sigma\Delta\theta = \Delta\theta N_s + \dot{\theta} N_s \cdot 2T_1 \tag{29}$$

The quantity $\Sigma\Delta\theta$ is also defined from FIG. 12A by calculating the trapezoidal areas denoted 1 and 2:

$$\Sigma\Delta\theta = \tfrac{1}{2}(\dot{\theta}_{PK} + \dot{\theta}_{N-1})T_1 + \tfrac{1}{2}(\dot{\theta}_{PK} + \dot{\theta}_{Ns})T_1 \tag{30}$$

Setting equations (29) and (30) equal to each other results in the following after simplification:

$$\Delta\theta N_s = \tfrac{1}{2}T_1[2\dot{\theta}_{PK} + \dot{\theta}_{N-1} - 3\dot{\theta}_{Ns}] \tag{31}$$

The quantity $\dot{\theta}_{Ns}$ is the velocity of the axis if the manipulator were tracking the point N at the start of the overall move at the projected time that the manipulator is finishing the weld at point N-1. As seen by the sloped dotted line between $\dot{\theta}N_s$ and $\dot{\theta}_{NF}$ (exaggerated), the velocity $\dot{\theta}_N$ is not constant and includes a slight acceleration or deceleration component.

Considering the peak velocity $\dot{\theta}_{PK}$, the following relationships define the quantity $\dot{\theta}_{PK}$, case I results when $/\dot{\theta}_{PK} - \dot{\theta}_{N-1}/ \geq /\dot{\theta}_{PK} - \dot{\theta}_{Ns}/$ and case II results when $/\dot{\theta}_{PK} - \dot{\theta}_{Ns}/ > /\dot{\theta}_{PK} - \dot{\theta}_{N-1}/$:

Case I, $\dot{\theta}_{PKI} = \dot{\theta}_{N-1} + a_{MAX} \cdot T_1$ \hfill (32)

Case II, $\dot{\theta}_{PKII} = \dot{\theta}_{Ns} + a_{MAX} \cdot T_1$ \hfill (33)

Case II is illustrated in FIG. 12A. Considering the Case II situation and substituting equation (33) into equation (31):

$$T_1^2 + T_1\left[\frac{1}{2a_{MAX}}(\dot{\theta}_{N-1} - \dot{\theta}_{Ns})\right] - \frac{\Delta\theta_{Ns}}{a_{MAX}} = 0 \tag{34}$$

Thus the quadratic equation (34) may be solved for $T_1$ if the value of $\dot{\theta}_{Ns}$ is known since the quantities $a_{MAX}$, $\dot{\theta}_{N-1}$ and $\Delta\theta_{Ns}$ are already known. The velocity $\dot{\theta}_{Ns}$ is calculated by numerical differentiation techniques, i.e. the velocity $\dot{\theta}_{Ns}$ is calculated at two points a small distance on either side of the projected conveyor location corresponding to the point $\theta_{N-1}$ and the slope is determined to yield $\dot{\theta}_{Ns}$. The solutions of the term $T_1$ for all the manipulator axes are then examined to determine the greatest $T_1$ and thus the critical axis, i.e. the axis that determines the minimum execution time required for the movement from point N-1 to point N. This axis is the one that will move the fastest and accelerate at the maximum rate.

After determining the time of the overall move as $2T_1$, the simplified axis predict method proceeds as discussed hereinbefore in connection with the simplified Cartesian predict method.

The solution for $T_1$ in the Case I situation is obtained by substituting equation (32) into equation (31):

$$T_1^2 + T_1\left[\frac{3}{2a_{MAX}}(\dot{\theta}_{N-1} - \dot{\theta}_{Ns})\right] - \frac{\Delta\theta_{Ns}}{a_{MAX}} = 0 \tag{35}$$

In the equation (34) and (35), the following relationships define whether the value $+a_{MAX}$ or $-a_{MAX}$ is utilized:

use $+ a_{MAX}, ^{MAX}$ if $\dot{\theta}_{PK} > {}^{MAX}\dot{\theta}_{N-1}$, Case I \hfill (36)

if $\dot{\theta}_{PK} > \dot{\theta}_{Ns}$, Case II use $- a_{MAX}$, if $\dot{\theta}_{PK} < \dot{\theta}_{N-1}$, Case I \hfill (37)

if $\dot{\theta}_{PK} < \dot{\theta}_{Ns}$, Case II

Referring now to the long move analysis for the simplified axis predict method and referring now to FIG. 12B, the following relationship is utilized:

$$\Delta\theta_{dyn} = \dot{\theta}_{Ns}(2T_1 + T_M) \tag{38}$$

Substituting equation (38) into the basic relationship (28) yields:

$$\Sigma\Delta\theta_{TOTAL} = \Delta\theta_{Ns} + \dot{\theta}_{Ns}(2T_1 + T_M) \tag{39}$$

The quantity $\Sigma\Delta\theta_{TOTAL}$ is again defined in terms of the areas under the velocity profile of FIG. 12B:

$$\Sigma\Delta\theta_{TOTAL} = \tfrac{1}{2}(\dot{\theta}_{MAX} + \dot{\theta}_{N-1})T_1 + \qquad (40)$$

$$\dot{\theta}_{MAX} \cdot T_M + \tfrac{1}{2}(\dot{\theta}_{MAX} + \dot{\theta}_{Ns})T_1$$

where the velocity $\dot{\theta}_{MAX}$ is utilized in the long move analysis in lieu of the velocity $\dot{\theta}_{PK}$ since the manipulator reaches $\dot{\theta}_{MAX}$.

Setting the equation (39) and (40) equal yields the following upon simplification:

$$\Delta\theta_{Ns} = T_1(\dot{\theta}_{MAX} - 3/2\dot{\theta}_{Ns} + \tfrac{1}{2}\dot{\theta}_{N-1}) + T_M(\dot{\theta}_{MAX} - \dot{\theta}_{Ns}) \qquad (41)$$

The solution of $T_1$ is organized into the following for Case I and Case II:

$$\text{Case I, } T_1 = \frac{\dot{\theta}_{MAX} - \dot{\theta}_{N-1}}{a_{MAX}} \qquad (42)$$

$$\text{Case II, } T_1 = \frac{\dot{\theta}_{MAX} - \dot{\theta}_{Ns}}{a_{MAX}} \qquad (43)$$

The quantity $T_M$ is solved from the following relationship obtained by rearranging equation (41):

$$T_M = T_1\left[\frac{3/2\,\dot{\theta}_{Ns} - \tfrac{1}{2}\dot{\theta}_{N-1} - \dot{\theta}_{MAX}}{\dot{\theta}_{MAX} - \dot{\theta}_{Ns}}\right] + \frac{\Delta\theta_{Ns}}{\dot{\theta}_{MAX} - \dot{\theta}_{Ns}} \qquad (44)$$

Equation (44) is then solved for $T_M$ to obtain the total movement time $T_s$ for each axis by adding the quantity $2T_1$ to $T_M=T_s$. As before, the greatest value of $T_s$ among the manipulator axes defines the minimum execution time $T_s$.

The details of the above long and short move analyses for the simplified joint predict method are illustrated in flow diagram form in FIGS. 13 and 14.

INTERMEDIATE AXIS PREDICT

Figure 18:
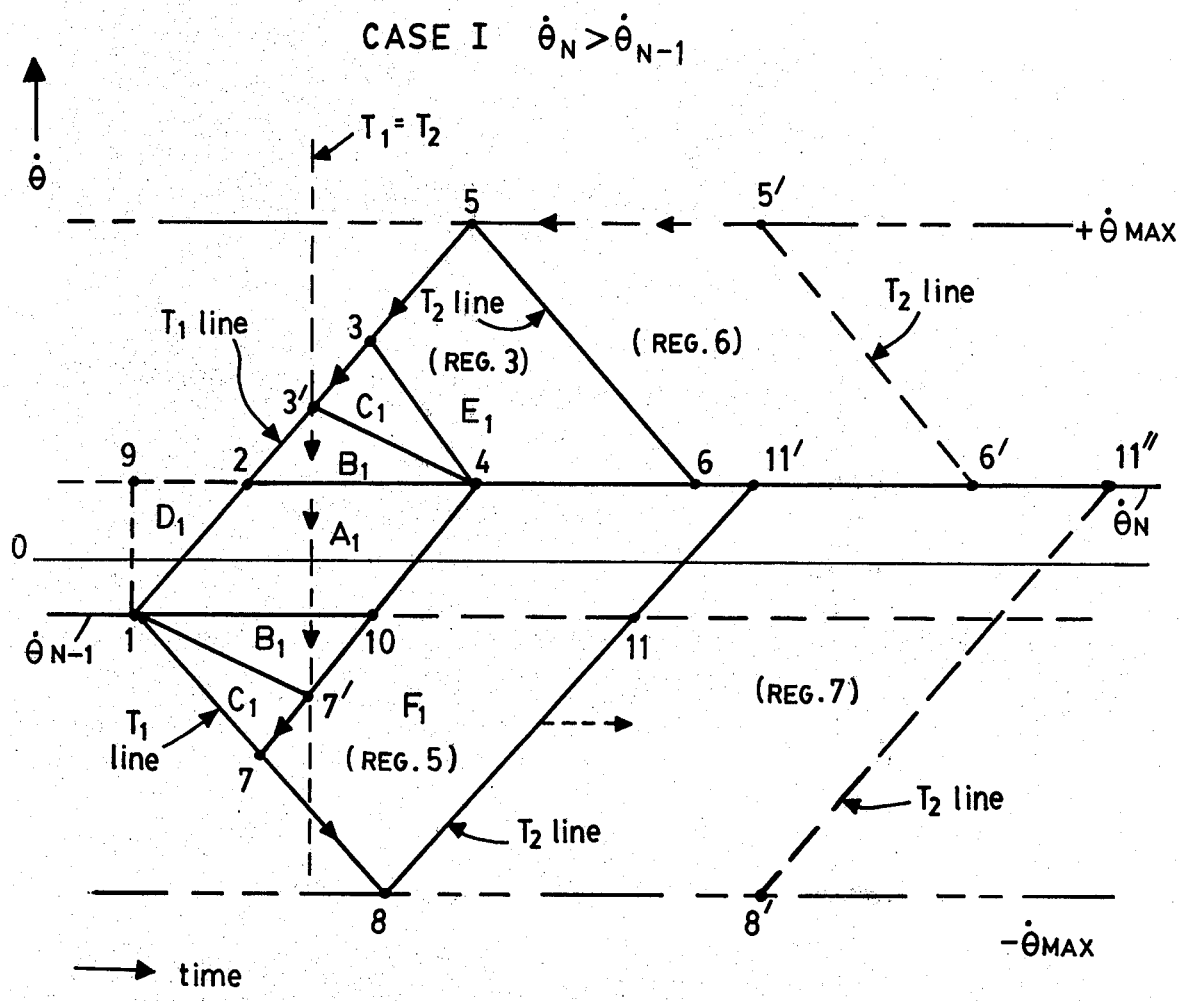
FIGS. 18 and 19 are diagrammatic representations of velocity profiles illustrating an intermediate axis predict method of the present invention.
Figure 19:
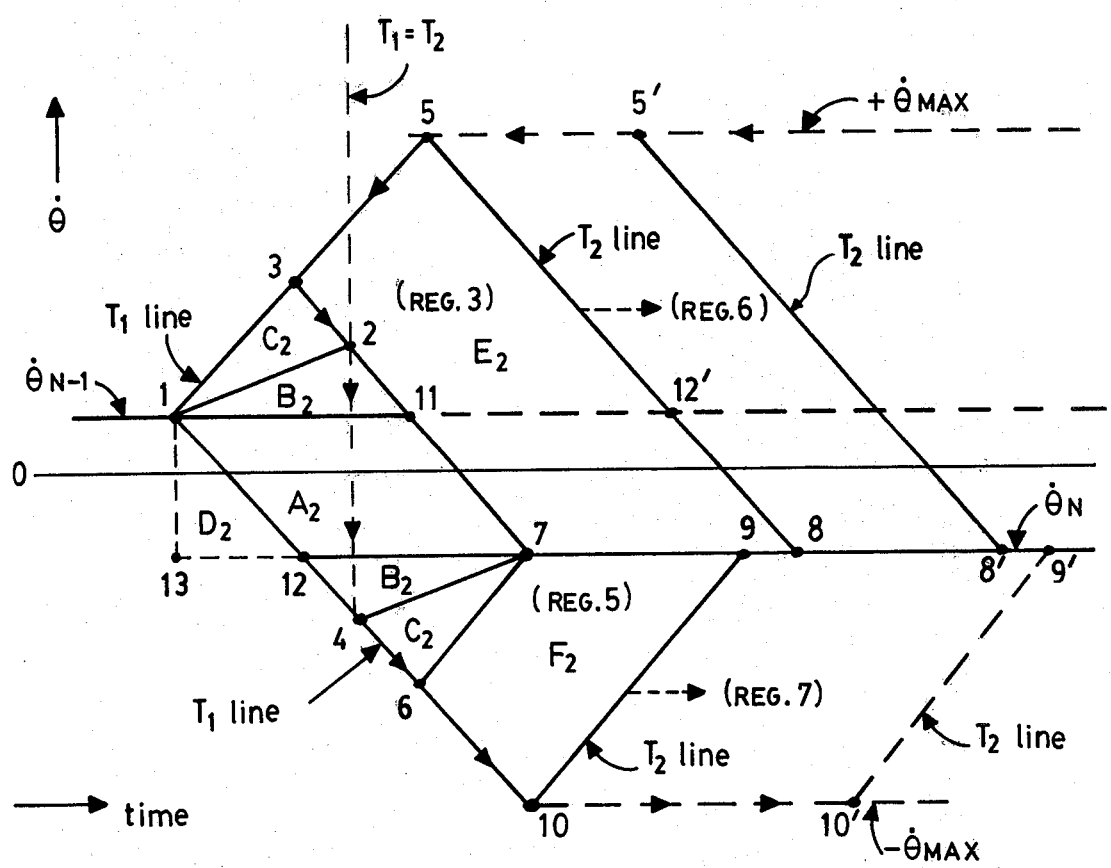

Considering now the intermediate axis predict and referring to FIGS. 18 and 19, the basic approach is more comprehensive than the simplified axis predict method and utilizes less simplifying assumptions. For example, the intermediate axis predict method does not set $T_1$ and $T_2$ equal but solves separately for each of the times $T_1$ and $T_2$. This results in a lower execution time since in the simplified axis predict method setting $T_1$ equal to $T_2$ causes one of the acceleration or deceleration movements to occur at somewhat less than the maximum dynamic parameters. Further, the intermediate axis predict method is more comprehensive as to ease of solution since all short and long moves are solved as different region solutions of a comprehensive general solution. The only simplifying assumption that it utilized is that the velocity $\dot{\theta}_N$ is constant over the movement from point N-1 to point N.

Referring now to the graphical velocity profile analyses of FIGS. 18 and 19, FIG. 18 represents the analysis referred to as a Case I situation where $\dot{\theta}_N > \dot{\theta}_{N-1}$ and FIG. 19 represents the analysis referred to as a Case II situation where $\dot{\theta}_{N-1} > \dot{\theta}_N$. The situation where $\dot{\theta}_{N-1} = \dot{\theta}_N$ can be solved on either a Case I or a Case II situation. The graphical analyses of FIGS. 18 and 19 are useful to summarize the overall approach of the intermediate axis predict with the various designated regions and areas defining the regions of operation for all types of manipulator arm movements as determined by the $\Delta\theta N_s$ of the particular manipulator arm movement. As before, the graphical analysis defines the movement of one axis.

As discussed hereinbefore in connection with FIGS. 9–12 and the simplified axis predict method, the relationship (28) defines the total movement of the manipulator axis in each axis from the point N-1 to acquire the point N with projected conveyor movement with the total positional change of $\Delta\theta_{TOTAL}$ equal to the sum of $\Delta\theta N_s$ and $\Delta\theta_{dyn.}$; where $\Delta\theta N_s$ corresponds to the static positional change in each axis to acquire the point N with the conveyor stopped at the position corresponding to the point (N-1) and $\Delta\theta_{dyn.}$ corresponds to the positional change in each axis to track the point N as the conveyor moves with projected motion during the time of the move $T_s = T_1 + T_2 + T_M$ (the term $T_M$ being applicable for long moves).

Thus, in FIGS. 18 and 19, the term $\Delta\theta_{dyn.}$ corresponds to the area between the velocity equal to zero base line and the $\dot{\theta}N$ line. Further, the total positional change $\Delta\theta_{TOTAL}$ for each axis is equal to the integral of the velocity profile with respect to time and $\Delta\theta N_s$ is equal to the integral of the velocity profile with respect to time with the zero velocity axis translated to the $\dot{\theta}N$ line. For a short move defined by points 1-5-6 in FIG. 18, $\Delta\theta_s$ is equal to the area above the $\dot{\theta}_N$ horizontal line represented by the designated areas $B_1 + C_1 + E_1$ minus the area below the $\dot{\theta}N$ line represented by the area $D_1$; $\Delta\theta_s = [B_1 + C_1 + E_1 - D_1]$.

A movement described by the velocity profile from point 1, at the $\dot{\theta}$N-1 starting velocity, through points 5, 5' and 6' and ending at the finish velocity $\dot{\theta}_N$ defines a long move for a $+\Delta\theta N_s$ operation; the long move including acceleration at $+a_{MAX}$ from points 1 to 5, movement at the maximum velocity $V_{MAX}$ from points 5 to 5, and maximum deceleration from points 5' to 6' to finish at the velocity $\dot{\theta}_N$ at the finish point $\theta N$. Similarly, all moves other than the largest moves are also graphically defined such as a shorter $+\Delta\theta N_s$ move from points 1 to 5 to 6 including maximum acceleration from 1 to 5 and maximum deceleration from 5 to 6 with no span of maximum velocity movement.

Thus, the region between points 5 and 5' is bounded by the largest short move ending at point 6 and the longest move ending at point 6' with all long moves between these bounds including $+\Delta\theta N_s$ long movements that are greater than the longest of the short moves. Similarly, the short move range for $+\Delta\theta N_s$ movement is defined by the region between points 3 and 5. The region between points 3 and 3' defines short moves down to the minimum ramp times of $T_1$ and $T_2$. The lower portion of FIG. 18 defines the bounds for $-\Delta\theta N_s$ moves from short moves between points 7 and 8 to long moves between points 8 and 8'.

The intermediate axis predict approach establishes the solutions for all Case I movements including long and short moves and $+\Delta\theta N_s$, $-\Delta\theta N_s$ and zero $\Delta\theta N_s$ movements by defining region solutions based on the bounds of the various moves and movements. Thus, the intermediate axis predict method in the teach-assist computer 34 includes the solutions for all moves by a respective set of region relationships. When the $\Delta\theta N_s$ of the desired move are calculated, the appropriate set of region relationships for the region defined by $\Delta\theta N_s$ is utilized to solve the projected movement solution for each axis to determine the critical or limit axis and the minimum execution time is defined by the critical axis. Next, the appropriate parameters to define the move are determined for all axes utilizing the calculated minimum execution time for the critical axis.

Considering the Case I solution for FIG. 18, the following graphically designated regions are defined for a complete solution of all movements:

| Regions | Bounded by Points |
|---|---|
| Region 1 | 3'-4-7'-1 |
| Region 2 | 3'-3-4 |
| Region 3 | 3-5-6-4 |
| Region 4 | 1-7'-7 |
| Region 5 | 7-4-11'-8 |
| Region 6 | 5-5'-6'-6 |
| Region 7 | 8-11'-11''-8' |

The following Table is utilized to define the region solutions at the bounds between the regions in terms of the designated areas of FIG. 18, the designated areas being defined as shown:

| Regions | Bounds Between Regions- Case I $(B_{a-b})_1$ | Limit Valves of $\Delta\theta N_s$ at Region Bounds |
|---|---|---|
| Long Moves-positive slope $T_1$ ↑ | | |
| REGION 6 | | |
| --- | ←$(B_{3-6})_1$→ | $B_1 + C_1 + E_1 - D_1$ |
| REGION 3 | | |
| --- | ←$(B_{2-3})_1$→ | $B_1 + C_1 - D_1$ |
| REGION 2 | | |
| --- | ←$(B_{1-2})_1$→ | $B_1 - D_1$ |
| REGION 1 | | |
| --- | ←$(B_{4-1})_1$→ | $-[A_1 + B_1 + D_1]$ |
| REGION 4 | | |
| --- | ←$(B_{5-4})_1$→ | $-[A_1 + B_1 + C_1 + D_1]$ |
| REGION 5 | | |
| --- | ←$(B_{7-5})_1$→ | $-[A_1 + B_1 + C_1 + D_1 + F_1]$ |
| REGION 7 | | |
| ↓ Long Moves-negative slope $T_1$ | | | where $A_1 = 2T_{32}[\dot\theta_N - \dot\theta_{N-1}]$ $B_1 = T_{32}^2 a_{MAX} + \frac{1}{2}(T_{32}\dot\theta_{N-1}) - \frac{1}{2}(T_{32}\dot\theta_N)$ $C_1 = \frac{1}{2}(T_{32}\dot\theta_N) - \frac{1}{2}(T_{32}\dot\theta_{N-1})$ $D_1 = \frac{1}{2a_{MAX}}[\dot\theta_N - \dot\theta_{N-1}]^2$ -continued

| Regions | Bounds Between Regions- Case I $(B_{a-b})_1$ | Limit Valves of $\Delta\theta N_s$ at Region Bounds |
|---|---|---|

$E_1 = \frac{[\dot\theta_{MAX} - \dot\theta_N]^2}{a_{MAX}} - a_{MAX}T_{32}^2$ $F_1 = 2\left[\left(\frac{\dot\theta_{MAX} - \dot\theta_N}{a_{MAX}} - T_{32}\right)(\dot\theta_N - \dot\theta_{N-1})\right] +$ $\frac{(\dot\theta_{N-1} + \dot\theta_{MAX})^2}{a_{MAX}} - a_{MAX}T_{32}^2$ where $T_{32}$ represents one embodiment where the minimum time for the shortest move is set to the projected time to traverse 32 basic displacement units.

Utilizing the above relationships results in Region solutions for moves in the respective region as follows:

REGION 1

$T_1 = T_{32} + \frac{[\dot\theta_N - \dot\theta_{N-1}]}{2a_{MAX}}$ $T_2 = T_{32} + \frac{[\dot\theta_N - \dot\theta_{N-1}]}{2a_{MAX}}$

REGION 2

$T_1 = \frac{\Delta\theta N_s + D_1}{T_{32}a_{MAX}} - \frac{[\dot\theta_{N-1} - \dot\theta_N]}{a_{MAX}}$ $T_2 = 2T_{32} - \frac{[\Delta\theta N_s + D_1]}{T_{32}a_{MAX}}$

REGION 3

$T_1 = \left[\frac{\Delta\theta N_s + D_1}{a_{MAX}}\right]^{\frac{1}{2}} + \frac{[\dot\theta_N - \dot\theta_{N-1}]}{a_{MAX}}$ $T_2 = \left[\frac{\Delta\theta_s + D_1}{a_{MAX}}\right]^{\frac{1}{2}}$

REGION 4

$T_1 = 2T_{32} + \left[\frac{\Delta\theta N_s + D_1 + A_1}{T_{32}a_{MAX}}\right]$ $T_2 = \frac{\dot\theta_N - \dot\theta_{N-1}}{a_{MAX}} - \left[\frac{\Delta\theta N_s + D_1 + A_1}{T_{32}a_{MAX}}\right]$

REGION 5

$T_1 = -\frac{[\dot\theta_N - \dot\theta_{N-1}]}{a_{MAX}} \pm$ $\frac{1}{2}\Bigg(\left[\frac{2(\dot\theta_N - \dot\theta_{N-1})}{a_{MAX}}\right]^2 -$ $$\left. \frac{4(D_1 + \Delta \theta N_s)}{a_{MAX}} \right\}^{\frac{1}{2}}$$

$$T_2 = T_1 + \frac{(\dot{\theta}_N - \dot{\theta}_{N-1})}{a_{MAX}}$$

REGION 6

$$T_1 = \frac{\dot{\theta}_{MAX} - \dot{\theta}_{N-1}}{a_{MAX}}$$

$$T_2 = \frac{\dot{\theta}_{MAX} - \dot{\theta}_N}{a_{MAX}}$$

$$T_M = \frac{\Delta \theta N_s - B_1 - C_1 - E_1 - D_1}{(\dot{\theta}_{MAX} - \dot{\theta}_N)}$$

REGION 7

$$T_1 = \frac{\dot{\theta}_{N-1} + \dot{\theta}_{MAX}}{a_{MAX}}$$

$$T_2 = \frac{\dot{\theta}_N + \dot{\theta}_{MAX}}{a_{MAX}}$$

$$T_M = \frac{-[\Delta \theta N_s + D_1 + A_1 + B_1 + C_1 + F_1]}{\dot{\theta}_N + \dot{\theta}_{MAX}}$$

Thus utilizing the relationships hereinbefore for Case I, the $\Delta\theta N_s$ for a particular move is utilized to select one of the appropriate set of REGION relationships in the REGION sets 1 to 7. The respective time components $T_1$, $T_2$ and $T_M$ (if applicable) are obtained for each axis to determine the limit axis and the respective minimum execution time. Then, the move parameters defining the move are obtained for each of the axes based on the minimum execution time as discussed hereinbefore in connection with the simplified axis predict.

Similarly for the Case II situation and referring to FIG. 19, the following relationships define the graphic representation and region solutions:

| Region | Bounded by Points |
|---|---|
| Region 1 | 1-2-7-4 |
| Region 2 | 1-3-2 |
| Region 3 | 3-5-8-7 |
| Region 4 | 4-7-6 |
| Region 5 | 6-7-9-10 |
| Region 6 | 5-5'-8'-8 |
| Region 7 | 9-9'-10'-10 |

| Regions | Bounds Between Regions- Case II $(B_{a-b})_2$ | Limit Valves of $\Delta\theta N_s$ at Region Bounds |
|---|---|---|
| Long Moves- positive slope $T_1$ ↑ | | |
| REGION 6 | | |
| --- | ←$(B_{3-6})_2$→ | $A_2 + B_2 + C_2 + D_2 + E_2$ |
| REGION 3 | | |
| --- | ←$(B_{2-3})_2$→ | $A_2 + B_2 + C_2 + D_2$ |
| REGION 2 | | |
| --- | ←$(B_{1-2})_2$→ | $A_2 + B_2 + D_2$ |
| REGION 1 | | |
| --- | ←$(B_{4-1})_2$→ | $D_2 - B_2$ |
| REGION 4 | | |
| --- | ←$(B_{5-4})_2$→ | $D_2 - B_2 - C_2$ |
| REGION 5 | | |
| --- | ←$(B_{7-5})_2$→ | $D_2 - B_2 - C_2 - F_2$ |
| REGION 7 ↓ Long Moves- negative slope $T_1$ | | | where $$A_2 = 2T_{32}[\dot{\theta}_{N-1} - \dot{\theta}_N]$$

$$B_2 = T_{32}^2 a_{MAX} + \frac{1}{2}(T_{32}\dot{\theta}_{N-1}) + \frac{1}{2}(T_{32}\dot{\theta}_N)$$

$$C_2 = \frac{1}{2}(T_{32}\dot{\theta}_{N-1}) - \frac{1}{2}(T_{32}\dot{\theta}_N)$$

$$D_2 = \frac{1}{2a_{MAX}}(\dot{\theta}_{N-1} - \dot{\theta}_N)^2$$

$$F_2 = \frac{(\dot{\theta}_{MAX} + \dot{\theta}_N)^2}{a_{MAX}} - a_{MAX}T_{32}^2$$

$$E_2 = 2\left[\left(\frac{\dot{\theta}_{MAX} - \dot{\theta}_{N-1}}{a_{MAX}} - T_{32}\right)(\dot{\theta}_{N-1} - \dot{\theta}_N)\right] +$$

$$\frac{(\dot{\theta}_{MAX} - \dot{\theta}_{N-1})^2}{a_{MAX}} - a_{MAX}T_{32}^2$$

REGION 1

$$T_1 = T_{32} + \frac{1}{2a_{MAX}}(\dot{\theta}_{N-1} - \dot{\theta}_N)$$

$$T_2 = T_{32} + \frac{1}{2a_{MAX}}(\dot{\theta}_{N-1} - \dot{\theta}_N)$$

REGION 2

$$T_1 = 2T_{32} - \left[\frac{\Delta\theta N_s - D_2 - A_2}{a_{MAX}T_{32}}\right]$$

$$T_2 = \frac{\Delta\theta N_s - D_2 - A_2}{a_{MAX}T_{32}} + \left[\frac{\dot{\theta}_{N-1} - \dot{\theta}_N}{a_{MAX}}\right]$$

REGION 3

$$T_1 = -\frac{1}{a_{MAX}}(\dot{\theta}_{N-1} - \dot{\theta}_N) \pm$$

$$\frac{1}{2}\left\{\left[\frac{2}{a_{MAX}}(\dot{\theta}_{N-1} - \dot{\theta}_N)\right]^2 - \frac{4}{a_{MAX}}(D_2 - \Delta\theta N_s)\right\}^{\frac{1}{2}}$$

$$T_2 = T_1 + \frac{1}{a_{MAX}}(\dot{\theta}_{N-1} - \dot{\theta}_N)$$

-continued

| Regions | Bounds Between Regions- Case II $(B_{a-b})2$ | Limit Valves of $\Delta\theta N_s$ at Region Bounds |
|---|---|---|

REGION 4

$$T_1 = \frac{D_2 - \Delta\theta N_s}{T_{32}\, a_{MAX}} + \frac{1}{a_{MAX}}(\dot{\theta}_{N-1} - \dot{\theta}_N)$$

$$T_2 = 2T_{32} - \left[\frac{D_2 - \Delta\theta N_s}{T_{32}\, a_{MAX}}\right]$$

REGION 5

$$T_1 = \left(\frac{D_2 - \Delta\theta N_s}{a_{MAX}}\right)^{\frac{1}{2}} + \frac{1}{a_{MAX}}(\dot{\theta}_{N-1} - \dot{\theta}_N)$$

$$T_2 = \left(\frac{D_2 - \Delta\theta N_s}{a_{MAX}}\right)^{\frac{1}{2}}$$

REGION 6

$$T_1 = \frac{1}{a_{MAX}}(\dot{\theta}_{MAX} - \dot{\theta}_{N-1})$$

$$T_2 = \frac{1}{a_{MAX}}(\dot{\theta}_{MAX} - \dot{\theta}_N)$$

$$T_M = \left[\frac{\Delta\theta N_s - (A_2 + B_2 + C_2 + D_2 + E_2)}{(\dot{\theta}_{MAX} - \dot{\theta}_N)}\right]$$

REGION 7

$$T_1 = \frac{1}{a_{MAX}}(\dot{\theta}_{N-1} + \dot{\theta}_{MAX})$$

$$T_2 = \frac{1}{a_{MAX}}(\dot{\theta}_N + \dot{\theta}_{MAX})$$

$$T_M = \left[\frac{(-\Delta\theta N_s + D_2 - B_2 - C_2 - F_2)}{(\dot{\theta}_N + \dot{\theta}_{MAX})}\right]$$

As discussed hereinbefore, after the appropriate set of REGION relationships are selected on the basis of $\Delta\theta N_s$, the minimum execution time $T_s = T_1 + T_2 + T_M$ is determined for each axis to determine the axis requiring the greatest execution time. With the limit axis determined; the corresponding $T_s$ minimum execution time is utilized for the particular move from N-1 to N with the appropriate manipulator arm path parameters representing the projected movement as discussed hereinbefore being calculated and stored for each axis for use in on-line playback to reconstruct the projected movement.

REFINED AXIS PREDICT

Figure 20:
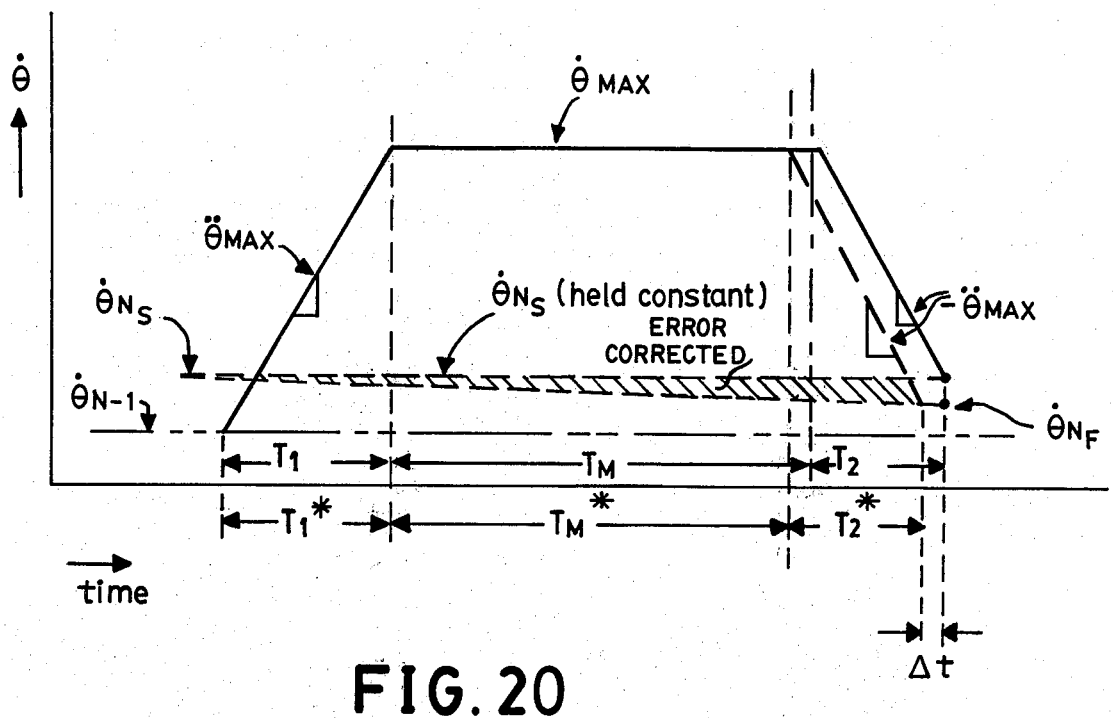
FIGS. 20 and 21 are diagrammatic representations of a velocity profile illustrating a refined axis predict method of the present invention.

The refined axis predict method is an enhancement of the intermediate axis predict method that is performed by utilizing the comprehensive solution for all moves defined in the region solution of the intermediate axis predict method and further calculates the dynamic parameters and minimum execution time of each move by taking account of the sloped nature of the $\dot{\theta}_N$ characteristic from point (N-1) to point N rather than assuming a horizontal characteristic for $\dot{\theta}_N$ over the move or in the intermediate axis predict method. The sloped characteristic of $\dot{\theta}_N$ is illustrated in FIG. 20 and in exaggerated form in FIG. 12B as the line connecting $\dot{\theta}N_s$ and $\dot{\theta}_{NF}$ relative to the horizontal line of $\dot{\theta}N_s$. This results in more accurate calculations of the dynamic parameters to maintain the dynamic parameters within the correct maximum limits and also results in a further optimization of the minimum execution time for each move. For example, the intermediate axis predict method that assumes a horizontal or flat $\dot{\theta}N$ characteristic will distribute a small position error over the move by introducing small errors in the peak velocity during the $T_M$ step of long moves and acceleration errors and velocity error of as much as +5% could result. With the refined axis predict method accounting for a measurement of the sloped $\dot{\theta}N$ characteristic, the velocity and acceleration errors (departures from desired parameters) can be reduced to less than 1% as dependent on the complexity of the measurement of the $\dot{\theta}N$ characteristic in the refined axis predict method. However, the additional complexities in the off-line calculations for the refined axis predict method may not be preferred for all practical manipulator operation. Thus, the refined axis predict method will either lengthen or shorten the total execution time relative to the intermediate axis predict method to a slight degree as dependent on the sign on the $\dot{\theta}N$ characteristic and further will very accurately maintain the velocity and acceleration of the limit axis to the maximum dynamic parameters.

The refined axis predict method proceeds as in the intermediate axis predict method to determine the $T_1$, $T_2$ and $T_M$ execution times. Next, the determined $T_1$, $T_2$ and $T_M$ values are utilized to define the projected manipulator arm positions while also determining a value for $\dot{\theta}_{NF}$ by the numerical differentiation technique discussed in the simplified axis predict method and shown in FIG. 13A. Then, the refined axis predict method generates an accurate estimate for the slope of the $\dot{\theta}_N$ characteristic by means of the relationship:

$$\ddot{\theta}_N = \frac{\dot{\theta}_{NF} - \dot{\theta}_{NS}}{T_1 + T_M + T_2}$$

Next, the refined axis predict method utilizes the following relationship to provide more accurate execution times $T_1^*$, $T_M^*$ and $T_2^*$ relative to the original estimated $T_1$, $T_M$ and $T_2$ execution times resulting from the original calculation via the intermediate axis predict method:

$$\dot{\theta}N(t) = \dot{\theta}N_s + \ddot{\theta}N \cdot t$$

where the parameter t corresponds to the number of projected time units based on the execution time of the move at projected conveyor velocity; i.e. t corresponds to the projected execution time of the move at projected conveyor velocity and in terms of the basic displacement units or LSD units of conveyor position. Referring to FIG. 20, the execution time $T_1^* + T_M^* T_2^*$ for the refined axis predict method is less than the execution time $T_1 + T_M + T_2$ determined by the intermediate axis predict method as denoted by $\Delta t$. Further, a representation of the error corrected by the refined axis predict method is illustrated by the hatched area between the sloped $\dot{\theta}N$ characteristic and the horizontal $\dot{\theta}N$ equal to a constant line.

Although the refined axis predict method is discussed in connection with improving the results of the intermediate axis predict method, it should also be understood that other axis predict methods can also be improved by the approach of the refined axis predict method including the simplified axis predict method.

MODIFIED AXIS PREDICT

The modified axis predict method involves an approach that yields approximately the same accuracy as the refined axis predict method but differs from the intermediate axis predict and the refined axis predict methods in that the modified axis predict method involves more complex individual solutions for the different moves while the intermediate axis predict and the refined axis predict encompass a comprehensive solution for all moves by somewhat more simple region solution sets.

Considering now the modified axis predict method, the calculations and the basic approach is similar to the simplified axis predict method except that the quantities $T_1$ and $T_2$ are not set equal and the slope of the velocity $\dot\theta N$ from $\dot\theta N_s$ to $\dot\theta N_F$ is considered. The following relationships define the approach to calculating $T_1$ and $T_2$ for the short move analysis:

$$T_2 = K_1 \cdot T_1 + K_2 \tag{45}$$

$$K_1 = \frac{[a_{MAX} - \ddot\theta_N]}{[a_{MAX} + \ddot\theta_N]} \tag{46}$$

$$K_2 = \frac{[\dot\theta_{N-1} - \dot\theta_{Ns}]}{a_{MAX} + \ddot\theta_N} \tag{47}$$

$$aT_1^2 + bT_1 + c = 0 \tag{48}$$

Where:

$$(a) = [\tfrac{1}{2}\ddot\theta_N + \ddot\theta_N K_1 + \tfrac{1}{2}\ddot\theta_N K_1^2 - \tfrac{1}{2}a_{MAX} - a_{MAX}K_1 + \tfrac{1}{2}a_{MAX}K_1^2] \tag{49}$$

$$(b) = [\dot\theta_{Ns} + \dot\theta_{Ns}K_1 + \ddot\theta_N K_2 + \ddot\theta_N K_1 K_2 - \dot\theta_{(N-1)F} - \dot\theta_{(N-1)F}K_1 + a_{MAX}K_1K_2 - a_{MAX}K_2] \tag{50}$$

$$(c) = [\Delta\theta_S + \dot\theta_{Ns}K_2 + \tfrac{1}{2}\ddot\theta_N K_2^2 - \dot\theta_{(N-1)F}K_2 + \tfrac{1}{2}a_{MAX}K_2^2] \tag{51}$$

For the long move analysis, the folllowing relationships are utilized:

$$T_1 = \frac{[\dot\theta_{MAX} - \dot\theta_{(N-1)F}]}{a_{MAX}} \tag{52}$$

$$T_2 = \frac{\left[\dot\theta_{MAX} - \dot\theta_{Ns} - \ddot\theta_N \frac{(\dot\theta_{MAX} - \dot\theta_{(N-1)F})}{a_{MAX}} - \ddot\theta_N T_M\right]}{a_{MAX} + \ddot\theta_N} \tag{53}$$

Where:

$$\tau_2 = K_1 \cdot T_M + K_2 \tag{54}$$

$$K_1 = \frac{[-\ddot\theta_N]}{a_{MAX} + \ddot\theta_N} \tag{55}$$

$$K_2 = \frac{\left[\dot\theta_{MAX} - \dot\theta_{Ns} - \frac{(\ddot\theta_N \dot\theta_{MAX})}{a_{MAX}} + \frac{(\ddot\theta_N \dot\theta_{(N-1)F})}{a_{MAX}}\right]}{a_{MAX} + \ddot\theta_N} \tag{56}$$

$$T_{(1K2)} = (T_1 + K_2) \tag{57}$$

$$T_{(M1K1)} = T_M(1 + K_1) \tag{58}$$

$$(a)\, T_{(M1K1)}^2 + (b)\, T_{(M1K1)} + c = 0 \tag{59}$$

$$(a) = \left[\tfrac{1}{2}\ddot\theta_N + \frac{a_{MAX}K_1^2}{2(1+K_1)^2}\right] \tag{60}$$

$$(b) = \left[\dot\theta_{Ns} + \ddot\theta_N T_{(1K2)} - \frac{\dot\theta_{MAX}}{(1+K_1)} + \frac{a_{MAX}K_1K_2}{(1+K_1)}\right] \tag{61}$$

$$(c) = [\Delta\theta_S + \dot\theta_{Ns}T_{(1K2)} + \tfrac{1}{2}\ddot\theta_N T_{(1K2)}^2 - \tfrac{1}{2}\dot\theta_{(N-1)F}T_1 - \tfrac{1}{2}\dot\theta_{MAX}T_1 - \dot\theta_{MAX}K_2 + \tfrac{1}{2}a_{MAX}K_2^2] \tag{62}$$

The time of the overall move $T_S = T_1 + T_2 + T_M$ may then be solved for each axis to determine the axis requiring the greatest execution time. The quantity $T_{(M1K1)}$ is calculated and then $T_M$ is found from equation (58). The quantity $T_2$ is then calculated from equation (54).

STATIC WORKPIECE PREDICT—COMPUTATION

Considering now the operation of the present invention for static workpiece operation, the work operation for the static workpiece is taught in the off-line teaching mode and off-line teach-assist apparatus 30 projects the target static workpiece work operation in terms of the maximum dynamic parameters of the manipulator arm for minimum work operation execution time without exceeding the maximum dynamic parameters of the manipulator arm. The off-line teach-assist apparatus 30 determines the manipulator arm trajectory at the maximum dynamic parameters of the manipulator arm in accordance with any of the predict methods discussed hereinbefore such as the Cartesian predict, the simplified axis predict, the intermediate axis predict, the refined axis predict, or the modified axis predict method.

The predict method for static workpiece operation is accomplished with the projected conveyor velocity set equal to zero for a stationary workpiece situation. This corresponds to the velocity profiles of FIGS. 4–6, 10–12, and 18–20 being altered by the zero velocity reference line being translated to the $\dot\theta_N$ line since the area below the velocity line of $\dot\theta_N$ represents the dynamic tracking portion of manipulator arm movement. In the static workpiece situation, the previous move velocity $\dot\theta_{N-1}$ is zero, the start velocity of a move $\dot\theta_{Ns}$ is zero, and the finish velocity $\dot\theta_{NF}$ is also zero since a stationary point is being acquired in the stationary workpiece situation rather than tracking and acquiring a moving point as in the moving workpiece situation. Thus, for the static workpiece operation, the off-line teach-assist apparatus 30 calculates a minimum execution time move from the point (N-1) to the point N with both points being stationary.

The simplified relationships for the stationary workpiece situation are listed as follows:

Short Move:
$$T_1 = T_2 = \left[\frac{\pm \Delta\theta N_s}{\pm a_{MAX}}\right]^{\tfrac{1}{2}}$$
$$T_M = 0$$

Long Move:
$$T_1 = T_2 = \frac{\pm \dot\theta_{MAX}}{\pm a_{MAX}}$$

-continued $$T_M = \frac{\pm \Delta\theta N_s - \left[\frac{\pm \dot{\theta}_{MAX}^2}{\pm a_{MAX}}\right]}{\pm \dot{\theta}_{MAX}}$$

Figure 21:
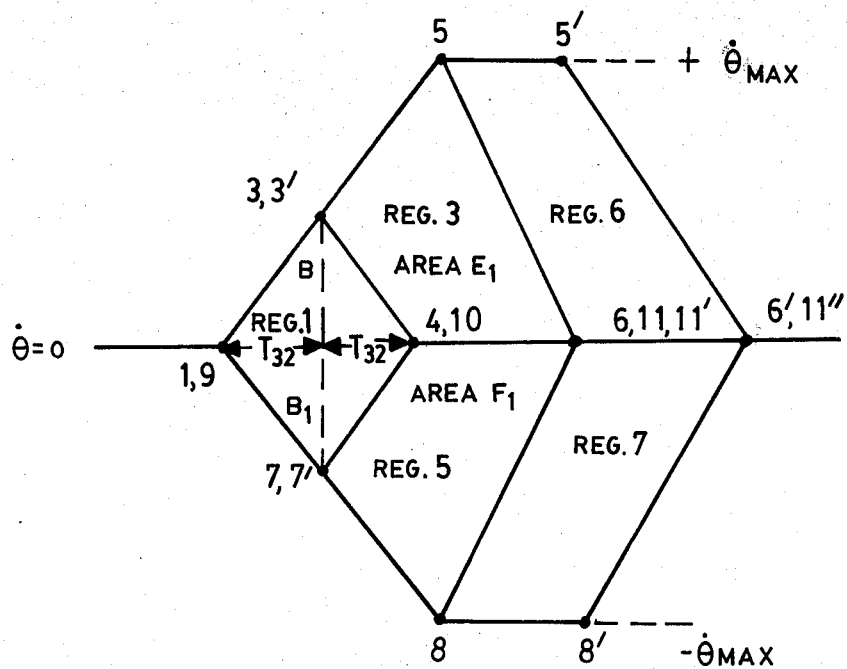

Considering the usage of the intermediate axis predict method for the static workpiece situation, the Case I and Case II representations of FIGS. 18 and 19 are simplified to the representation of FIG. 21 with a zero conveyor velocity, where $\dot{\theta}_{N-1} = \dot{\theta}_N = 0$. Further, the regions 2 and 4 are eliminated by simplification for the static case. Further the areas are defined as follows:

$A_1 = 0, C_1 = 0, D_1 = 0$ $B_1 = T_{32}^2 a_{MAX}$ $E_1 = \frac{(\dot{\theta}_{MAX})^2}{a_{MAX}} - a_{MAX} T_{32}^2$ $F_1 = \frac{(\dot{\theta}_{MAX})^2}{a_{MAX}} - a_{MAX} T_{32}^2$ and the region bounds are as follows:

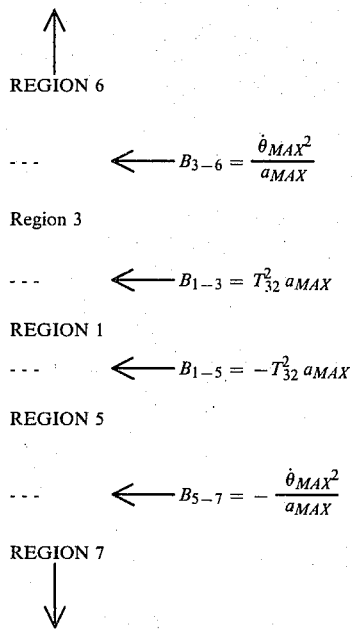

The Region solution relationships are simplified to result in the following:

REGION 1  $T_1 = T_2 = T_{32}$

REGION 3
$$T_2 = T_1 = \left[\frac{\Delta\theta N_s}{a_{MAX}}\right]^{\frac{1}{2}}$$

REGION 5
$$T_2 = T_1 = \left[\frac{-\Delta\theta N_s}{a_{MAX}}\right]^{\frac{1}{2}}$$

REGION 6
$$T_1 = T_2 = \frac{\dot{\theta}_{MAX}}{a_{MAX}}$$

$$T_M = \left[\frac{\Delta\theta N_s}{\dot{\theta}_{MAX}} - \frac{\dot{\theta}_{MAX}}{a_{MAX}}\right]$$

REGION 7
$$T_2 = T_1 = \frac{\dot{\theta}_{MAX}}{a_{MAX}}$$

$$T_M = -\left[\frac{\Delta\theta_s}{\dot{\theta}_{MAX}} + \frac{\dot{\theta}_{MAX}}{a_{MAX}}\right]$$

For the static workpiece situation, the stored program data calculated by the teach-assist computer 34 for storage in the memory 16 includes a calculated number of basic time units, $t_u$ units, for the execution of each move. For convenience and in a specific embodiment, the basic time unit utilized by the teach-assist computer 34 is the same as for the moving workpiece; i.e., the time at projected conveyor velocity for the conveyor to traverse 1 conveyor linear displacement unit (LSD units). As discussed hereinbefore, 1 LSD unit is 0.019563102 inches and at 6 inches per second for projected conveyor velocity the basic time unit, $t_u$, is equal to 3.2618 milliseconds.

This corresponds to 64 LSD units being traversed by the conveyor at the projected velocity of 6 inches per second in 0.208672 seconds as discussed in the section entitled Simplified Cartesian Predict and General Predict Considerations. In this way, the program of the teach-assist computer is capable of performing time and space precomputations for both the moving and static workpiece situations with the same basic parameters. However, it should also be understood that the teach-assist computer 34 for static workpiece operation could also be programmed to operate with basic timing unit parameters different than the specific parameters for moving workpiece operation.

Considering the alternate embodiment of the present invention for static workpiece operation, the foregoing relationships are utilized by on-line control apparatus that is similar in capabilities to the off-line teach-assist computer 34 wherein the work operation is taught during the off-line teaching mode by entering the static work points of the work operation and the on-line control apparatus utilizes the static taught work points and the foregoing relationships to control on-line manipulator arm trajectory to perform the work operation in minimum execution time at the maximum dynamic parameters of the manipulator arm.

TWIST SEQUENCE—OFF-LINE AND GENERAL

In accordance with other important aspects of the present invention, the teach-assist computer 34 is arranged to selectively calculate and project a predetermined twist sequence for the welding gun carried by the manipulator arm 11. The twist sequence in playback operation changes the orientation of the welding gun during the weld to reduce the probability of a weld gun stick wherein the welding gun tips stick or remain attached to the workpiece when the welding gun tips are programmed to open. The orientation change added by the twist sequence is in addition to any orientation change of the manipulator arm in accordance with the projected tracking of the weld point on the workpiece during the weld step.

The twist sequence in one specific embodiment programs a continuous twisting orientation of the welding gun in a first predetermined direction during each weld step and correspondingly programs a continuous twisting orientation in the opposite direction during the advance steps before and after each weld step. A predetermined desired twist angle is determined in accordance with welding parameters and practice. For example and referring to FIG. 8, a twist or change in orientation TW (in degrees) of the welding gun hand segment $h_4$ (defined by points S and T) by suitable movement of the point R and with the $h_4$ segment remaining fixed in position to accomplish a 10° orientation change for each one second of welding time is suitable to reduce the probability of a weld stick to the largest extent possible. Thus, for a typical 0.4 second welding step, TW equal to 4° change in orientation or twist of the $h_4$ segment defined by the points S and T by appropriate movement of the point R on the manipulator arm is calculated by the teach assist computer over the weld step. Further, a 4° change in orientation of the $h_4$ segment in the opposite direction is calculated during the advance steps between weld steps.

This is accomplished by calculating a $+TW/2$ twist orientation at the start of the weld step and a $-TW/2$ twist orientation at the end of the weld step. Thus, the welding gun during the advance steps between successive weld steps twists through a $-TW/2$ orientation to a $+TW/2$ orientation. During each weld step, the welding gun twists through a $+TW/2$ to a $-TW/2$ orientation relative to the static taught orientation.

For example, with the twist function active and referring to FIG. 13A, the teach assist computer performs a modification of the $/T_{N/ST}$ transform data to add a $+TW/2$ factor. To accomplish this, a decision block is provided in the program flow after the CONVERT BLOCK adjacent the reference marker C. The decision block interrogates the input data from the terminal 36 and the teach controls to decide IS THIS CP WELD? and IS TWIST FUNCTION ON? If the determination is NO, the program flow peoceeds to the TRANSLATE block. If the determination is YES, the program flow proceeds from the decision block to a CALCULATE block to modify the $/T_{N/ST}$ transform data by adding the twist orientation factor $+TW/2$ to obtain the modified transform data $/T_{N/ST}+TW/2$. Thus, in effect the data $/TN/ST+TW/2$ has been substituted for $/T_{N/ST}$.

The remaining program flow in FIG. 13A through the reference marker F then proceeds to operate on the modified data in the identical manner as discussed hereinbefore but with the twist factor added. The calculated, projected end point at the end of the advance steps and the start of the next weld then includes the $+TW/2$ twist orientation factor. The end point of the advance steps after a weld step N-1 as discussed hereinbefore corresponds to the start of the weld step N.

Similarly and referring now to the blocks after the reference marker F, after the CP WELD? decision block, another decision block is provided intermediate the CP WELD? decision block and the GET Tw AND GENERATE $/T_{M/CV+2T_1+TW}$ block. The added decision block performs the determination IS TWIST FUNCTION ON? If the determination is NO, the program flow proceeds to the adjacent GET TW and GENERATE $/T_{N/CV+2T_1+TW}$ block. If the determination is YES, the program flow proceeds to the CALCULATE block to modify the $/T_{N/ST}$ transform data to $/T_{N/ST}-TW/2$. The program flow then proceeds to the GET TW and GENERATE $/T_{N/CV+2T_1+TW}$ block. However, now the transform data $/T_{N/ST}-TW/2$ is utilized to obtain the data $/T_{N/N}-TW/2_{CV+2T_1+TW}$ in the next block and succeeding portions of the program. Thus, the end of the weld step N will include an orientation twist change of $-TW/2$ when the twist function is active.

In playback and in accordance with the data calculated during the teaching mode and stored in the memory 16, the welding gun is controlled to twist through an orientation from $+TW/2$ to $-TW/2$ between the end of each weld N-1 and the beginning of the next weld N. Further, the welding gun is controlled during each weld to twist through an orientation from $-TW/2$ at the beginning of each weld step to $+TW/2$ at the end of each weld step.

TRACK ALARM—OFF-LINE AND GENERAL

In accordance with further important aspects of the present invention, a track alarm sequence is calculated during the teaching mode and stored in the memory 16 for each weld step that is taught. In playback, the track alarm sequence is addressed for a respective weld step if a weld stick is detected a predetermined time interval ts after the end of a weld step. Thus, the manipulator memory 16 is jump-addressed to read out the track alarm sequence data corresponding to the weld step at which the weld stick is detected. Immediately after "stick" is detected in accordance with the track alarm sequence data calculated in the teaching mode and stored in the memory 16, the manipulator control apparatus outputs an external control signal to the conveyor control equipment to shut down the conveyor. The details of the track alarm sequence in playback will be discussed hereinafter.

The manipulator is then controlled in accordance with the track alarm sequence data rather than the normal work operation program to track the workpiece point at which the welding gun is struck. The work operation program in accordance with the data in the memory 16 would typically command the manipulator arm to move to the next weld point in the predetermined sequence of the work operation program. If this occurred during a weld stick condition, damage to the workpiece and/or the manipulator apparatus could be possible.

In a specific embodiment, the manipulator control memory 16 includes 512 addressed steps or program locations each of which having associated therewith 8 data words (as further explained in detail hereinafter in connection with TABLE I). A typical work operation program is assigned the address locations 0 to 255; 256 program steps. Thus, a work operation program including 48 welds, three advance steps for each weld or 144 steps and various other manipultor control steps is provided by this arrangement. For example, a typical work operation program includes 30 weld steps. The address locations 256 to 447 (192 steps) are assigned to the track alarm steps with four track alarm steps being assigned to each weld, 48 times 4. Thus, the steps or address locations 256-259 are associated with the first weld, the steps 260-263 are associated with the second weld and so forth.

During the teaching mode, the teach-assist computer 34 translates the projected manipulator arm position and workpiece position of the end point of each weld to calculate the four track alarm steps associated with each weld step. In accordance with the number of the weld step in the overall work program operations including a predetermined sequence of welds, the teach-assist computer 34 assigns the address location of the four track alarm steps for recording into memory 16 as discussed hereinbefore. The first track alarm step of each four step track alarm sequence is calculated as a PTPC step. This is accomplished by the teach-assist computer 34 by projecting or translating the calculated manipulator arm position and workpiece position corresponding to the end of the weld point being taught. The manipulator arm position and the workpiece position are translated in accordance with the projected workpiece displacement during a time interval equal to the sum of the time ts, the weld stick detect time in playback, plus a predetermined lead time $\Delta t$. Thus in playback, when a weld stick is detected at the time interval ts after the end of the weld step, the projected first track alarm step of the four step track alarm sequence will be addressed and utilized to command the arm to move to a point leading the arm by an amount equal to the projected distance moved by the workpiece in the time interval $\Delta t$; providing an advance tracking position.

The second, third and fourth track alarm steps of each track alarm sequence are programmed as CP (ACC=0) tracking steps to translate the manipulator arm position corresponding to the stick weld point in accordance with projected workpiece movement. The steps are calculated utilizing 256 interpolation intervals and a $K_v$ factor of $\frac{1}{2}$ to provide the largest possible tracking time (512 conveyor LSD step length) before the conveyor is shut down. This four step track alarm sequence provides approximately 5 seconds of tracking time at a projected workpiece velocity of six inches per second. This corresponds to approximately 30 inches of conveyor travel during the track alarm sequence.

In all the track alarm steps of each track alarm sequence, an operate external data bit OX is programmed at a predetermined control bit location (one of the C1-C10 bits in the Group Data Format Table I) to control the shut down of the conveyor control equipment in playback.

ESCAPE SEQUENCE—OFF-LINE AND GENERAL

In accordance with yet further important aspects of the present invention, a predetermined number of escape paths are taught and projected during the teaching mode corresponding to a respective number of designated program escape steps in the work operation program. The taught escape paths are recorded into the control memory 16 and utilized in playback to withdraw the manipulator arm from the workpiece area upon the actuation of an escape control after the program step is reached corresponding to the next designated escape step. A withdrawal or escape of the manipulator arm may be required in the discretion of an operator in the case of a workpiece conveyor malfunction or misalignment, obstruction in the workpiece area or undesirable behavior of the manipulator arm.

For example, in a specific embodiment eight escape paths are taught at eight respective program steps chosen by the teach operator. Each of the escape paths is assigned eight program steps or address locations in the 448-511 range of address locations. Typically, the eight escape paths are spaced approximately equally throughout the work operation program; for example every three to five welds to define escape zones.

In playback, after the escape control is actuated, and at the end of the next designated escape step in the program, the memory 16 is advanced or jump-addressed to the first escape path step in the escape path sequence corresponding to the designated escape step in the work operation program. The remaining seven escape path steps are then sequentially read out under the control of the manipulator control apparatus. The details of the escape path operation in playback will be described in detail hereinafter.

During the teaching mode, the operator selects a particular program step as a designated escape step by an input command to the terminal 36. The teach-assist computer 34 then programs an E/F escape flag in the data to be recorded in the control memory 16 to denote an escape flag data bit E/F when the data is read out in playback (bit position 15 of the Group 8 data in TABLE I). The teach operator at the designated escape step of the work operation program then proceeds to teach a series of escape path steps, eight if required, to teach a withdrawal of the manipulator arm from the projected position relative to the workpiece currently being taught in the work operation program.

As discussed hereinbefore, the teach operator may advance the conveyor during the teaching of the escape path steps in accordance with the normal collision and foreseeability criteria if required. In a specific embodiment, the first escape path step is taught and programmed as a PTPC step and the remaining escape path steps are taught as either PTPC steps or CP steps as will be explained in more detail hereinafter.

ON-LINE CONTROL APPARATUS

Figures 15A, 15B, 15C:
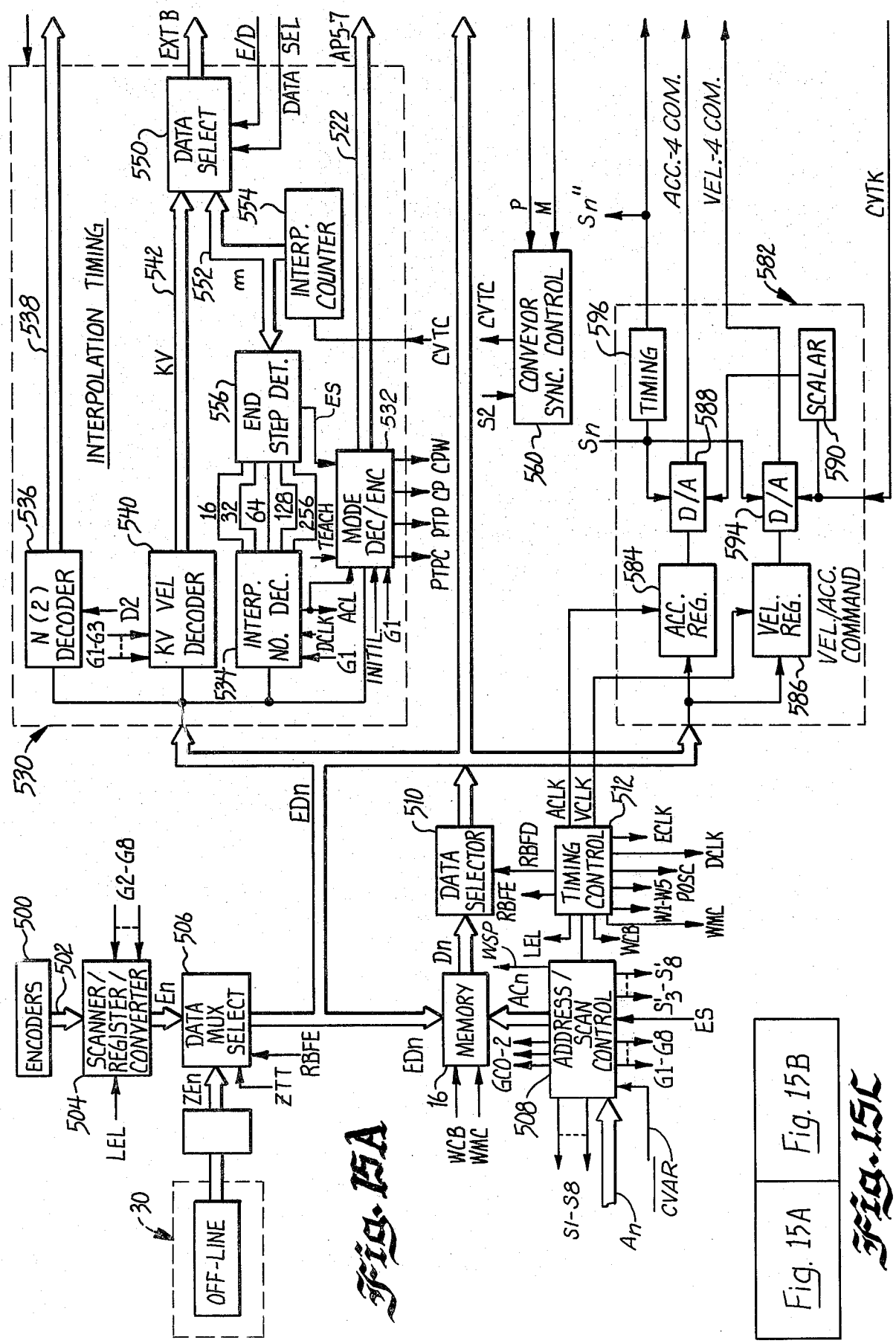
FIGS. 15A and 15B when assembled as shown in FIG. 15C are a logic and block diagram of the control circuitry of the present invention of FIG. 1.
Figure 15B:
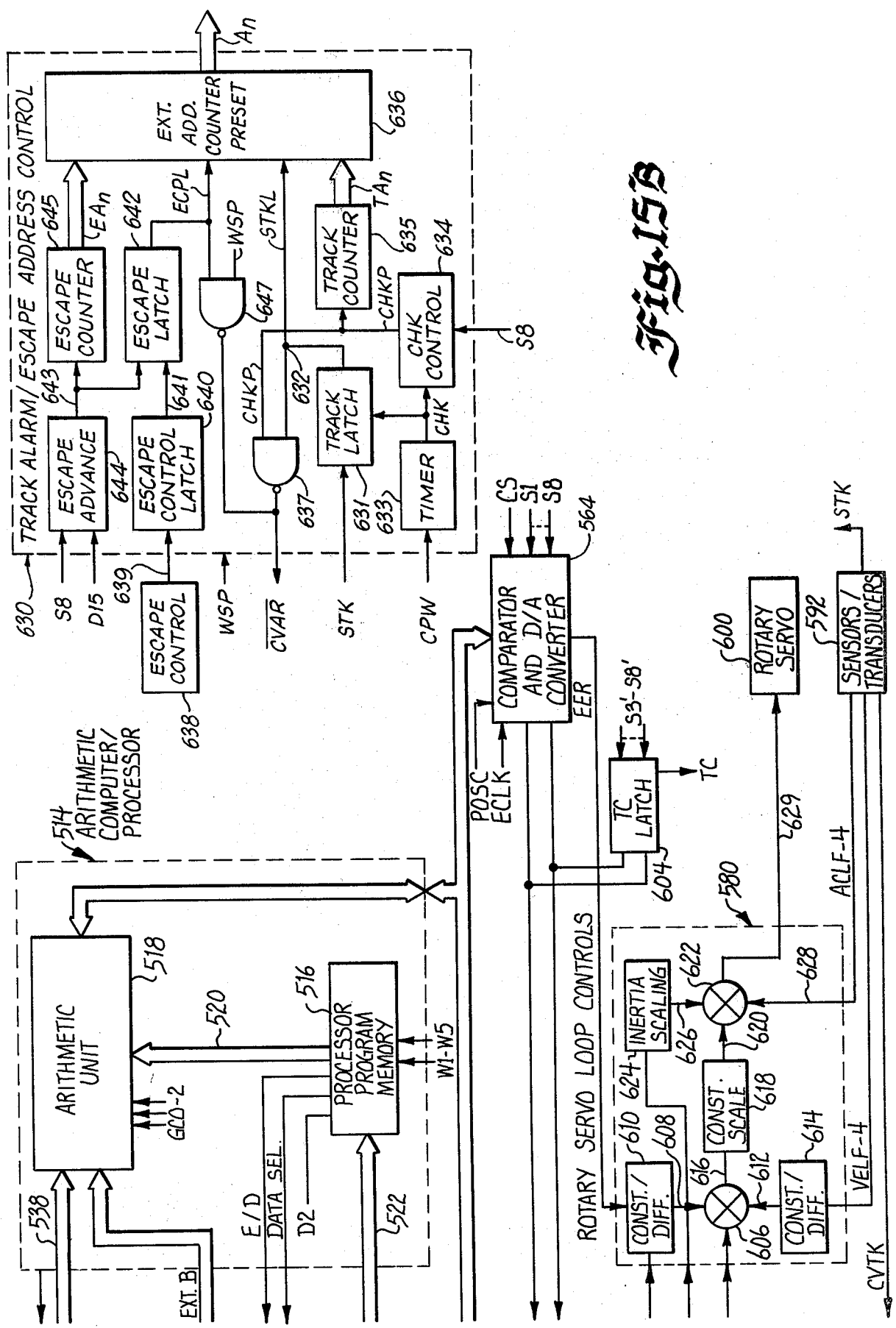
Figure 15:
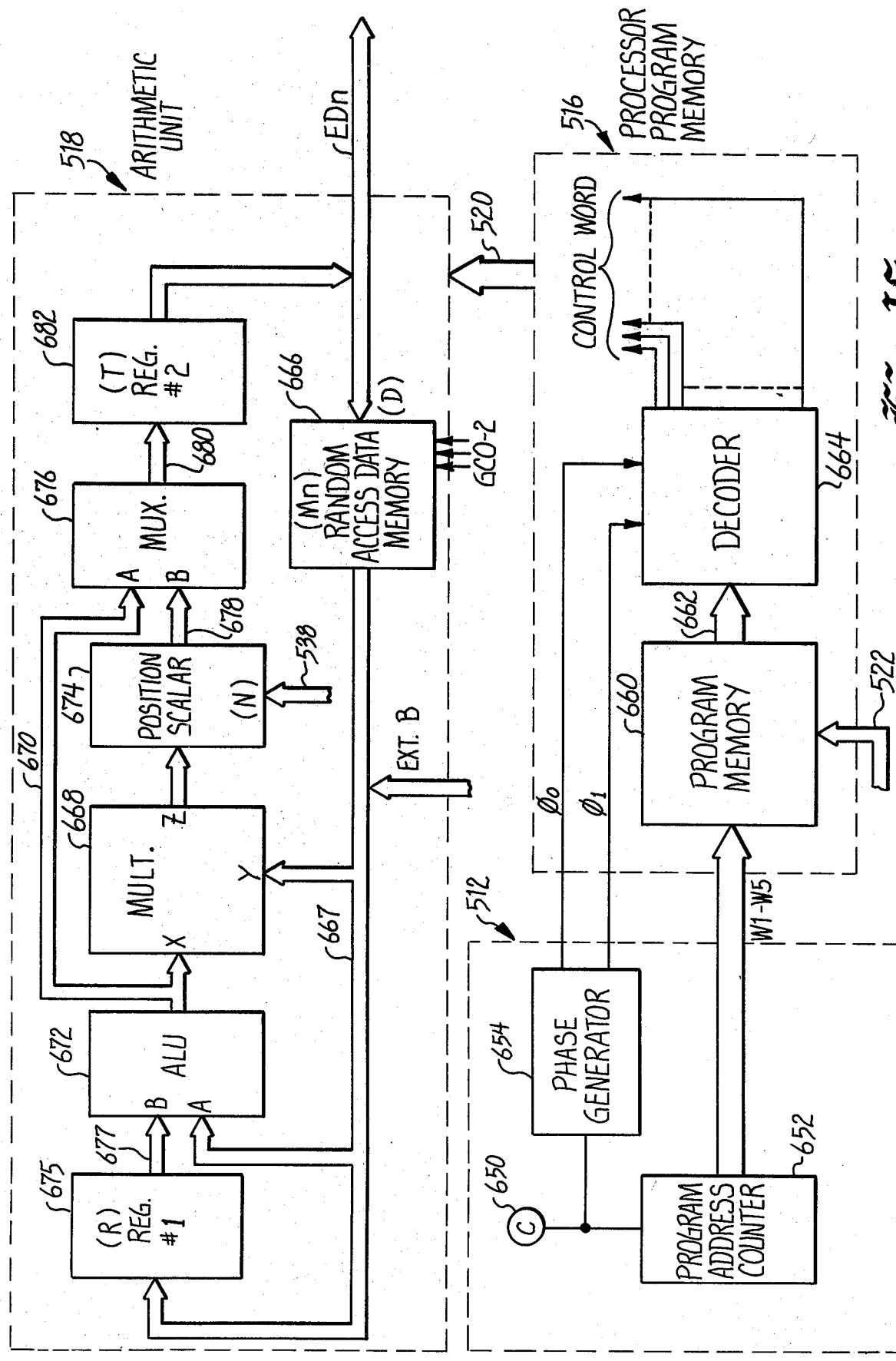

Considering now the on-line control apparatus 14 for moving workpiece operation and utilizing projected off-line predict data and referring to FIG. 15, the encoder apparatus for each of the control axes of the manipulator and the conveyor encoder 32 are referred to generally at 500. The encoders for each of the axes and the conveyor encoder 32 each generate an output signal representing the respective axis or conveyor position on a multiple number of data lines referred to generally at 502 as discussed in more detail in application Ser. Nos. 721,805 and 625,932.

The encoder output data 502 is connected to a scanner/register/converter stage 504 along with a group of system multiplex scan signals G2 through G8 referred to generally at 504.

An address and scan control stage 508 generates the multiplex group scan signals G1 through G8 by decoding a basic system clock signal. The signals GCO-2 are also generated by the address and scan control stage and represent the group multiplex scan intervals as a 3 bit coded signal. Each of the multiplex group scan interval signals Gn, n=1 through 8, is active during a respective sequential scan interval in each of the repetitive group scan cycles. Reference may be made to the aforementioned application Ser. Nos. 721,805 and 625,932 for a discussion of the group multiplex scan signals and the general operation of manipulator control apparatus of this general type.

The entire on-line control apparatus 14 is synchronized to the basic system clock and the group multiplex scan signals G1 through G8. Referring now to FIG. 17, the timing control stage 512 divides the basic system clock frequency and thus each of the multiplex scan signals Gn into 32 program time intervals according to the signal $W\phi_0$. The signal $W\phi_0$ is 32 times the frequency of the basic system clock. The signal $W\phi_0$ and the multiplex group scan signals Gn are utilized to generate the synchronous timing signals for the overall manipulator control circuitry as will be discussed in more detail hereinafter.

The scanner/register/converter stage 504 produces a multiplexed data output $E_n$ to a data select stage 506. Thus the encoder data for each of the axes and the conveyor are multiplexed and outputted to the data select stage 506 during a respective multiplex scan interval of the multiplex group scan signals G2 through G8.

The data generated by the off-line teach apparatus 30 during the off-line teaching mode is outputted on a data bus referred to generally at $ZE_n$. The data bus $ZE_n$ is connected to a second input of the data select stage 506. The data select stage 506 outputs either the $E_n$ data or the $ZE_n$ data determined by a data select input ZTT and a Request Encoder Data timing signal RBFE onto a main system data bus referred to generally at $ED_n$. Thus, in the off-line teaching mode, when data is to be inputted from the off-line teach apparatus 30 to either the main control memory 16 or to other control apparatus of the manipulator via the $ED_n$ bus, the ZTT data select signal is active to select the $ZE_n$ data input. The $ZE_n$ data is generated by the off-line apparatus 30 and arranged in the same multiplex format as the $E_n$ and the $ED_n$ data. The RBFE timing signal is generated by the timing control stage 512. The RBFE timing signal is active during the ninth through eleventh program time intervals of the $W\phi_0$ signal in each of the scan intervals G2 through G8 to output the data from the data select stage 506 to the $ED_n$ bus.

The memory 16 reads out or writes in data by address location and the memory address is controlled by an address data bus signal $AC_n$. The address data bus signal is generated by the address and scan control stage 508. The read and write modes of the memory 16 are controlled by a Memory Interrogate Timing signal WCB and a mode signal WMC generated by the timing control stage 52. The WCB timing signal (FIG. 17) is active during the second program time interval to read data out of the memory 16 onto a data bus $D_n$. The WCB timing signal also is active during the tenth program time interval to write data into memory from the $ED_n$ data bus with the presence of the WMC mode signal during the off-line teaching mode.

The $D_n$ data bus is connected to a data selector stage 510 that includes a buffer for transfer of the data read out of the memory 16 during the second program time interval. The data selector stage 510 is controlled by a Request Memory Data timing signal RBFD generated by the timing control stage during the second and third program time intervals. Thus, the data read out of the memory 16 onto the data bus $D_n$ during the second and third program time intervals is also transferred thru the buffer to the data select stage 510, and outputted to the $ED_n$ data bus during the second and third program time intervals.

Considering now the data format of the various data buses and the memory 16, TABLE I illustrates one particular data format:

TABLE I

| | | | | | | | BIT | | | | | | | | | MODE | 6 | 5 |
|---|---|---|---|---|---|---|---|---|---|---|---|---|---|---|---|---|---|---|
| | | | | | | | | | | | | | | | | PTP | 0 | 0 |
| | | | | | | | | | | | | | | | | PTPC | 0 | 1 |
| | | | | | | | | | | | | | | | | CP | 1 | 0 |
| GROUP | 15 | 14 | 13 | 12 | 11 | 10 | 9 | 8 | 7 | 6 | 5 | 4 | 3 | 2 | 1 | CPW | 1 | 1 |
| 1 CONTROL | TK2 | TK1 | C1 | C2 | C3 | C4 | K2 | ACC3 | ACC2 | M2 | M1 | E/P | N3 | N2 | N1 | N | 3 | 2 | 1 |
| 2 CONVEYOR | TK4 | TK3 | E13 | E12 | E11 | E10 | E9 | E8 | E7 | E6 | E5 | E4 | E3 | E2 | E1 | 16 | 0 | 0 | 0 |
| 3 SWIVEL | TK6 | TK5 | E13 | E12 | E11 | E10 | E9 | E8 | E7 | E6 | E5 | E4 | E3 | E2 | E1 | 32 | 0 | 0 | 1 |
| 4 ROTARY | E15 | E14 | E13 | E12 | E11 | E10 | E9 | E8 | E7 | E6 | E5 | E4 | E3 | E2 | E1 | 64 | 0 | 1 | 0 |
| 5 BEND | C5 | C6 | E13 | E12 | E11 | E10 | E9 | E8 | E7 | E6 | E5 | E4 | E3 | E2 | E1 | 128 | 0 | 1 | 1 |
| 6 UP-DOWN | C7 | C8 | E13 | E12 | E11 | E10 | E9 | E8 | E7 | E6 | E5 | E4 | E3 | E2 | E1 | 256 | 1 | 0 | 0 |
| 7 YAW | C9 | C10 | E13 | E12 | E11 | E10 | E9 | E8 | E7 | E6 | E5 | E4 | E3 | E2 | E1 | 32ACC | 1 | 0 | 1 |
| 8 IN-OUT | E/F | C11 | C12 | E12 | E11 | E10 | E9 | E8 | E7 | E6 | E5 | E4 | E3 | E2 | E1 | 64ACC | 1 | 1 | 0 |

The fifteen columns, referred to as bits and numbered one through fifteen, each identify a respective data bit position and data line. For example, the data on the buses $ED_n$, $D_n$, $E_n$ and each of the encoder outputs at 502 is arranged in a binary data format on fifteen data lines. The group column identifying the eight numbered rows refers to the multiplex scan interval sequence. Thus, during the first group multiplex scan interval G1, the row of data labeled CONTROL is presented on the fifteen line Dn data bus from the memory 16. Similarly the second through eighth rows are present on the data buses during the multiplex group scan intervals G2 through G8.

The encoders for the respective manipulator control axes in the third through eighth rows output the indicated positional representation data for the respective axes at 502. The swivel, bend, up-down, and yaw axes each include an encoder output having thirteen digital bits of positional information. The rotary axis includes a fifteen bit output and the in-out axis includes a twelve bit output. The conveyor encoder 32 generates a thirteen bit output representing the conveyor position. The encoder output bits are referred to as E1 through E13. For example, the control data group readout of memory during the G1 scan interval includes two mode bits M1 and M2 at locations 5 and 6. These two bits are decoded as shown in the insert table to Table I for the various operational modes discussed hereinbefore. The 1, 2 and 3 bit positions of the Control Group 1 include the coded bits N1, N2 and N3. The bits N1, N2 and N3 represent the number of interpolation intervals assigned to the particular step. The 14 and 15 bit positions during the G1, G2 and G3 scan intervals include the TK1-TK6 coded data bits to define the velocity constant Kv. The coded interpolation interval bit N3 is also utilized when a CP mode is decoded from the M1 and M2 bits to determine whether the step is a CP(ACC=0) or a CP(ACC≠0) step. A "one" in the N3 bit position during a decoded CP step denotes an acceleration step CP(ACC≠0) if the N1 and N2 bits are not both "zero". The 4 bit position in the control group 1 is an E/P bit that is decoded to signal an end of program step.

The on-line control apparatus 14 includes an arithmetic computer and processor stage 514 that performs the computations as discussed hereinbefore in connection with the on-line computations and control unit 18. The arithmetic computer and processor stage 514 includes a processor program memory 516 which has stored therein a formatted addressable series of program data words or control words. In a specific preferred embodiment, the control words include 16 data bit lines to address and control the functions of an arithmetic unit 518 of the arithmetic computer and processor unit 514. The control word data bus is referred to generally at 520. The specific format and control arrangement of the control word outputted on data bus 520 is discussed in more detail hereinafter in connection with the Table II and the details of the arithmetic computer and processor unit 514 of FIG. 16.

In a specific preferred embodiment, the processor program memory 516 includes stored therein a sequence program of 32 control words each having 16 bits and sequentially addressed by the W1 through W5 timing signals. Each sequence of 32 control words defines a specific operational mode as will be discussed in more detail in connection with Tables V and VI.

The processor program memory stage 516 includes five address signals W1 through W5. The W1 through W5 address signals are controlled by the timing control signals W1 through W5 respectively (FIG. 17). The W1 through W5 timing signals are generated by the timing control stage 512. The W1 through W5 timing signals are obtained at the respective divide by 2, 4, 8, 16 and 32 outputs of a divide by 32 counter. In addition to the W1 through W5 address signals, the processor program memory stage 516 also includes a three bit program mode address bus 522, AP5-7, to select the specified program mode or sequence. The program address signals AP5-7 are encoded from various coded signals as will be explained in detail hereinafter. Thus, the processor program memory 516 includes an eight-bit address, three program mode address signals on data bus 522 and five program address signals W1 through W5. For a particular program sequence selected on the program mode address bus 522, the 32 control words associated with the selected program mode are sequentially addressed by the timing data on the lines W1 through W5. The program mode address AP5-7 on data bus 522 remains constant during the sequential output of the 32 control words.

In a preferred embodiment, the arithmetic unit 518 includes a number of logic elements each of which is controlled by predetermined data bits of the control word on bus 520.

The EDn data bus is a bi-directional data bus with the directional state determined by the various timing signals discussed hereinbefore. The EDn data bus is connected to the arithmetic unit 518 and is also connected to an interpolation timing and mode decoding stage 530.

The interpolation timing and mode decoding stage 530 includes a mode decoder/encoder stage 532. The mode decoder/encoder stage 532 encodes the program address signals AP5-7 on the program mode address bus 522. The mode decoder/encoder stage 532 also decodes the playback mode signals PTPC, PTP, CP and CPW from the mode bits M1 and M2 on the EDn bus during the G1 scan time interval. A TEACH signal, an initialization signal, INITIL., an end of CP step signal ES, and an acceleration mode signal, ACL, are utilized as input signals by the mode decoder/encoder stage in addition to the mode bits M1 and M2 to generate the AP5-7 program mode address signals. The following AP5-7 program mode address signals are encoded on the data bus 522 in accordance with the inputs to the mode decoder/encoder stage 532:

| MODE | AP 7 | 6 | 5 |
|---|---|---|---|
| TEACH-INITIALIZE (TOP) | 0 | 0 | 0 |
| TEACH | 0 | 0 | 1 |
| PTP | 0 | 1 | 0 |
| ES (End of Interpolation Step) | 0 | 1 | 1 |
| CP (ACC = 0) | 1 | 0 | 0 |
| CP (ACC ≠ 0) | 1 | 0 | 1 |

The ACL signal is decoded by an interpolation interval number decoder stage 534. The ACL signal is decoded and generated when the interpolation interval coded bits N3, N2 and N1 are a "101" or a "110". As discussed hereinbefore, these codes represent a CP(ACC≠0) mode, an acceleration step. The interpolation interval number decoder stage 534 also decodes the information in the N3, N2 and N1 coded bits during the G1 scan interval to output the number of interpolation intervals assigned and coded for the particular program address step. In a specific embodiment, there are five predetermined number of interpolation intervals assigned to a particular step. The interpolation interval number decoder stage 534 generates a signal on one of five outputs 16, 32, 64, 128 or 256 in accordance with the information coded in the N3, N2 and N1 bits as shown in Table I.

An N(2) decoder stage 536 is provided to output the three data bits N3, N2 and N1 at a data bus 538 when a D2, divide by 2, input control signal is a low logic state. When the D2 control signal is a high logic level, the N(2) decoder 536 outputs the incremented N3, N2 and N1 code by adding a "1" to the inputted code. The D2 control input is a predetermined line or data bit of the 16 bit control word of the data bus 520. The data bus 538 is connected to the Arithmetic Unit 518. The Kv constant is decoded from the TK1-TK6 data bits during the G1, G2 and G3 multiplex scan intervals by a Kv velocity constant decoder stage 540. The Kv velocity constant decoder stage 540 generates a digital output on a data bus 542. The velocity constant data bus 542 is connected to one input of a data select stage 550. The second input 552 to the data select stage 550 represents the quantity m, the output state of an interpolation counter 554. The operation and structure of the interpolation counter 554 is explained in more detail in the aforementioned application Ser. Nos. 721,805 and 625,932.

The quantity m, represents the interpolation interval currently being generated in the series of assigned number of interpolation intervals. The data select stage 550 is controlled by the logic state of a data select signal DATA SEL. The data select signal DATA SEL is connected to a predetermined data bit of the control word on the data bus 520. An output enable data line E/D is connected to the data select stage 550. The data select stage 550 outputs the data from data bus 542 or data bus 552 on an output data bus EXT B dependent upon the logic state of the DATA SEL signal and the E/D signal. The data bus EXT B is connected to the arithmetic unit 518. In a specific embodiment, the EXT B bus is expanded from the 8 bit input on the buses 542 and 552 to a 15 bit output. Thus, the data select stage 550 includes a logic array to hold the number of expanded, unused data lines to a zero logic state when the EXT B data bus is active to output data as determined by the E/D control line from the control word bus 520.

The interpolation counter 554 in a specific embodiment is a divide by 256 counter with 9 binary state outputs determining the number m of the current interpolation interval on data bus 552. The output state m on the data bus 552 is also connected to an end of step detector 556. The number of interpolation interval signals, the 16, 32, 64, 128 and 256 outputs of the interpolation interval number decoder 534 are connected to a second data input of the end of step detector stage 556. The end of step detector 556 includes a logic gate array as described in more detail in the aforementioned application Ser. No. 721,805 to output an end of step signal ES when the output state of the data bus 552 representing the interpolation number m corresponds to the number of decoded interpolation intervals assigned to the current step. The interpolation counter 554 is reset a predetermined period of time after the end of step detector 556 detects an equality and generates an ES signal.

The interpolation counter 554 is advanced in count by a signal CVTC representing a conveyor coincidence signal. The conveyor coincidence signal CVTC is generated by a conveyor synchronization control stage 560. The conveyor synchronization control stage 560 is implemented by a number of logic gates and memory elements as further described in the aforementioned application Ser. No. 721,805. The conveyor synchronization control stage 560 generates a CVTC conveyor coincidence signal in accordance with the P and M signal inputs from a comparator and D/A converter stage 564.

The comparator and D/A converter stage 564 compares the present conveyor output signal from the arithmetic unit 518 in the CP mode on the $ED_n$ bus (or as read out of the memory 16 in a PTP or PTPC mode) with the conveyor encoder data generated by the conveyor encoder 32 in the G2 conveyor scan interval. When coincidence is detected by the comparator and D/A converter stage 564, the P and M signal lines are both a low logic state enabling the conveyor synchronization control stage 560 to generate a CVTC conveyor coincidence signal to the interpolation counter 554. The CVTC signal advances the output 552 of the interpolation counter 554 by one binary state. Thus the quantity m is advanced by one binary number. The conveyor synchronization control stage 560 is enabled during the S2 time interval (FIG. 17) at a predetermined point during the G2 scan interval.

The comparator and D/A converter stage 564 includes a buffer register stage that is loaded each scan interval Gn with the respective encoder data during the ninth through eleventh program timing intervals and latched during the eleventh program timing interval by an ECLK timing signal generated by the timing control stage 512. The position command signals generated by the arithmetic/processor unit 514 during each scan interval Gn are outputted on the EDn data bus during the 23rd program timing interval by a timing signal POSC generated by the timing control stage 512. The comparator and D/A converter stage 564 compares the respective positional command signals and the encoder signals during a command sample interval during the 24 through 32 program time intervals during each scan interval Gn. The comparator and D/A converter stage 554 also includes a D/A converter operating on a multiplex basis. The multiplexed analog output EER of the D/A converter 564 represents the analog result of the digital data comparison performed during each scan interval Gn. The multiplexed analog output EER of the D/A converter 564 is connected to six servo loop control stages one for each axis. For simplicity only the rotary servo loop control stage 580 is shown in FIG. 15. However, it should be realized that there are six such control stages.

The servo loop control stage 580 includes an acceleration command input signal ACC-4 COM and a velocity command signal input VEL-4 COM. The ACC-4 COM and the VEL-4 COM signals are generated by a velocity/acceleration command stage 582. There are six such velocity/acceleration commands demultiplexed and generated by the stage 582, one for each of the axes. The velocity/acceleration command stage 582 generates the ACC COM signals and the VEL COM signals from the data outputted to the EDn output bus from the arithmetic computer and processor unit 514.

The EDn data bus during the 12th program timing interval of each Gn scan interval (G4 for rotary) represents the acceleration command signal in digital form generated by the arithmetic unit 518. The $ED_n$ data bus during the 15th program timing interval represents the velocity command generated by the arithmetic unit 518. The $ED_n$ data bus is connected to the input of an acceleration register 584 and to the input of a velocity register 586. The acceleration register stage 584 is controlled by an ACLK acceleration timing signal generated during the 12th program timing interval by the timing control stage 512. The velocity register stage 586 is controlled by a VCLK timing signal generated during the 15th program timing interval by the timing control stage 512. The buffered output of the acceleration register 584 is connected to a multiplying D/A converter similar to the type described in the aforementioned application Ser. No. 721,805. The multiplying reference input to the D/A converter 588 is connected to the output of a scaler stage 590 that scales a conveyor tachometer input signal CVTK. The CVTK signal is generated by a conveyor tachometer included in a sensor/transducer stage referred to generally at 592. The CVTK signal is scaled by a factor to represent correct acceleration units, for example performing an x square function.

Similarly, the velocity register 586 is connected to a D/A converter 594 including the CVTK conveyor tachometer signal as a multiplying reference input. The D/A converters 588 and 594 are controlled to update the analog outputs by the Sn timing signal. Thus, the D/A converters 588 and 594 include respective, dedicated sample and hold stages for each of the six controlled axes and output a respective analog representation ACC COM and VEL COM of the digital command signals on the EDn bus in accordance with the present conveyor speed. A timing stage 596 is connected to the Sn timing signals to produce a delayed Sn″ timing signal for use by the rotary servo loop control stage 580 and other axes to insure the output of an unambiguous, stable ACC COM signal and a VEL COM signal before the EER, ACC COM and VEL COM signals are combined by the rotary servo loop control stage 580 and the other stages.

The rotary servo loop control stage 580, includes a loop combiner 606 having the VEL COM signal as one input. A second input 608 to the loop combiner 606 is generated at the output of a constant and differentiator stage 610. The input of the stage 610 is connected to the multiplexed and EER positional error signal. The stage 610 includes a sample and hold circuit to demultiplex the EER-4 positional error signal as controlled by the timing signal S4". The constant and differentiator stage 610 provides an appropriate loop scaling constant and a differentiator function. A third input 612 to the loop combiner 606 is generated at the output of a constant and differentiator stage 614. The input to the constant differentiator stage 614 is a velocity feedback signal VEIF-4 from the rotary axis. An appropriate respective velocity feedback signal VELF-n is provided for each of the other five controlled axes. The output 616 of the combiner 606 is connected through a loop constant and scaling stage 618 to the input 620 of a second loop combiner 622.

The acceleration command signal ACC COM is connected through an inertia scaling stage 624 where required as determined by the acceleration feedback signal. The output of the inertia scaling stage 624 is connected to a second input 626 of the second loop combiner 622. An acceleration feedback signal ACC-4 is connected to a third input 628 of the servo loop combiner 622. The output 629 of the second loop combiner 622 represents the composite acceleration, velocity, and position servo loop command signal connected to the servo valve stage 600.

The acceleration feedback signal ACLF may be obtained either by an accelerometer or by differentiating the VELF feedback signal as further discussed in copending application Ser. No. 732,977.

WELD STICK AND TWIST SEQUENCE-ON-LINE

To detect a weld gun stick during playback, the sensor/transducer stage 592 provides a detector signal output STK. The detector signal STK is generated by a sensor device a microswitch for example, connected to sense the position of the welding gun tips. For example if only one of the tips of the welding gun, as diagrammatically illustrated in FIG. 8, is movable to accomplish a weld at the point T and the other weld tip is fixed, then the sensor device is arranged to be actuated by the movable tip. If both tips of the welding gun are movable to accomplish a weld, then a sensor is provided on one or both of the tips.

When a weld is to be performed as determined by the data read out of the memory 16, the mode signal CPW and a predetermined number of the control bits C1-C10 are utilized as external control data bits OX to control the welding equipment and to close the welding tips of the welding gun. The CPW signal is active or a "high" data level during the weld step and returns to a "low" data level at the end of the weld.

The STK sensor signal is utilized to detect the weld tips sticking (not opening) after the end of a weld step when the welding tips have been commanded to open and the CPW signal is a "low" level. Typically, at this time in the work operation program, the manipulator arm in accordance with the stored data is commanded to move to the next weld point in the predetermined program sequence, steps 0–255, to accomplish the next programmed weld step. However, if a weld gun stick is detected by interrogation of the STK signal at a predetermined time interval ts after the end of the CPW weld step, the track alarm sequence in the memory 16 as discussed hereinbefore will be addressed. The manipulator control apparatus in accordance with the track alarm sequence data controls the manipulator arm 11 to continuously track the weld point at which the weld was just completed rather than attempting to move to the next programmed weld point thus avoiding damage to the workpiece and/or the manipulator arm. In alternate arrangements, various sensor devices are arranged to detect a weld stick condition other than by the position of the weld tips; e.g. by the continuity of the welding tips.

The weld stick detecting signal STK and the CPW welding mode signal are utilized by a track alarm/escape address control stage 630 to control the addressing of the memory 16 to read out the predetermined track alarm sequence corresponding to the weld point at which a weld stick is detected.

TRACK ALARM/ESCAPE SEQUENCE; ON-LINE

The track alarm/escape address control stage 630 includes a track alarm latch 631 that utilizes the STK signal and an interrogate timing signal CHK to generate a weld stick latched signal STKL at 632. The interrogate timing signal CHK is generated at the output of a timer 633 a predetermined time interval ts after the falling edge of the CPW signal (high to low transistion). Thus, the timing signal CHK is generated a time interval ts after the end of the current weld step. The track alarm latch 631 is set to output a stick latched signal STKL at 632 if a weld gun stick is detected (denoted by the STK signal) a time interval ts after the end of the current weld step.

A time interval of approximately 100 msec. for ts has been found suitable to allow adequate time for the welding gun tips to properly open after the end of the weld step if a stick condition is not present. The ts time interval provides adequate time for the manipulator arm to attempt to break the weld stick condition during the first 100 msec. interval of the advance step after the weld step.

The CHK interrogate timing signal is also connected to a CHK control stage 634 to generate a CHKP control pulse during the S8 timing signal interval. The CHKP timing signal is connected to advance the state of a track alarm sequence counter 635 on the falling edge of the CHKP signal. The track alarm sequence counter 635 is initialized at the start of the work program operation to a zero state and counts up to a digital stage of 47 in accordance with the completion of the weld steps.

For example, after the completion of the first weld step in the work operation program and the time interval ts, the track alarm sequence counter 634 is advanced to a one state on the falling edge of the CHKP signal. The track alarm sequence counter 634 provides a digital output signal TAn that is connected as an address signal to an external address preset stage 636. The STKL signal is also connected to the external address preset stage 636 as a data select signal. The external address preset stage 636 outputs a digital address counter signal An on a predetermined number of data address control lines, ten in a specific embodiment to control $2^9$ or 512 address locations. The An address counter data is utilized to preset the presetable address counter in the address/scan control stage 508. The presetable address counter as discussed hereinbefore and as described in more detail in the aforementioned application Ser. Nos. 721,805 and 625,932 generates the address data bus signal ACn that addresses the program step address location of the memory 16.

In accordance with the specific address location and program step assignment discussed hereinbefore, the track alarm sequence steps are arranged at the address locations 256 to 447 in sequences of four steps for each weld step of the program. The first track alarm sequence corresponds to the first weld step and is programmed in the 256 to 259 address location. Accordingly, the external address preset stage 636 is arranged to output a digital An address signal representing step 256 when the track alarm counter output TAn is a zero corresponding to the first weld.

Similarly, as the track alarm counter 635 is advanced after the completion of the first weld step to increment the output TAn by one digital state to a one, the output An of the external address preset stage 636 outputs a digital signal corresponding to 260. The program step 260 is the address location of the first track alarm step of the track alarm sequence for the second weld step. Similarly, as the track alarm counter advances to the second, third and fourth states after the second, third and fourth weld steps respectively, the An output is set to digital states corresponding to 264, 268 and 272 respectively.

The memory 16 is reset by a $\overline{CVAR}$ reset signal generated on the rising edge of the CHKP signal when a weld stick is detected. The $\overline{CVAR}$ signal is generated at the output of a 2 input NAND gate 637. The inputs to the NAND gate 637 are connected to the CHKP signal of the CHK control stage 634 and the STKL signal of the track alarm latch 631. For example, if a weld stick is detected at the end of the first weld step, after the time interval ts and before the track alarm counter 635 is advanced to the one state, the $\overline{CVAR}$ signal resets the memory 16 through memory control logic in the address/scan control stage 508 and the An signal presets the presettable address counter to 256. After the teach alarm counter 635 is advanced to the one state, the presettable address counter does not respond to the An data.

The second, third and fourth track alarm sequence steps, for example steps 257, 258 and 259 for a weld stick after the first weld step, are read out of the memory 16 in accordance with the manipulator control apparatus discussed hereinbefore. A WSP step advance signal is generated in accordance with the completion of a program step. The WSP signal is generated by the address/scan control stage 508 in response to a TC signal from the TC latch stage 604 for a PTP step or an ES signal from the end of step detector 556 for the PTPC, CP and CPW steps.

All track alarm steps as discussed hereinbefore include an operate external control data bit that is read out of the memory 16 and utilized by the conveyor control equipment to terminate operation of the conveyor.

The track alarm/escape address control stage 630 also includes the control arrangements to address the escape path sequences discussed hereinbefore in connection with the teaching mode.

An escape control stage 638 is provided to generate an output 639 when an operator personnel or supervisor actuates a manual escape control provided on the control panel of the manipulator apparatus. The escape control output signal at 639 is connected to the input of an escape control latch 640. The escape control latch 640 is set upon generation of the escape control signal at 639 and generates an escape control latched signal at 641 to one input of an escape latch 642. The escape latch 642 includes a second input at 643 from an escape advance stage 644. The escape advance stage 644 includes the S8 timing signal and the D15 data bit line of the $ED_N$ data bus as inputs. The D15 (see TABLE I) data bit position includes the E/F escape flag control bit to denote or mark an escape step as discussed hereinbefore.

The escape advance stage 644 generates an output at 643 to the escape latch 642 during the S8 timing interval upon detection of the E/F escape flag data bit. The escape latch 642 generates an ECPL escape latch signal upon the inputs at 643 and 641 being active. This condition corresponds to an escape flag step being detected and the escape control being actuated. The ECPL signal is connected to the external address preset stage 636 as an escape address data control signal. The output 643 of the escape advance stage 644 is also connected to the count or clock input of an escape counter 645.

The escape counter 645 is arranged to generate a digital output EAn representing the number of the escape step. In the specific embodiment discussed hereinbefore, there are eight escape steps arranged in the normal program steps 0-255 and thus the escape counter 645 is an eight state counter. The escape counter 645 is advanced on the falling edge of the escape advance signal at 643. The falling edge of the signal at 643 occurs at the end of the designated escape step being detected. Thus, the escape counter output EAn is a zero during the first designated escape step and advances to a one at the end of the first escape step.

The external address preset stage 636 is arranged to output an An signal representing the program step 448 when the ECPL signal is active and when the EAn output is a zero corresponding to the first designated or programmed escape step. When the EAn output is a one, the An signal represents the program step 456. Similarly, for the third through eight designated (E/F) escape steps, the An output is incremented by a factor of eight steps to address the appropriate first escape path step of the respective escape path sequences taught and recorded into the memory 16 during the teaching mode.

The ECPL signal is connected to one input of a two input NAND gate 647. The second input of the gate 647 is connected to the WSP step advance signal. The output of the gate 647 is connected to the $\overline{CVAR}$ memory reset signal. Thus, the memory 16 is reset at the end of the designated escape path step being detected assuming that the manual escape control has been actuated. The An signal presets the address counter of the address/scan control stage 508 to the first escape path step of the escape path sequence corresponding to the designated escape step that is currently being detected.

Briefly, and as discussed hereinbefore, if the manual escape control has been actuated, the memory 16 is preset or advanced to the first step of the appropriate escape path sequence when the next designated escape step in the normal work operation program including an E/F data bit is detected.

Considering a specific example, assume that the first designated escape step in the work operation program is step 25 for example and the second designated escape step is 50. If the manual escape control in the escape control stage 638 is actuated at any work operation program time during the playback of the steps 26 to 50, the memory 16 will be preset or jump-addressed to the first escape path step 456 of the second escape path sequence at the end of step 50, the second designated escape step. Once the escape path sequence is commenced, the taught escape path will be performed in accordance with the manipulator control apparatus and sequentially advanced step by step throughout the eight escape path steps as taught to withdraw the manipulator arm.

ON-LINE CONTROL APPARATUS (CONTINUED)

Considering now the details of the timing control stage 512, the arithmetic unit 518 and the processor program memory stage 516 and referring to FIG. 16, the clock stage 650 generates the W$\phi_0$ clock signal. The W$\phi_0$ signal is connected to drive a program address counter 652 of the timing control stage 512. The counter 652 is arranged to divide the W$\phi_0$ signal by 32. The W1 through W5 program address timing signals are connected to the divide by 2, 4, 8, 16 and 32 outputs of the program address counter 652. A phase generator 654 of the timing control stage 512 is connected to the W$\phi_0$ output of the clock 650 and generates a $\phi_0$ phase clock signal and a $\phi_1$ phase clock signal. The $\phi_0$ and $\phi_1$ phase signals are each generated once each period of the W$\phi_0$ clock signal and in alternating phase relationships. The $\phi_0$ and $\phi_1$ signals are connected to the processor program memory stage 516 as timing signals to allow the processor program memory stage 516 to output two different 16 bit control words to the arithmetic unit 518 within the time duration of each of the 32 program steps.

The processor program memory stage 516 includes a program memory 660 addressed by the mode address bus 522 and the program interval timing signals W1 through W5 as explained hereinbefore. The program memory 660 in a preferred embodiment is a programmable read only memory (PROM) of the type for example including 512 address locations each of which has associated therewith 16 bits of data representing a 16 bit control word. Thus the 8 bit program memory address, including the three bit mode address bus 522 and the 5 bit W1 through W5 address bus defines a particular 16-bit control word location of the 512 address locations in the program memory 660. The particular 16-bit control word that is addressed is outputted on the data bus 662 on 16 respective data lines. The data output bus 662 of the program memory 660 is connected to an instruction decoder stage 664. The instruction decoder stage 664 includes the $\phi_0$ and $\phi_1$ phase clock signals to modify the data state of a predetermined number of the 16 data lines at 662 or the pass the 16 data lines at 662 unchanged. Thus, the instruction decoder stage 664 provides two control words at data bus 520 under the selective control of the $\phi_1$ and $\phi_0$ phase clock signals when two operations are to be performed by the arithmetic unit for a particular address location.

In a specific embodiment, the instruction decoder stage 664 is implemented by a number of logic gates connected to predetermined data lines of the 16 bit output 662 to invert the logic states on the predetermined data lines during the $\phi_0$ program interval versus the $\phi_1$ program intervals.

The arithmetic unit 518 is programmed by the 16 bit control word on the data control bus 520 and the data on the bus 538 to perform a particular arithmetic operation. The data format of the arithmetic unit 518 includes a random access data memory 666 that is utilized for the storage of the data utilized during the calculations performed by the arithmetic unit 518.

Referring to TABLE II, the 16 bit control word data format controls the mode of operation of the random access data memory 666 in the control word bit positions 4 and 5. Thus the 4 and 5 data lines of the control word bus 520 are connected to the control inputs of the random access memory. The digital state of the control word in bit position 4 is an enable control and the bit position 5 controls the read/write mode of the random access memory 666. The memory locations of the random access data memory 666 are addressed by the 1, 2 and 3 bit positions of the control word on the data bus 520 as indicated in TABLE II. The random access data memory 666 is capable of storing at least 16 bits of data (16 bit wide format) at 64 separate address locations. Additional addressing of the memory locations of the random access data memory 666 is provided by the GC0-GC2 multiplex scan coded lines to address a specific memory location for each of the multiplex scan intervals G2 through G8. Thus, a total of six address bits are used for addressing 64 address locations of the random access data memory 666. Each of the 64 address locations of the random access data memory 666 includes 16 bits of data defining a total 64×16 data format.

Thus, while calculations are performed by the arithmetic unit 518 for each axis during each respective scan interval,

TABLE II

CONTROL WORD DATA FORMAT

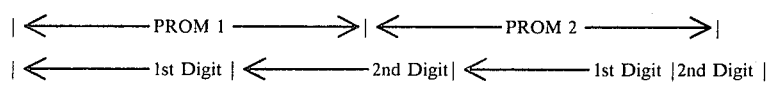

TABLE II-continued
CONTROL WORD DATA FORMAT

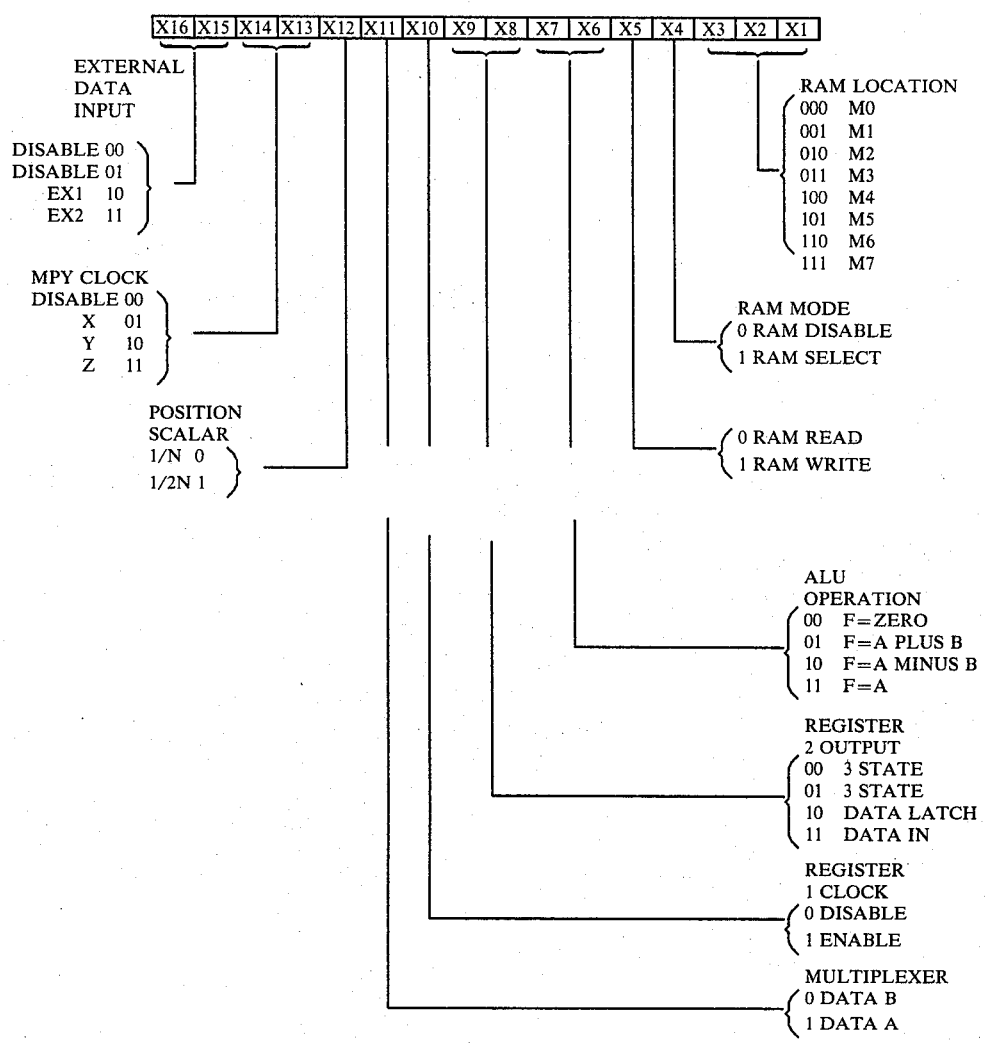

the random access data memory 666 writes in and reads out data under the control of the six address bits.

The arithmetic unit 518 includes a 16 bit by 16 bit digital multiplier 668. A 16 bit X data input 670 of the multiplier 668 is connected to the output of an arithmetic logic unit (ALU) 672. The arithmetic logic unit (ALU) 672 performs digital addition and subtraction functions as well as other combinational arithmetic functions. A 16 bit Y data input of the multiplier 668 is connected to a digital data output bus 667 of the random access data memory stage 666. The data output of the multiplier 668 referred to at Z, the result of the XY digital multiplication of the X and Y inputs, is connected to a position scaler or divider stage 674.

The multiplier 668, referring to TABLE II, is controlled by the two data bit positions 13 and 14 of the control word format as shown to selectively disable the multiplier and to control the X, Y and Z input/output functions.

The external data bus EXT B, representing the interpolation number m or the Kv constant, is connected to the data output bus 667 of the random access data memory 666. The $ED_n$ bi-directional, three state data bus is connected to the data input of the random access data memory 666. The data output bus 667 of the random access data memory 666 is also connected to an A data input of the arithmetic logic unit (ALU) 672 and to the data input of a data register #1 675. The output 677 of the data register #1 675 is connected to a B data input of the arithmetic logic unit (ALU) 672. The data output 670 of the arithmetic logic unit is also connected to an A data input of a data multiplexer stage 676. A B data input of the data multiplexer stage 676 is connected to the data output 678 of the position scaler stage 674. The data output 680 of the data multiplexer stage 676 is connected to the data input of a register #2 stage 682. The output of the register #2 stage 682 is connected to the bi-directional, three state data bus $ED_n$.

The bi-directional nature of the $ED_n$ bus, as discussed hereinbefore, is utilized to select data either from the $ED_n$ output of the data selector stage 510 or the data selector stage 506 (FIG. 15). The main modes of the $ED_n$ data bus includes: (1) the transfer of data into the arithmetic unit 518 and the comparator 564 as one state; (2) the transfer of data (position, velocity and acceleration commands) from the arithmetic unit 518 out to the comparator 564 and the velocity/acceleration command stage 582 as the second state; and (3) internal data transmission in the arithmetic unit 518. In addition and as discussed hereinbefore, the various timing signals as shown in FIG. 17 multiplex the data on the $ED_n$ bus in all modes and directions. Referring again to TABLE II and the data format of the 16 bit control word, the operation of the arithmetic logic unit (ALU) 672 is controlled by the two data bit positions 7 and 6. For example, a "01" command in the 7 and 6 positions respectively controls the ALU 672 to add the A and B data inputs. A "1 0" command controls the ALU 672 to subtract the B data input from the A data input. A "1 1" command controls the ALU 672 to transfer the A data input to the ALU data output. Further, a "0 0" command forces a zero data output of the ALU.

The multiplexer 676 is controlled by the data bit position 11 of the control word. A "1" in the 11 data bit position controls the multiplexer 676 to supply the data at the data input A and a "0" controls the multiplexer 676 to supply the data at the data input B. The register #2 682 is controlled by the data bit positions 8 and 9. Data is latched upon a "01" command or a "11" command. Data is outputted to the bi-directional, three state data bus $ED_n$ when the data bit position 9 is a "1". Thus, previously latched data is outputted to the data bus $ED_n$ with a "10" command.

In one specific embodiment, the program memory stage 660 is implemented by two PROM logic devices arranged in parallel both as to data output and as to address control. The two PROM devices are referred to as PROM 1 and PROM 2, TABLE II. The PROM 1 outputs the data bit positions 9 through 16 of the control word and the PROM 2 outputs the 1 through 8 data bit positions. For the ease of programming and documentation purposes, the 1-4 data bit positions of the control word are referred to as the 2nd digit of the PROM 2 and the 5-9 data bit positions are referred to as the 1st digit of the PROM 2. Similarly, the 9-12 data bit positions of the control word are referred to as the 2nd digit of the PROM 1 and the 13-16 data bit positions are referred to as the 1st digit of the PROM 1.

Considering now the on-line operation of the arithmetic computer and processor unit 514 in more detail and referring to TABLE III, the symbology or abbreviations listed therein are utilized to define the operations performed by the arithmetic computer and processor unit 514 in response to the various control words. The symbols in TABLE III represent the operational logic elements of the arithmetic unit 518, the inputs and outputs of the operational logic elements, the data inputted to and outputted by the operational logic elements, and the arithmetic operations performed. For example, the Register #1 674 is identified by the symbol R and the Register #2 682 is identified by the symbol T.

The symbology of TABLE III is then utilized to represent the arithmetic operations performed by the arithmetic unit 518 in response to a particular 16 bit control word as an instruction set. Samples of various instruction sets and the corresponding operations performed by the arithmetic unit 518 are illustrated in TABLE IV. The column in TABLE IV labeled "Description" represents the operation performed in terms of the symbols of TABLE III. The column of TABLE IV labeled "Operation" is an explanation of the corresponding operation represented by the symbols in the "Description" column. The column in TABLE IV labeled "Mneumonic" is a program language representation of the corresponding symbols in the "Description" column.

The information in the TABLES III and IV is useful to explain the various operations which the arithmetic unit 518 is capable of performing and are also utilized to generate the control word programming to be stored in the program memory 660. The mneumonic program language representations are useful as a shorthand notation or code to aid a programmer or design engineer to write the 16 bit control words corresponding to the operation described in the mneumonic language and the symbolic description.

For example, referring now to TABLE V, typical arithmetic and data handling operations and the corresponding 16 bit control words are listed. The corresponding "Mneumonic" representation and "Description" representation as defined in TABLES III and IV are also listed alongside each corresponding control word. The 16 bit control word for each of the typical operations is fully listed in the "CONTROL WORD" portion of TABLE V. Further, a "CODED C.W." column lists a control word code for each corresponding 16 bit control word. The control word code is formed by listing a hexdecimal code digit for each of the 4 bit groups in the 16 bit control word; PROM 1-DIGIT-1, PROM 1-DIGIT-2, PROM 2-DIGIT 1, PROM 2-DIGIT 2 (TABLE II). For example the first control word in TABLE V MOV M, R, represents the transfer to the Register #1 of the data in the RAM (random access memory 666) location being addressed and is coded as 02 0M. The 02 0M 4 digit code represents the full 16 bit control word 0000 0010 0000 1MMM. The M code designation is an identifier to denote the address bits of the memory location of the random access data memory 666 corresponding to the M bits in the 1, 2 and 3 data bit positions. These 3 address location data bits define the particular data to be read out or written in. The M designation merely represents any of the eight data locations to be defined by the particular 3 bits.

Referring now to TABLE VI, there are listed therein six sequence programs or operation groups to be performed by the arithmetic unit 518. Each of the six sequence programs includes 32 control words listed sequentially. The 32 control words in each sequence programs are listed in the code control word (CODED C.W.) format. The 32 control words are identified in sequence by a hexdecimal coded address corresponding to the 32 sequential address locations in the program memory 660 for the particular program sequence selected. As discussed hereinbefore, the program sequence is addressed by the 3 bit mode address bus 522. The 32 sequential control word locations at the particular mode address are addressed by the W1-W5 program interval timing signals. The six sequence programs illustrated correspond to operational modes of the manipulator control apparatus: a teach initalize mode, TOP; a teach mode TEACH; a point-to-point or point-to-point controlled mode, PTP or PTPC; an end of interpolation step mode during the last interpolation interval, m=n case; a continuous path-constant velocity mode, CP(ACC=0); and a continuous path-constant acceleration mode, CP(ACC≠0).

The operations and coded control words listed in the sequence programs control the arithmetic unit 518 to perform the appropriate on-line computations to reconstruct the fixed path solution as precomputed in the off-line teaching mode by the off-line teach assist computer 34. The overall computations represented by the control words in TABLE II for the various sequence programs and corresponding operational modes implement the equations discussed hereinbefore and listed below for convenience.

MODE

PTP: POS = $\theta_n$

VEL = 0

ACC = 0

CP:

ACC = 0: POS = $\theta_{n-1} + \dfrac{\theta_n - \theta_{n-1}}{N} \times m$

VEL = $\dfrac{\Delta \theta \times K_v \times 64}{N}$

ACC = 0

$\Delta \theta = \theta_n - \theta_{n-1}$

CP:

ACC ≠ 0: $\theta$; POS = $\theta_{n-1} +$ $\tfrac{1}{2}(\dot\theta_m + \dot\theta_{n-1}) \dfrac{(m)}{(N)} \dfrac{(l)}{(K_v)} \dfrac{(N)}{(64)}$ $\dot\theta_{NEW}$; VEL = $\dfrac{2\Delta \theta K_v 64}{N} - \dot\theta_{OLD}$ $\dot\theta$; VEL = $\dot\theta_{n-1} + \dfrac{m}{N}(\dot\theta_n - \dot\theta_{n-1}) = \dot\theta_m$ $\ddot\theta$; ACC = $\dfrac{\Delta \dot\theta K_v 64}{N}$ where
$\Delta \dot\theta = \dot\theta_n - \dot\theta_{n-1}$
$m$ = interp. count
$N$ = the number of interpolation intervals in the steps $\dot\theta = \Delta \theta/64$ LSD conveyor change $K_v = \dfrac{\text{number of interpolation intervals/step}}{\text{number of conveyor LSD's/step}}$ $\theta_n$ = next position (next data $D_n$, the end of step $n$)
$\theta_{n-1}$ = previous position (previous data $D_{n-1}$, the end of step $n-1$)
$\dot\theta_{NEW} = \dot\theta_n$ = next velocity (end of step $n$)
$\dot\theta_{OLD} = \dot\theta_{n-1}$ = previous velocity (end of step $n-1$)
$\dot\theta_m$ = present velocity (commanded)
$n$ = present step identification The symbol $\theta_{n-1}$ in on-line operation is always utilized to refer to the previous position at the end of the last step data $D_{n-1}$. The symbol $\theta_n$ is utilized to refer to the precomputed position at the end of the present step data $D_n$ to which the manipulator arm is to be moved during the step n. This convention is utilized within the on-line computation and control unit 18 regardless of whether the step is a CP (ACC=0) or CP (ACC≠0) mode step.

ON-LINE PROGRAM OPERATION OF ARITHMETIC COMPUTER/PROCESSOR
TABLE III - INSTRUCTION SET
(Symbology)

| SYMBOLS | | |
|---|---|---|
| R | | Register #1 |
| T | | Register #2 (Temporary Reg.) OUTPUT enable |
| T* | | Register #2 (Temporary Reg.) OUTPUT disable |
| M | $\theta n$ | RAM Address 000 ;new position data (1, 2, 3) |
| | $\theta n-1$ | 001 ;previous position data |
| | $\dot\theta n$ | 010 ;new velocity command @ end point |
| | $\dot\theta n-1$ | 011 ;previous velocity command @ end point |
| | $\theta m$ | 100 ;updated position command |
| | $\dot\theta m$ | 101 ;updated velocity command |
| | $\Delta\theta$ | 110 ;position difference |
| | SCRATCH | 111 ;scratch pad use |
| N | | # of Interpolation intervals per current step/(externally programmed) |
| m* | | Interp. count (Input data) |
| Kv (1/Tr) | | Velocity constant (externally programmed) in binary 128 form |
| $\Delta\theta c$ | | # of Conveyor LSD change in the step |
| X | | Multiplier X input |
| Y | | Multiplier Y input |
| Z | | Multiplier Z output |
| D | | Data on DataBUS; ED$n$ |
| ( ) | | content of memory location, RAM, or Registers enclosed in the parentheses |
| ← | | "Is transferred to" |
| + | | Addition |
| − | | 2's complement subtraction |
| * | | Multiplication |
| ÷ | | Division |

RAM Addr. in HEX. - Decimal Form

| | M | (4 | 3 | 2 | 1) | 4 is RAM select bit |
|---|---|---|---|---|---|---|
| $\theta n$ | 8 | 1 | 0 | 0 | 0 | |
| $\theta n-1$ | 9 | 1 | 0 | 0 | 1 | |
| $\dot\theta n$ | A | 1 | 0 | 1 | 0 | |
| $\dot\theta n-1$ | B | 1 | 0 | 1 | 1 | |
| $\theta m$ | C | 1 | 1 | 0 | 0 | |
| $\dot\theta m$ | D | 1 | 1 | 0 | 1 | |
| $\Delta\theta$ | E | 1 | 1 | 1 | 0 | |
| SCRATCH | F | 1 | 1 | 1 | 1 | |

TABLE IV
SAMPLE INSTRUCTION AND CORRESPONDING OPERATION

| Data Transfer Group | | Operation |
|---|---|---|
| Mnemonic | Description | |
| MOV Mn,R | (R)←(Mn) | data in RM location n is transfered to Reg. #1. |
| MOV Mn,X | (X)←(Mn) | data in RAM location n is transfered to X input of MPY. |
| MOV Mn, T* | [T*]←(Mn) | data in RAM location n is transfered to Reg. #2 with output disable mode |
| MOV T,M | (Mn)←(T) | data in Reg. #2 is transfered to RAM location n. |
| Arithmetic Group | | |
| ZERO X | (X)←0 | set ZERO X input of multiplier |
| ZERO T* | (T*)←0 | set ZERO in Reg. #2 with output disable mode. |
| ADD M,X | (X)←(M) + (R) | Add RAM location to Reg. #1 and store the result to X input of multiplier |
| ADD M,T | (T)←(M) + (R) | Add RAM location to Reg. #1 and store the result to Reg. #2. |
| ADD M,T* | (T*)←(M) + (R) | Same as above but Reg. #2 is in output disable mode |
| SUB M,X | (X)←(M) − (R) | Subtract content of Reg. #1 from RAM location and store the results into X input of multiplier. |
| SUB M,T | (T)←(M) − (R) | Subtract content of Reg. #1 from RAM location and store results into Reg. #2. |
| SUB M,T* | (T*)←(M) − (R) | Same as above but Reg. #2 is in output disable mode |
| DIV N | (T*)←(X) * (Y) ÷ N | Output from the multiplier is divided by N and stored in Reg. #2. |
| DIV 2N | (T*)←(X) * (Y) ÷ 2N | Output from the multiplier is divided by 2N and stored in Reg. #2. |
| I/O Control Group | | |
| IN M | (Mn)←D | data on data bus is inputed to RAM location n. |
| YIN EX1 | (Y)←EX1 | data from External Device EX1 on External Bus is inputed to Y input of multiplier. |
| YIN EX2 | (Y)←EX2 | data from External Device EX2 on External Bus is inputed to Y input of multiplier. |
| OUT M | D←(Mn) | data in RAM location n is outputed to Data Bus |
| OUT ZERO | D←0 | ZERO is outputed to Data Bus |
| NOP | | NO Operation |
| NOPT | | No Operation but Reg #2 output is enable |
| Double Operation Instructions | | |
| IADD M,X | | Combination of Input instruction and arithmetic instruction |
| IADD M,T* | | |
| ISUB M,X | | |
| ISUB M,T* | | |
| IZERO M,X | | |
| IZERO M,T* | | |
| IPASS M,X | | |
| IPASS M,T* | | |
| TADD M,X | | Combination of move instructions and arithmetic instructions |
| TADD M,X | | |
| TSUB M,T | | |
| TSUB M,X | | |
| TSUB M,T | | |
| TZERO M,X | | |
| TZERO M,T | | |
| TPASS M,X | | |

TABLE V
TYPICAL OPERATIONS

| | | | | | | | | | | | | | | 1 | 0 | 0 | 0 | 0 | | |
| | | | | | | | | | | | | | | 8 | 4 | 2 | 1 | | CODED C.W. | |
| Mnemonic | Description | $X_{16}$ | $X_{15}$ | $X_{14}$ | $X_{13}$ | $X_{12}$ | $X_{11}$ | $X_{10}$ | $X_9$ | $X_8$ | $X_7$ | $X_6$ | $X_5$ | $X_4$ | $X_3$ | $X_2$ | $X_1$ | PROM 1 | PROM 2 |
|---|---|---|---|---|---|---|---|---|---|---|---|---|---|---|---|---|---|---|---|
| MOV M,R | (R)→(M) | 0 | 0 | 0 | 0 | 0 | 0 | 0 | 0 | 0 | 0 | 0 | 0 | 1 | M | M | M | 02 | 0M̄ |
| MOV M,X | (X)→(M) | 0 | 0 | 0 | 0 | 0 | 0 | 0 | 0 | 0 | 1 | 1 | 0 | 1 | M | M | M | 10 | 6M̄ |
| MOV M,T* | (T*)→(M) | 0 | 0 | 0 | 0 | 0 | 0 | 0 | 0 | 0 | 1 | 1 | 0 | 1 | M | M | M | 00 | EM̄ |
| MOV T,M | (M)→(T) | 0 | 0 | 0 | 0 | 0 | 0 | 0 | 0 | 0 | 0 | 0 | 0 | 1 | M | M | M | 01 | 1M̄ |
| ZERO X | (X)→0 | 0 | 0 | 0 | 0 | 0 | 0 | 0 | 0 | 0 | 1 | 0 | 0 | 1 | 0 | 0 | 0 | 10 | 08 |
| ZERO T* | (T*)→0 | 0 | 0 | 0 | 0 | 0 | 0 | 0 | 0 | 1 | 0 | 0 | 0 | 1 | 0 | 0 | 0 | 00 | 88 |
| ADD M,X | (X)→(M)+(R) | 0 | 0 | 0 | 0 | 0 | 0 | 0 | 0 | 1 | 1 | 1 | 0 | 1 | M | M | M | 10 | 2M̄ |
| ADD M,T | (T)→(M)+(R) | 0 | 0 | 0 | 0 | 0 | 0 | 0 | 0 | 1 | 0 | 1 | 0 | 1 | M | M | M | 01 | AM̄ |
| ADD M,T* | (T*)→(M)+(R) | 0 | 0 | 0 | 0 | 0 | 0 | 0 | 1 | 1 | 0 | 1 | 0 | 1 | M | M | M | 08 | AM̄ |
| SUB M,X | (X)→(M)−(R) | 0 | 0 | 0 | 0 | 0 | 0 | 0 | 1 | 0 | 1 | 1 | 0 | 1 | M | M | M | 10 | 4M̄ |
| SUB M,T | (T)→(M)−(R) | 0 | 0 | 0 | 0 | 0 | 0 | 0 | 1 | 0 | 0 | 1 | 0 | 1 | M | M | M | 01 | CM̄ |
| SUB M,T* | (T*)→(M)−(R) | 0 | 0 | 0 | 0 | 0 | 0 | 0 | 1 | 1 | 0 | 1 | 0 | 1 | M | M | M | 00 | CM̄ |
| DIV N | (T)→(X)*(Y)÷N 34-53 | 0 | 0 | 0 | 0 | 1 | 1 | 0 | 0 | 0 | 0 | 0 | 0 | 0 | M | M | M | 34 | 80 |
| DIV 2N | (T)→(X)*(Y)÷2N | 0 | 0 | 0 | 0 | 1 | 1 | 0 | 0 | 1 | 1 | 0 | 0 | 0 | 0 | 0 | 0 | 3C | 80 |
| YIN m* | (Y)→m* | 0 | 0 | 0 | 0 | 1 | 0 | 0 | 1 | 0 | 1 | 0 | 0 | 0 | 0 | 0 | 0 | A4 | 60 |
| YIN Kv | (Y)→Kv | 0 | 0 | 0 | 0 | 0 | 0 | 1 | 0 | 0 | 0 | 0 | 0 | 0 | 0 | 0 | 0 | E0 | 60 |
| YIN Δθc | (Y)→Δθc | 0 | 0 | 0 | 0 | 0 | 0 | 0 | 1 | 0 | 0 | 0 | 0 | 0 | 0 | 0 | 0 | 20 | 6E |
| IN M | (M)→D | 0 | 0 | 0 | 0 | 0 | 0 | 0 | 0 | 0 | 0 | 0 | 0 | 1 | M | M | M | 00 | 1M̄ |
| OUT M | D→(M) | 0 | 0 | 0 | 0 | 0 | 0 | 0 | 0 | 0 | 0 | 0 | 0 | 1 | M | M | M | 01 | EM̄ |
| OUT ZERO | D→0 | 0 | 0 | 0 | 0 | 0 | 0 | 0 | 0 | 0 | 0 | 0 | 0 | 1 | 0 | 0 | 0 | 01 | 88 |
| IADD M,X | (M)→D,(X)→(M)+(R) | 0 | 0 | 0 | 0 | 0 | 0 | 0 | 0 | 1 | 1 | 1 | 0 | 1 | M | M | M | 10 | 3M̄ |
| IADD M,T* | (M)→D,(T*)→(M)+(R) | 0 | 0 | 0 | 0 | 0 | 0 | 0 | 1 | 1 | 0 | 1 | 0 | 1 | M | M | M | 08 | BM̄ |
| ISUB M,X | (M)→D,(X)→(M)−(R) | 0 | 0 | 0 | 0 | 0 | 0 | 0 | 1 | 0 | 1 | 1 | 0 | 1 | M | M | M | 10 | 5M̄ |
| ISUB M,T* | (M)→D,(T*)→(M)−(R) | 0 | 0 | 0 | 0 | 0 | 0 | 0 | 1 | 1 | 0 | 1 | 0 | 1 | M | M | M | 00 | DM̄ |
| TADD M,X | (M)→(T),(X)→(M)+(R) | 0 | 0 | 0 | 0 | 0 | 0 | 0 | 0 | 1 | 1 | 1 | 0 | 1 | M | M | M | 11 | 3M̄ |
| TADD M,T | (M)→(T),(T)→(M)+(R) | 0 | 0 | 0 | 0 | 0 | 0 | 0 | 0 | 1 | 0 | 1 | 0 | 1 | M | M | M | 11 | BM̄ |
| TSUB M,X | (M)→(T),(X)→(M)−(R) | 0 | 0 | 0 | 0 | 0 | 0 | 0 | 1 | 0 | 1 | 1 | 0 | 1 | M | M | M | 11 | 5M̄ |
| TSUB M,T | (M)→(T),(T)→(M)−(R) | 0 | 0 | 0 | 0 | 0 | 0 | 0 | 1 | 0 | 0 | 1 | 0 | 1 | M | M | M | 01 | DM̄ |
| IZERO M,X | (M)→D,(X)→0 | 0 | 0 | 0 | 0 | 0 | 0 | 0 | 0 | 0 | 1 | 0 | 0 | 1 | M | M | M | 10 | 1M̄ |
| IZERO M,T* | (M)→D,(T*)→0 | 0 | 0 | 0 | 0 | 0 | 0 | 0 | 0 | 1 | 0 | 0 | 0 | 1 | M | M | M | 08 | 9M̄ |
| IPASS M,X | (M)→D,(X)→(M) | 0 | 0 | 0 | 0 | 0 | 0 | 0 | 0 | 0 | 1 | 1 | 0 | 0 | M | M | M | 00 | 7M̄ |
| IPASS M,T* | (M)→D,(T*)→(M) | 0 | 0 | 0 | 0 | 0 | 0 | 0 | 0 | 1 | 1 | 0 | 0 | 0 | M | M | M | 00 | FM̄ |
| TZERO M,X | (M)→(T),(X)→0 | 0 | 0 | 0 | 0 | 0 | 0 | 0 | 0 | 0 | 1 | 0 | 0 | 1 | M | M | M | 11 | 1M̄ |
| TZERO M,T | (M)→(T),(T)→0 | 0 | 0 | 0 | 0 | 0 | 0 | 0 | 0 | 0 | 0 | 0 | 0 | 1 | M | M | M | 01 | 9M̄ |
| TPASS M,X | (M)→(T),(X)→(M) | 0 | 0 | 0 | 0 | 0 | 0 | 0 | 0 | 0 | 1 | 1 | 0 | 0 | M | M | M | 11 | 7M̄ |
| NOP | NO OPERATION | 0 | 0 | 0 | 0 | 0 | 0 | 0 | 0 | 0 | 0 | 0 | 0 | 0 | 0 | 0 | 0 | 00 | 00 |
| NOPT | NO OPERATION, BUT (T) IS AVAILABLE | 0 | 0 | 0 | 0 | 0 | 0 | 0 | 0 | 0 | 0 | 0 | 0 | 0 | 0 | 0 | 0 | 01 | 00 |

TABLE VI

TOP MODE - TEACH - INITIALIZE

| ADDRESS | PROM 1 1D/2D | PROM 2 1D/2D | INSTRUCTION | COMMENTS |
|---|---|---|---|---|
| 00 | 00 | 00 | NOP | |
| 01 | 00 | 00 | NOP | |
| 02 | 00 | 00 | NOP | |
| 03 | 00 | 00 | NOP | |
| 04 | 00 | 00 | NOP | |
| 05 | 00 | 00 | NOP | |
| 06 | 00 | 00 | NOP | |
| 07 | 00 | 00 | NOP | |
| 08 | 00 | 00 | NOP | |
| 09 | 00 | 18 | IN, $\theta n$ | write Encoder into RAM |
| 0A | 00 | 88 | ZERO, T* | Set ZERO in Temp. (disable) |
| 0B | 01 | 00 | NOP T | SEND OUT (ACCL = 0) |
| 0C | 01 | 00 | NOP T | |
| 0D | 01 | 00 | NOP T | |
| 0E | 01 | 00 | NOP T | SEND OUT (VEL = 0) |
| 0F | 01 | 00 | NOP T | |
| 10 | 00 | 00 | NOP | |
| 11 | 00 | 00 | NOP | |
| 12 | 00 | 00 | NOP | |
| 13 | 00 | 00 | NOP | |
| 14 | 00 | 00 | NOP | |
| 15 | 01 | E8 | OUT, $\theta n$ | $\theta$new into Temp. |
| 16 | 01 | 00 | NOP T | |
| 17 | 01 | 00 | NOP T | SEND OUT (POS = ENCODER) |

TOP

| ADDRESS | PROM 1 | PROM 2 | INSTRUCTION | COMMENTS |
|---|---|---|---|---|
| 18 | 00 | 00 | NOP | |
| 19 | 00 | 00 | NOP | |
| 1A | 00 | 00 | NOP | |
| 1B | 00 | 00 | NOP | |
| 1C | 00 | 00 | NOP | |
| 1D | 00 | 00 | NOP | |
| 1E | 00 | 00 | NOP | |
| 1F | 00 | 00 | NOP | |

TEACH

| ADDRESS | PROM 1 | PROM 2 | INSTRUCTION | COMMENTS |
|---|---|---|---|---|
| 20 | 00 | 00 | NOP | |
| 21 | 00 | 00 | NOP | |
| 22 | 00 | 00 | NOP | |
| 23 | 00 | 00 | NOP | |
| 24 | 00 | 00 | NOP | |
| 25 | 00 | 00 | NOP | |
| 26 | 00 | 00 | NOP | |
| 27 | 00 | 00 | NOP | |
| 28 | 00 | 00 | NOP | |
| 29 | 00 | 00 | NOP | |
| 2A | 00 | 88 | ZERO, T* | Set ZERO in Temp. (output disable) |
| 2B | 01 | 00 | NOP, T | SEND OUT (ACCL = 0) |

TEACH MODE

| ADDRESS | PROM 1 | PROM 2 | INSTRUCTION | COMMENTS |
|---|---|---|---|---|
| 2C | 01 | 00 | NOP T | |
| 2D | 00 | 00 | NOP | |
| 2E | 01 | 00 | NOP T | SEND OUT (VEL = 0) |
| 2F | 01 | 00 | NOP T | |
| 30 | 00 | 00 | NOP | |
| 31 | 00 | 00 | NOP | |
| 32 | 00 | 00 | NOP | |
| 33 | 00 | 00 | NOP | |
| 34 | 00 | 00 | NOP | |
| 35 | 01 | E8 | OUT $\theta n$ | Transfer $\theta_{new}$ to Temp. |
| 36 | 01 | 00 | NOP T | SEND OUT (POS = $\theta \eta$ew) |
| 37 | 01 | 00 | NOP T | |
| 38 | 00 | 00 | NOP | |
| 39 | 00 | 00 | NOP | |
| 3A | 00 | 00 | NOP | |
| 3B | 00 | 00 | NOP | |
| 3C | 00 | 00 | NOP | |
| 3D | 00 | 00 | NOP | |
| 3E | 00 | 00 | NOP | |
| 3F | 00 | 00 | NOP | |

PTP or PTPc MODE

| ADDRESS | PROM 1 | PROM 2 | INSTRUCTION | COMMENTS |
|---|---|---|---|---|

TABLE VI-continued

TOP MODE - TEACH - INITIALIZE

| | | | | |
|---|---|---|---|---|
| 40 | 00 | 00 | NOP | |
| 41 | 00 | 00 | NOP | |
| 42 | 00 | 18 | IN, $\theta\eta$ | write data into $\theta\eta$ew |
| 43 | 00 | 00 | NOP | |
| 44 | 00 | 00 | NOP | |
| 45 | 00 | 00 | NOP | |
| 46 | 00 | 00 | NOP | |
| 47 | 00 | 00 | NOP | |
| 48 | 00 | 00 | NOP | |
| 49 | 00 | 00 | NOP | |
| 4A | 00 | 88 | ZERO, T* | Set ZERO in Temp. (disable) |
| 4B | 01 | 00 | NOP T | SEND OUT (ACCL = 0) |
| 4C | 01 | 00 | NOP T | |
| 4D | 00 | 00 | NOP | |
| 4E | 01 | 00 | NOP T | SEND OUT (VEL = 0) |
| 4F | 01 | 00 | NOP T | |
| 50 | 01 | 1B | MOV,T,$\theta\eta-1$ | Store 0 into $\dot{\theta}$ old |
| 51 | 00 | 00 | NOP | |
| 52 | 00 | 00 | NOP | |
| 53 | 00 | 00 | NOP | |
| 54 | 00 | 00 | NOP | |
| 55 | 01 | E8 | OUT, $\theta\eta$ | $\theta\eta$ew into Temp. |
| 56 | 01 | 00 | NOP T | SEND OUT (POS = $\theta\eta$ew) |
| 57 | 01 | 00 | NOP T | |

PTP or PTPC

| ADDRESS | PROM 1 | PROM 2 | INSTRUCTION | COMMENTS |
|---|---|---|---|---|
| 58 | 00 | 00 | NOP | |
| 59 | 00 | 00 | NOP | |
| 5A | 00 | 00 | NOP | |
| 5B | 01 | 00 | NOP T | |
| 5C | 01 | 19 | MOV,T,$\theta\eta-1$ | Store $\theta\eta$ew into $\theta$old |
| 5D | 00 | 00 | NOP | |
| 5E | 00 | 00 | NOP | |
| 5F | 00 | 00 | NOP | | m = n CASE

| | | | | |
|---|---|---|---|---|
| 60 | 00 | 00 | NOP | |
| 61 | 00 | 00 | NOP | |
| 62 | 00 | 00 | NOP | |
| 63 | 00 | 00 | NOP | |
| 64 | 00 | 00 | NOP | |
| 65 | 00 | 00 | NOP | |
| 66 | 00 | 00 | NOP | |
| 67 | 00 | 00 | NOP | |
| 68 | 00 | 00 | NOP | |
| 69 | 00 | 00 | NOP | |
| 6A | 00 | 00 | NOP | |
| 6B | 00 | 00 | NOP | |
| 6C | 00 | 00 | NOP | | m = n case

| ADDRESS | PROM 1 | PROM 2 | INSTRUCTION | COMMENTS |
|---|---|---|---|---|
| 6D | 00 | 00 | NOP | |
| 6E | 00 | 00 | NOP | |
| 6F | 00 | 00 | NOP | |
| 70 | 00 | 00 | NOP | |
| 71 | 00 | 00 | NOP | |
| 72 | 00 | 00 | NOP | |
| 73 | 00 | 00 | NOP | |
| 74 | 00 | 00 | NOP | |
| 75 | 00 | 00 | NOP | |
| 76 | 00 | 00 | NOP | |
| 77 | 00 | 00 | NOP | |
| 78 | 00 | 00 | NOP | |
| 79 | 00 | 00 | NOP | |
| 7A | 00 | 00 | NOP | |
| 7B | 01 | E8 | OUT $\theta\eta$ | $\theta\eta$ew into Temp. |
| 7C | 01 | 19 | MOV,T,$\theta\eta-1$ | Transfer to RAM $\theta$ old |
| 7D | 01 | EA | OUT, $\dot{\theta}\eta$ | $\dot{\theta}\eta$ew into Temp. |
| 7E | 01 | 1B | MOV,T,$\dot{\theta}\eta-1$ | Transfer to RAM $\dot{\theta}$ old |
| 7F | 00 | 00 | NOP | |

CP (ACC= 0) Mode

| ADDRESS | PROM 1 | PROM 2 | INSTRUCTION | COMMENTS |
|---|---|---|---|---|
| 80 | 02 | 09 | MOV,$\theta\eta-1$,R | read $\theta$old from RAM to Reg #1 |
| 81 | E0 | 60 | YIN, $K_v$ | Set $K_v$ into MPY |
| 82 | 00 | 18 | IN, $\theta\eta$ | write data into RAM $\theta$new |
| 83 | 01 | C8 | SUB,$\theta\eta$,T | Get $\Delta\theta$ into Temp. |
| 84 | 01 | 1E | MOV T, $\Delta\theta$ | Temp. $\rightarrow\Delta\theta$ (RAM) |
| 85 | 10 | 6E | MOV $\Delta\theta$,X | $\Delta\theta$ into X |

TABLE VI-continued

TOP MODE - TEACH - INITIALIZE

| | | | | |
|---|---|---|---|---|
| 86 | 3C | 80 | DIV 2 N | |
| 87 | 01 | 1A | MOV,T,$\theta\eta$ | Transfer Temp to $\theta$new |
| 88 | 00 | 00 | NOP | |
| 89 | 00 | 00 | NOP | |
| 8A | 00 | 88 | ZERO,T* | |
| 8B | 01 | 00 | NOP T | SEND OUT (ACCL = 0) |
| 8C | 01 | 00 | NOP T | |
| 8D | 01 | EA | OUT,$\theta\eta$ | Get $\theta$new on BUS |
| 8E | 01 | 00 | NOP T | SEND VEL = $\theta$new |
| 8F | 00 | 00 | NOP | |
| 90 | A4 | 60 | YIN, m* | Get m* into Multiplier |
| 91 | 34 | 80 | DIV, N | $\Delta\theta$xM/N into Temp = $\theta$m |
| 92 | 01 | BF | TADD,Scratch,T | ($\Delta\theta$xM/N) + $\theta$old → T |
| 93 | 01 | 1C | MOV T, $\theta$m | T→$\theta$m = ($\Delta\theta$ × m/n) + $\theta$old |
| 94 | 00 | 00 | NOP | |
| 95 | 01 | 00 | NOP T | Enable Temp. |
| 96 | 01 | 00 | NOP T | SEND POS = $\theta$m |
| 97 | 00 | 00 | NOP | |

| ADDRESS | Prom 1 | PROM 2 | INSTRUCTION | COMMENTS |
|---|---|---|---|---|
| 98 | 00 | 00 | NOP | |
| 99 | 00 | 00 | NOP | |
| 9A | 00 | 00 | NOP | |
| 9B | 00 | 00 | NOP | |
| 9C | 00 | 00 | NOP | |
| 9D | 00 | 00 | NOP | |
| 9E | 00 | 00 | NOP | |
| 9F | 00 | 00 | NOP | |

CP (ACC≠0) Mode

| ADDRESS | PROM 1 | PROM 2 | INSTRUCTION | COMMENTS |
|---|---|---|---|---|
| A0 | 02 | 09 | MOV,$\theta$n−1,R | Read $\theta$old from RAM into Reg #1 |
| A1 | E0 | 60 | YIN, K$_v$ | Set K$_v$ into MPY |
| A2 | 00 | 18 | IN,$\theta$n | Write $\theta$new into RAM |
| A3 | 10 | 48 | SUB,$\theta$n,X | Get $\Delta\theta$ into X |
| A4 | 34 | 80 | DIV N | $\Delta\theta$x K$_v$/N into Temp. |
| A5 | 02 | 0B | MOV,$\theta$n−1,R | Move $\theta$old into Reg #1 |
| A6 | 01 | DF | TSUB,Scratch,T | $\Delta\theta$x K$_v$/N − $\theta$old into Temp = $\theta$new |
| A7 | 11 | 5A | TSUB,$\theta\eta$,X | Write into $\theta$new,−$\theta$old=$\Delta\theta$into X |
| A8 | 00 | 00 | NOP | |
| A9 | E0 | 60 | YIN, K$_v$ | Set K$_v$ into MPY |
| AA | 3C | 80 | DIV, 2N | Temp = $\ddot\theta$new = $\dfrac{\Delta\theta \times K_v}{2N}$ |
| AB | A5 | 60 | YIN,m*,T | Set m*, SEND ACCL = $\theta$new |

| ADDRESS | PROM 1 | PROM 2 | INSTRUCTION | COMMENTS |
|---|---|---|---|---|
| AC | 34 | 80 | DIV, N | Get $\Delta\theta$ × m*/N to Temp. |
| AD | 01 | BF | TADD ,Scratch,T | ($\Delta\theta$xm/N)+$\theta$old into Temp. |
| AE | 11 | 3D | TADD ,$\theta$m,X | Store $\theta$m into RAM, $\theta$m + 15 $\theta$old→ x,SEND VEL = $\theta$m |
| AF | A4 | 60 | YIN m* | Set m* |
| B0 | 34 | 80 | DIV N(Hardware) | ($\theta$m+$\theta$old)xm*/64→Temp. |
| B1 | 20 | 6E | YIN, $\Delta\theta$c | $\Delta\theta$c into Y |
| B2 | 11 | 7F | TPASS ,ScratchX | Temp → X |
| B3 | 02 | 09 | MOV,$\theta$n−1,R | Move $\theta$old to Reg #1 |
| B4 | 3C | 80 | DIV 2N | ($\theta$m+$\theta$old) × m*/64 × $\Delta\theta$c/2N → Temp |
| B5 | 01 | BF | TADD ,Scratch,T | ($\theta$m+$\theta$old) × m/64 × $\Delta\theta$c/2N + $\theta$old → Temp |
| B6 | 01 | 1C | MOV, T, $\theta$m | SEND POS and Store in $\theta$m |
| B7 | 00 | 00 | NOP | |
| B8 | 00 | 00 | NOP | |
| B9 | 00 | 00 | NOP | |
| BA | 00 | 00 | NOP | |
| BB | 00 | 00 | NOP | |
| BC | 00 | 00 | NOP | |
| BD | 00 | 00 | NOP | |
| BE | 00 | 00 | NOP | |
| BF | 00 | 00 | NOP | |

The following integrated circuit devices have been found suitable in a specific implementation of the Arithmetic Unit 518 and the Processor Program Memory 516 and are given by way of example only and should not be interpreted in a limiting sense:

| | DEVICE TYPE | No. of Devices | MANUFACTURER |
|---|---|---|---|
| ALU 672 | 74181 | (four) | Texas Instruments |

| | DE-VICE TYPE | No. of De-vices | MANUFACTURER |
|---|---|---|---|
| Register #1 675 | 7475 | (four) | Texas Instruments |
| Multiplier 668 | MPY-16 | (one) | TRW |
| Position Scalar 674 | 8243 | (five) | Signetics |
| Multiplexer 676 | 74157 | (four) | Texas Instruments |
| Register #2 682 | 8212 | (two) | Intel |
| Random Access Data Memory 666 | N82S09 | (two) | Signetics |
| Program Memory 660 | 1702A | (two) | Intel |

ON-LINE CONTROL APPARATUS—STATIC WORKPIECE

Considering now the on-line control apparatus 14 for the static workpiece situation for operation in response to the stored program data in the memory 16 representing the precomputed fixed path in space and time as precomputed during the off-line teach phase, the on-line control apparatus 14 of FIG. 15 is modified by the CVTC advance signal to the interpolation counter 554 being connected to a fixed frequency clock source. The fixed frequency clock source generates an advance signal to the interpolation counter 554 at a rate equal to the basic time unit utilized in the teach-assist computer 34. For example, in the specific embodiment discussed, the basic time unit is 3.2618 milliseconds and thus the CVTC advance line receives an advance signal every 3.2618 milliseconds. In the preferred arrangement, the fixed frequency clock source for connection to the CVTC advance signal line is derived from the basic system clock signal of the system clock in the timing control stage 512. The conveyor sync control stage 560 is not utilized for the static workpiece operations and no conveyor encoder signal is provided by the encoder stage 500.

Thus, the on-line control apparatus 14 operates with advance signals on the CVTC signal line for a stationary workpiece situation in the same manner as regards system timing in the moving workpiece situation with a conveyor velocity of a fixed rate exactly equal to the projected rate. As discussed hereinbefore, the stored program data in the memory 16 includes a data signal corresponding to the number of basic time units for each program step representing the execution time as precomputed by the teach-assist computer in the off-line teaching phase. Referring to TABLE I, the basic time unit data is recorded in the GROUP 2 multiplex scan period in place of the conveyor data; no conveyor data being recorded for a static workpiece operation.

Further, programmed wait or delay steps can also be programmed during the off-line teaching phase by means of the GROUP 2 basic time unit data in terms of a predetermined number of the basic timing units.

ON-LINE COMPUTATIONS—GENERAL

The preferred embodiment of the present invention for both static and moving workpiece operations provides for predict-precomputation of the work operation during the off-line teaching phase as discussed hereinbefore. However, the present invention in an alternative on-line computation embodiment can be utilized to perform the precomputations for both static and moving workpiece operations in an on-line, real-time fashion in conjunction with the on-line control apparatus 14. In the alternative embodiments for on-line computation, the on-line control apparatus 14 is provided with an on-line computer to perform the necessary computations as will be discussed in more detail in the section entitled ON-LINE COMPUTATION CONTROL APPARATUS AND PROGRAM DATA MODIFICATION FOR WORKPIECE DEVIATIONS. The on-line computer is similar to the off-line teach-assist computer 34 in capabilities and operation. During the off-line teach phase, the static target points would be recorded.

However, it is considered advisable to precompute the dynamic parameters and the projected manipulator arm path data to ensure accuracy of path control, to ensure that the dynamic parameters are not exceeded and to ensure that collision avoidance is maintained.

However, as discussed hereinbefore, it is preferable, especially for the moving workpiece situation, to precompute projected manipulator arm trajectory and dynamic behavior during the off-line teaching phase and to store the precomputed path data for on-line use thereby avoiding the real-time, on-line compute burden and eliminating the necessity for an on-line computer with high speed capabilities and complex computer capabilities dedicated for each manipulator and operating continuously during work operations and in the work environment. The on-line computation requires the dedication of a powerful computer at each manipulator work station while the off-line computation approach utilizes a powerful computer only during the teaching phase and this teach-assist computer 34 can be utilized for teaching other manipulators and programs while previously taught manipulators perform their work operations.

Further, it is believed that more accurate path trajectory is obtained by precomputing the work operations during the off-line teach phase where time is not critical. Additionally, if precomputation is to be performed during the off-line teach phase to ensure proper operation of the program, it would be inefficient to discard this data and recompute the path on-line via a powerful on-line computer.

For on-line computation of the manipulator arm trajectory program data from the static data of the taught points, the arithmetic computer/processor 514 and the interpolation timing stage 530 would not be required if the on-line computer were provided with the capabilities performed by the arithmetic computer/processor 514 and the interpolation timing stage 530. Of course, this would increase the compute-time burden and complexities of the on-line computer even further. Depending on the speed of the on-line computer, a buffer/cueing arrangement may also be necessary as will be discussed in more detail hereinafter.

ON-LINE COMPUTATION CONTROL APPARATUS AND PROGRAM DATA MODIFICATION FOR WORKPIECE DEVIATIONS

Figure 22:
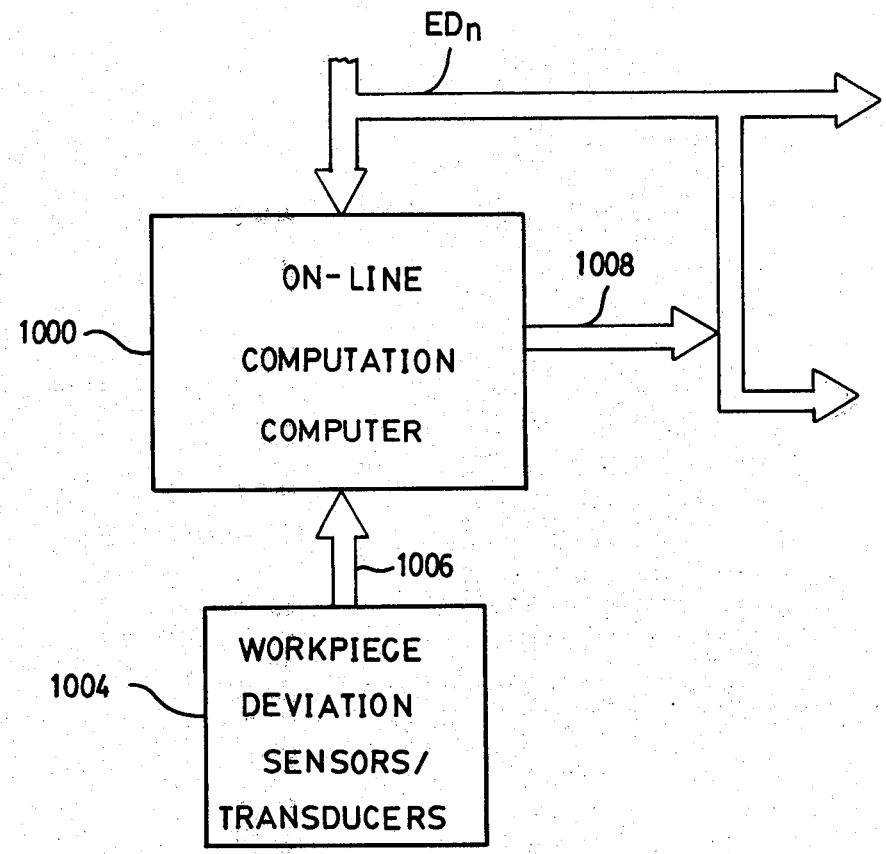
FIG. 22 is a logic and block diagram of portions of the control apparatus of the present invention of FIGS. 1, 15 and 16 illustrating an alternative embodiment.

Referring now to FIG. 22, the on-line control apparatus 14 is illustrated for the alternative on-line computation embodiment. The memory 16 of the on-line control apparatus of FIG. 15 is eliminated and an on-line computation computer 1000 is provided. The on-line computation computer 1000 is similar to the off-line teach-assist computer 34 in capabilities and operation. During the off-line teach phase, the static data is taught and recorded in the on-line computation computer 1000, for example as the $/T_N/C_V$ static data previously discussed in connection with the teach-assist computer 34.

In accordance with other aspects of the present invention, program data modification is performed in accordance with the deviations of the workpiece carried by the conveyor 12. A workpiece deviation sensor/transducer stage 1004 is provided to input deviation and modification data at 1006 to the on-line computation computer 1000. The on-line computation computer 1000 modifies the stored data in accordance with the deviations of the workpiece carried by the conveyor 12. Thus, all program steps of the program data are modified by the same modification data since the modification data is applicable to the overall work operation for the workpiece to which the modification data pertains. For example, the deviations of the workpiece represent ΔX, ΔY and ΔZ deviations or offsets with respect to the proper registration of the workpiece utilized in the off-line teaching phase to determine the target points of the work operation. Further, the deviation data could also represent program editing data corresponding to a workpiece geometry that is different from the workpiece with which the program data was taught and projected; e.g. a different style car body type B on the conveyor 12 with respect to a car body type A for which the program data was taught and projected during the off-line teaching phase.

The measurement of the deviation of the workpiece is accomplished by the workpiece deviation sensor/transducer stage 1004 prior to the time the workpiece reaches the manipulator work station and thus prior to the start of the program cycle work operation on the particular workpiece to which the modification data pertains. The on-line computation computer 1000 modifies the stored static taught program data from the memory 16 in accordance with the deviation and modification data at 1006 and outputs the modified data at 1008 to the $ED_n$ data bus.

The on-line control apparatus 14 functions in response to the on-line computation data including program modification data at 1008 in the same fashion as explained hereinbefore in connection with the program data read out from the memory 16. It should be understood that the modification data at 1006 does not represent any unprogrammed change of the conveyor 12 from the taught and projected program data since the on-line control apparatus 14 is arranged to control the manipulator in synchronization with the conveyor position. Instead, the modification data at 1006 represents the deviation or misregistration of the workpiece orientation with respect to the predetermined conveyor-workpiece reference axis including a fixturing shift of the workpiece in the direction of the conveyor reference axis that represents an offset of the workpiece position with respect to the conveyor encoder from the taught position of the workpiece relative to the conveyor encoder.

The on-line computation computer 1000 in one arrangement is capable of performing the required on-line computations including program data modifications on a step-by-step basis to output modified program step data to the on-line control apparatus 14 at a fast enough rate to keep pace with the minimum execution time of each program step in the work operation.

However, an on-line computer with the capability to perform the required predict computation at this rate may be quite expensive and burdensome for work operation where the minimum execution time of some program steps is less than 200 milliseconds.

Thus, in an alternate arrangement, the on-line computation computer 1000 is provided with buffer/cueing apparatus. The on-line computation computer 1000 is arranged to compute the on-line modified program data on a step-by-step basis as fast as the capabilities of the computer permit and the modified program step data is outputted at 1008 to the buffer/cueing apparatus as the data is generated by the computer 1000. The buffer/cueing apparatus then outputs the current modified program step data to the $ED_n$ data bus of the on-line control apparatus 14 as the data is required for the control of the current program step.

The on-line computation computer 1000 is also applicable to static workpiece applications to generate on-line program data to the on-line control apparatus 14 in accordance with the static predict computations discussed hereinbefore. Further, the program modification discussed hereinbefore for orientation deviations of a workpiece is also useful for static workpiece operation; e.g. a visual sensor provides deviation data for the next workpiece on which the repetitive work operation is to be performed.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a programmable manipulator provided with a manipulator arm which is movable in a plurality of axes, having means for developing position signals corresponding to the actual position of said arm in said plurality of axes and arranged adjacent a predetermined work path to perform a series of operations with respect to a workpiece moving along said work path, the combination of:

means for positioning said arm at different locations relative to a stationary workpiece during an initial teaching operation;

means for precomputing signals representing movement of said arm between said different locations relative to the workpiece accounting for projected workpiece movement and corresponding to movement at the maximum dynamic capabilities of said manipulator arm; and means for storing said precomputed signals for use as command signals in controlling movement of said arm in a playback cycle with a moving workpiece.

2. The combination of claim 1 further comprising means responsive to said command signals for controlling movement of said arm in correlation with a moving workpiece during a playback cycle.

3. The combination of claim 2 further comprising workpiece encoder means for developing position signals corresponding to workpiece movement along said predetermined work path.

4. The combination of claim 3 wherein said controlling means comprises:

arithmetic computation means for generating position, velocity and acceleration control signals in accordance with said command signals and a predetermined series of control words, each of said control words including a predetermined number of data bits to define operation of said arithmetic computation means; and means for generating said predetermined series of control words in a predetermined sequence.

5. The combination of claim 4 wherein said arithmetic computation means comprises means for generating a predetermined number of sequential position, velocity and acceleration control signals.

6. The combination of claim 5 wherein said command signals include an interpolation interval code to define a predetermined number of interpolation intervals, said controlling means further comprising means responsive to said interpolation interval code for generating an interpolation interval control signal.

7. The combination of claim 6 wherein said sequential control signal generating means is responsive to said interpolation interval control signal, said predetermined number of interpolation intervals defining said predetermined number of sequential control signals.

8. The combination of claim 7 wherein said sequential control signal generating means is responsive to two successive command signals, said predetermined number of sequential control signals representing movement of said manipulator arm between the manipulator arm positions represented by said two successive command signals.

9. The combination of claim 7 wherein each of said stored command signals includes a workpiece positional signal corresponding to projected workpiece movement.

10. The combination of claim 9 wherein said sequential control signal generating means generates an artificial workpiece position signal and control signals for each of said axes.

11. The combination of claim 10 wherein said controlling means further comprises means for detecting a predetermined state of equality between said positional signal generated by said workpiece encoder means and said artificial workpiece position signal.

12. The combination of claim 11 wherein said interpolation interval control signal generating means is responsive to said detecting means.

13. The combination of claim 12 wherein said interpolation interval control signal is a digital signal advanced by one digital data state upon each occurrence of equality between said workpiece encoder positional signal and said generated workpiece position control signal.

14. The combination of claim 4 wherein said command signals include mode data signals representing operational modes including an acceleration mode or a constant velocity mode, said controlling means further comprising means for decoding said mode data signals to generate an acceleration control output or a velocity control output.

15. The combination of claim 14 wherein said arithmetic computation means further comprises means for generating a predetermined number of sequential command signals representing acceleration of said manipulator arm in response to said acceleration control output and representing constant velocity of said manipulator arm in response to said velocity control output.

16. In a programmable manipulator apparatus for performing work operations with respect to a workpiece movable along a predetermined workpiece path, the programmable manipulator apparatus having a manipulator arm controllable in a plurality of manipulator axes and having stored therein a series of command signals, each of said command signals representing the projected position of said manipulator arm in said plurality of manipulator axes and a corresponding projected workpiece position, said projected manipulator arm position being calculated in a teaching phase in accordance with a predetermined projected workpiece velocity and a predetermined set of dynamic manipulator arm parameters including velocity and acceleration components, the combination of:

means for reading out said command signals in a predetermined manner;

means responsive to two successive command signals for generating a predetermined number of sequential position, velocity and acceleration control signals for each of said manipulator axes; and means responsive to said control signals for moving said manipulator arm to said projected position in accordance with movement of said workpiece.

17. The combination of claim 16 wherein said series of command signals represents a predetermined sequence of work operations with respect to a workpiece.

18. The combination of claim 16 wherein said control signals represent manipulator arm movement in said manipulator axes including constant acceleration portions and constant velocity portions.

19. The combination of claim 16 wherein said predetermined number of sequential control signals represent the projected dynamic manipulator arm movement between the positions represented by successive command signals with respect to the workpiece.

20. The combination of claim 16 wherein said control signal generating means comprises:

arithmetic computation means for generating position, velocity and acceleration control signals in accordance with said command signals and a predetermined series of control words, each of said control words including a predetermined number of data bits to define operation of said arithmetic computation means; and means for generating said predetermined series of control words in a predetermined sequence.

21. The combination of claim 20 wherein said command signals include an interpolation interval code to define a predetermined number of interpolation intervals, said control signal generating means further comprising means responsive to said interpolation interval code for generating an interpolation interval control signal.

22. The combination of claim 21 wherein said control signal generating means is responsive to said interpolation interval control signal, said predetermined number of interpolation intervals defining said predetermined number of sequential control signals.

23. The combination of claim 16 wherein said control signal generating means comprises means for calculating said velocity control signals from the projected manipulator arm position of said two successive command signals and means for calculating said acceleration control signals from the velocity at the projected manipulator arm positions corresponding to said two successive command signals.

24. The combination of claim 16 wherein said control signal generating means comprises means for calculating said position control signals from said velocity control signals and the projected manipulator arm position corresponding to one of said two successive command signals.

25. In a programmable manipulator provided with a manipulator arm which is movable in a plurality of axes, having encoder means for said axes operative to develop position signals corresponding to the actual position of said arm and being arranged adjacent a reference axis to perform a series of operations on a workpiece moving along said reference axis, the combination of:

means for positioning said arm during an initial teaching operation with a stationary workpiece to different positions corresponding to the desired operations of the manipulator relative to the stationary workpiece;

means for calculating signals representing positions of said arm accounting for projected workpiece movement and corresponding to movement of said arm between said taught positions at the maximum dynamic capabilities of said manipulator arm; and means for storing said calculated arm position signals for use as command signals in controlling movement of said arm in a playback cycle with a moving workpiece.

26. The combination of claim 25, which includes means responsive to said command signal for moving said arm to said different positions relative to a moving workpiece during a subsequent playback cycle, and means for adjusting said arm moving means for variations in the actual velocity of said moving workpiece from said predetermined velocity during said subsequent playback cycle.

27. The combination of claim 25 further comprising means responsive to said command signals for controlling movement of said arm in correlation with a moving workpiece during a playback cycle.

28. The combination of claim 27 further comprising workpiece encoder means for developing position signals corresponding to workpiece movement along said reference axis, said movement controlling means including means for dividing the resultant difference between successive stored command signals into a number of increments equal to a predetermined number of artificial command signals, means for multiplying each of said increments by a variable integer increasing by one with each successive one of said artificial command signals, and means for combining said series of multiplied increment products with the preceding stored command signal to produce said series of artificial command signals.

29. The combination of claim 28 wherein said stored command signals include a projected workpiece movement positional signal, said means for controlling movement of said arm further comprising means for comparing said position signals corresponding to workpiece movement with said artificial command signals, and said dividing means further comprising counter means responsive to said comparing means and advanced by the coincidence of said aritificial command signals and said position signals corresponding to workpiece movement for controlling the generation of successive artificial command signals.

30. The combination of claim 27 further comprising workpiece reference axis encoder means for developing position signals corresponding to workpiece movement along said reference axis, said stored command signals including a workpiece reference axis positional signal corresponding to projected workpiece movement, said movement controlling means including means for detecting a predetermined state of equality between said positional signals of said workpiece encoder means and said artificial workpiece reference axis command signals, and means controlled by said detecting means for generating a predetermined number of artificial command signals for controlling movement of said arm in correlation with said moving workpiece.

31. The combination of claim 30 wherein said artificial command signal generating means further comprises:

a multiplier responsive to a control input and arranged to multiply the resultant difference between successive command signals by a series of fractions according to said control input, the denominator of each of said fractions being equal to said predetermined number of artificial command signals, the numerator being a variable integer increasing by one with each successive one of said artificial command signals; and means for combining said series of products of multiplied difference signals and fractions with the preceding command signal to produce said series of artificial command signals, said control input being generated by said detecting means.

32. The combination of claim 27 further comprising workpiece reference axis encoder means for developing position signals corresponding to workpiece movement along said reference axis, said calculating means comprising means reponsive to said workpiece reference axis encoder means for calculating projected workpiece position signals for each of said initial teaching positions of said manipulator arm based on maximum projected workpiece movement and the maximum dynamic capabilities of the manipulator arm, and means for storing said projected workpiece position signals.

33. The combination of claim 25 wherein said calculating means further comprises:

means for converting said position signals corresponding to different angular positions of said arm in said plurality of axes for successive taught steps to Cartesian coordinates of the free end of said arm;

means for translating said resulting Cartesian coordinates to account for the projected movement of said workpiece in terms of positional displacement units along said reference axis during the projected elapsed time for said arm to traverse the distance between successive taught positions on said workpiece at the maximum dynamic capabilities of said arm; and means for reconverting said translated Cartesian coordinates into new position signals corresponding to different angular positions of said arm in said plurality of axes.

34. The combination of claim 33 wherein said translating means comprises:

means for determining the projected time interval $T_{1-2}$ for the arm to traverse the distance between successive taught points $P_{1s}$ and $P_{2s}$ on the stationary workpiece at a projected arm velocity of V, a projected arm acceleration $+a$ and a projected arm deceleration $-a$, and means for modifying the Cartesian coordinates of $P_{2s}$ by a quantity which is defined by a first factor equal to the accumulated program position, $\Sigma D_1$, up to program step 1 corresponding to $P_{1s}$ in terms of a number of basic displacement units of workpiece position and the distance $D_{1-2}$ traversed by the workpiece during movement of the arm between $P_{1s}$ and $P_{2s}$ in terms of a number of basic displacement units of workpiece position.

35. The combination of claim 34 wherein said determining means comprises:

means for calculating $T_1$, the time for the manipulator arm to accelerate at the rate $+a$ from the projected workpiece velocity Vc to the velocity $V_M$;

means for calculating $T_2$, the time for the manipulator arm to decelerate at the rate $-a$ from the velocity $V_M$ to the velocity Vc; and means for calculating $T_M$, the time for the manipulator arm to move the distance, $\Delta S_{1-2} - \frac{1}{2} V_M (T_1 + T_2)$, at the velocity $V_M$, where $\Delta S_{1-2}$ is the distance between the points $P_{1s}$ and $P_{2s}$.

36. The combination of claim 35 wherein said manipulator arm velocity $V_M$ is equal to the maximum manipulator arm velocity $V_{MAX}$ minus the projected workpiece velocity Vc.

37. The combination of claim 35 wherein said projected time interval $T_{1-2}$ is equal to the sum of the times $T_1$, $T_2$ and $T_M$.

38. The combination of claim 37 wherein said modifying means comprises means for calculating said distance $D_{1-2}$ on the basis of the time $T_{1-2}$ and the projected workpiece velocity $V_c$.

39. The combination of claim 34 wherein said determining means comprises:

means for calculating $T_{\theta n}$ for each of the manipulator axes, where $T_{\theta n}$ is the minimum projected time interval for each axis of the manipulator to accomplish the movement between $P_{1s}$ and $P_{2s}$; and means for comparing the T$\theta$n values for the manipulator axes and determining the greatest $T_{\theta n}$ to define $T_{1-2}$.

40. The combination of claim 25 which includes means responsive to said command signal for moving said arm to said desired location relative to a workpiece which is moving at a velocity which is different from said projected velocity during a subsequent playback cycle.

41. In a programmable manipulator provided with a manipulator arm which is movable in a plurality of axes, having means for developing position signals corresponding to the actual position of said arm in said plurality of axes and arranged adjacent a reference axis to perform a series of operations on a workpiece moving along said reference axis, the combination of:

means for positioning said arm at different locations relative to a stationary workpiece during an initial teaching operation;

means for converting said position signals correponding to different angular positions of said arm in said plurality of axes for successive taught steps into corresponding Cartesian coordinates; and means for translating said resulting Cartesian coordinates to account for the projected movement of said workpiece in terms of positional displacement units along said reference axis during the projected elapsed time for said arm to traverse the distance between successive taught positions on said workpiece at the maximum dynamic capabilities of said arm.

42. In a programmable manipulator provided with a manipulator arm which is movable in a plurality of axes, having means for developing position signals corresponding to the actual position of said arm in said plurality of axes, and arranged adjacent a reference axis to perform a series of operations on a workpiece moving along said reference axis, the combination of:

means for positioning said arm at different locations relative to a stationary workpiece during an initial teaching operation;

means for converting said position signals corresponding to different angular positions of said arm in said plurality of axes for successive taught steps into corresponding Cartesian coordinates;

means for calculating the time interval required for said arm to traverse the distance between successive taught positions when the workpiece is moving at a predetermined velocity and said arm is moving at the maximum dynamic capabilities; and means controlled by said calculating means for translating said resulting Cartesian coordinates to account for movement of said workpiece along said reference axis during said calculated time interval.

43. In a programmable manipulator provided with a manipulator arm which is movable in a plurality of axes, having means for developing position signals corresponding to the actual position of said arm in said plurality of axes and arranged adjacent a reference axis to perform a series of operations on a workpiece moving along said reference axis, the combination of:

means for positioning said arm at different locations relative to a stationary workpiece during an initial teaching operation;

means for converting said position signals corresponding to different angular positions of said arm in said plurality of axes for successive taught steps into corresponding Cartesian coordinates;

means for calculating the time interval required for said arm to traverse the distance between successive taught locations when said arm is moving at the maximum dynamic capabilities throughout said time interval and said workpiece is moving along said reference axis at a predetermined velocity; and means controlled by said calculating means for translating said resulting Cartesian coordinates to account for movement of said workpiece along said reference axis during said calculated time interval.

44. In a programmable manipulator provided with a manipulator arm which is movable in a plurality of axes, having means for developing position signals corresponding to the actual position of said arm in said plurality of axes and arranged adjacent a reference axis to perform a series of operations on a workpiece moving along said reference axis, the combination of:

means for positioning said arm at different locations relative to a stationary workpiece during an initial teaching operation;

means for converting said position signals corresponding to different angular positions of said arm in said plurality of axes for successive taught steps into corresponding Cartesian coordinates;

means for calculating the path of movement and the minimum time which are required for said arm when moving at predetermined dynamic parameters in order to position said arm at the taught location relative to the workpiece when the workpiece is moving at a predetermined velocity; and means controlled by said calculating means for translating said resulting Cartesian coordinates to values corresponding to said taught location relative to a moving workpiece.

45. The combination of claim 44 wherein said predetermined velocity of said workpiece is the maximum allowable velocity of said workpiece when said arm is moving at its maximum velocity.

46. The method of programming a manipulator to perform a series of operations on a workpiece while the workpiece is moving along a predetermined path, the manipulator having an arm which is movable in a plurality of axes and encoder means for said axes operative to develop position signals corresponding to the actual position of said arm, the method comprising the steps of:

moving said arm to different positions relative to a stationary workpiece during an initial teaching operation, said positions corresponding to desired operations of the manipulator relative to the stationary workpiece;

precomputing signals representing the path of said manipulator arm to move between successive taught positions in the minimum projected elapsed time and corresponding to positions of said arm accounting for projected workpiece movement; and storing said calculated signals for use in controlling movement of said arm during playback with a moving workpiece.

47. The method of claim 46 further comprising the step of selectively advancing the workpiece during the initial teaching operation to the approximate position corresponding to the position of the workpiece accounting for projected workpiece movement.

48. The method of programming a manipulator to perform a series of operations on a workpiece while the workpiece is moving along a predetermined path, the manipulator having an arm which is movable in a plurality of axes and means for said axes operative to develop position signals corresponding to the actual position of said arm, the method comprising the steps of:

moving said arm to different positions relative to a stationary workpiece during an initial teaching operation, said positions corresponding to desired operations of the manipulator relative to the stationary workpiece;

precomputing signals representing the path of said arm projected for playback operations of said series of operations with a moving conveyor, said signals representing the path of said arm calculated in terms of the maximum dynamic parameters of arm movement and accounting for projected workpiece movement; and storing said precomputed signals for use in controlling movement of said arm during playback with a moving workpiece.

49. In programmable manipulator apparatus for performing work operations with respect to a workpiece movable along a predetermined workpiece path, the programmable manipulator apparatus having a manipulator arm controllable in a plurality of manipulator axes and having stored therein a series of command signals, each of said command signals representing the projected dynamic manipulator parameters of said manipulator arm in said plurality of manipulator axes with respect to a corresponding projected workpiece position, said projected manipulator arm positions being calculated in a teaching phase in accordance with a predetermined projected workpiece velocity and a predetermined set of dynamic manipulator arm parameters including velocity and acceleration components, the combination of:

means for reading out said command signals in a predetermined manner;

means responsive to two successive command signals for generating a predetermined number of sequential positions, velocity and acceleration control signals for each of said manipulator axes; and means responsive to said control signals for moving said manipulator arm in accordance with movement of said workpiece.

50. In a programmable manipulator having a manipulator arm movable in a plurality of axes and arranged adjacent a predetermined work path to perform a series of work operations on a workpiece moving along said work path, the combination of:

means having stored therein a first series of program work operation command signals representing positions of said manipulator arm in said plurality of axes and a second series of track alarm command signals representing positions of said manipulator arm, each of said track alarm command signals representing a predetermined static point on the workpiece at corresponding workpiece positions;

means for detecting a predetermined improper operating mode of said manipulator arm with respect to said workpiece;

means for controlling the sequential read out of said first series of program work operations in accordance with movement of said workpiece;

means responsive to said first and second series of command signals for moving said manipulator arm to the positions represented by said command signals; and means responsive to said detecting means for controlling the read out of said second series of track alarm command signals.

51. In a programmable manipulator having a manipulator arm controllable in a plurality of axes and arranged adjacent a workpiece moving along a predetermined work path to perform a predetermined series of work operations on a workpiece moving along said work path, said manipulator arm including a work head for selective contact with said workpiece, the combination of:

means for positioning said arm at different positions relative to a stationary workpiece during an initial teaching operation;

means for calculating signals representing a predetermined change in orientation of said manipulator arm relative to the workpiece for work operations in contact with and tracking the workpiece movement, said predetermined change in orientation being calculated to change the orientation of said manipulator arm by said predetermined orientation change between the initial contact of said manipulator arm and the workpiece and the projected termination of the workpiece contact; and means for storing said calculated signals for use as command signals in controlling movement of said arm in a playback cycle to perform said predetermined series of work operations on the workpiece.

52. In a programmable manipulator having a manipulator arm movable in a plurality of axes and arranged adjacent a predetermined work path to perform a series of work operations on a workpiece moving along said work path, the combination of:

means having stored therein a first series of program work operation command signals representing positions of said manipulator arm in said plurality of axes and one or more series of escape path signals representing positions of said manipulator arm, each of said series of escape path command signals representing a series of manipulator arm positions to withdraw said manipulator arm away from said workpiece to a predetermined position;

means actuable by an operator for generating an escape mode signal;

means for controlling the sequential read out of said first series of program work operations in accordance with movement of said workpiece;

means responsive to said first series of command signals and said escape path command signals for moving said manipulator arm to the positions represented by said command signals; and means responsive to said escape mode generating means for controlling the read out of a predetermined one of said series of escape path command signals in accordance with the number of the work operation command signals at which said escape mode generating means is actuated.

53. In a programmable manipulator provided with a manipulator arm which is movable in a plurality of axes, the programmable manipulator having means for developing position signals corresponding to the actual position of said arm in said plurality of axes and the programmable manipulator being arranged adjacent a workpiece to perform a series of operations with respect to the workpiece during an operational playback work cycle while the workpiece is moving along a predetermined path, the combination of:

means for positioning said manipulator arm during an initial teaching operation to different locations relative to a stationary workpiece;

predict means for calculating signals representing the projected path of movement of said manipulator arm corresponding to movement of said arm between said initial teaching positions and accounting for projected playback workpiece movement without exceeding predetermined dynamic operating parameters for each of said axes of said manipulator arm, said predict means comprising means for determining the projected minimum execution time required in each of said axes for the manipulator arm to accomplish said projected path of movement between each of said initial teaching positions accounting for projected workpiece movement and without exceeding said predetermined dynamic parameters, and means for comparing said minimum projected execution times in each of said axes to determine the axis requiring the largest projected execution time for each movement between teaching positions, said predict means utilizing said largest execution time to determine said projected path of movement between each of said initial teaching positions; and means for storing said signals representing said projected path of movement for use as command signals in controlling movement of said manipulator arm in said operational playback work cycle.

54. In a programmable manipulator provided with a manipulator arm which is movable in a plurality of axes, the programmable manipulator having means for developing position signals corresponding to the actual position of said arm in said plurality of axes and the programmable manipulator being arranged adjacent a workpiece to perform a series of operations with respect to the workpiece during an operational playback work cycle while the workpiece is moving along a predetermined path, the combination of:

means for positioning said manipulator arm during an initial teaching operation to different locations relative to a stationary workpiece defining a predetermined playback work cycle;

predict means for calculating signals representing the projected path of movement of said manipulator arm corresponding to movement of said arm between said initial teaching positions and accounting for projected playback workpiece movement without exceeding predetermined dynamic operating parameters for each of said axes of said manipulator arm, said predict means comprising means for determining the limit axis for each movement of said manipulator arm between said successive teaching positions, said limit axis being defined as that axis requiring the greatest execution time during the projected path of movement of said manipulator arm between each of said successive initial teaching positions accounting for projected workpiece movement and without exceeding said predetermined dynamic parameters, said predict means utilizing each of said limit axis determinations to calculate said projected path of movement between each of said teaching positions to perform said projected playback work cycle in minimum projected execution time with respect to a workpiece moving at a projected velocity; and means for storing said signals representing said projected path of movement for use as command signals in controlling movement of said manipulator arm in said operational playback work cycle.

55. In a programmable manipulator provided with a manipulator arm which is movable in a plurality of axes, having means for developing position signals corresponding to the actual position of said arm in said plurality of axes and arranged adjacent to a workpiece to perform a series of operations with respect to the workpiece during an operational playback work cycle, the combination of:

means for positioning said arm at different locations relative to the workpiece during an initial teaching operation;

means for precomputing signals representing movement of said arm between said different locations relative to said workpiece corresponding to movement at the maximum dynamic capabilities of said manipulator arm; and means for storing said precomputed signals for use as command signals in controlling movement of said arm in a playback cycle.

56. The combination of claim 55 further comprising means responsive to said command signals for controlling movement of said arm during a playback cycle.

57. The combination of claim 56 wherein each of said command signals has associated therewith an execution time signal representing the execution time as a number of basic timing units that corresponds to the movement of said manipulator arm represented by said associated command signals.

58. The combination of claim 57 wherein said playback controlling means comprises playback timing means for generating playback timing signals at a predetermined rate corresponding to said basic timing units, said playback controlling means being responsive to said timing signals to control movement of said manipulator arm represented by said command signals at the execution time represented by said associated execution time signal.

59. The combination of claim 58 wherein said controlling means comprises:

arithmetic computation means for generating position, velocity and acceleration control signals in accordance with said command signals and a predetermined series of control words, each of said control words including a predetermined number of data bits to define operation of said arithmetic computation means; and means for generating said predetermined series of control words in a predetermined sequence.

60. The combination of claim 59 wherein said arithmetic computation means comprises means for generating a predetermined number of sequential position, velocity and acceleration control signals.

61. The combination of claim 60 wherein said command signals include an interpolation interval code to define a predetermined number of interpolation intervals, said controlling means further comprising means responsive to said interpolation interval code for generating an interpolation interval control signal.

62. The combination of claim 61 wherein said sequential control signal generating means is responsive to said interpolation interval control signal, said predetermined number of interpolation intervals defining said predetermined number of sequential control signals.

63. The combination of claim 62 wherein said sequential control signal generating means is responsive to two successive command signals, said predetermined number of sequential control signals representing movement of said manipulator arm between the manipulator arm positions represented by said two successive command signals.

64. The method of programming a manipulator to perform a series of operations on a workpiece, the manipulator having an arm which is movable in a plurality of axes and encoder means for said axes operative to develop position signals corresponding to the actual position of said arm, the method comprising the steps of:

moving said arm to different positions relative to the workpiece during an initial teaching operation, said positions corresponding to desired operations of the manipulator relative to the workpiece;

precomputing signals representing the path of said manipulator arm to move between successive taught positions in the minimum projected elapsed time; and storing said calculated signals for use in controlling movement of said arm during playback.

65. The method of programming a manipulator to perform a series of operations on a workpiece, the manipulator having an arm which is movable in a plurality of axes and means for said axes operative to develop position signals corresponding to the actual position of said arm, the method comprising the steps of:

moving said arm to different positions relative to the workpiece during an initial teaching operation, said positions corresponding to desired operations of the manipulator relative to the workpiece;

precomputing signals representing the path of said arm projected for playback operations of said series of operations, said signals representing the path of said arm calculated in terms of the maximum dynamic parameters of arm movement; and storing said precomputed signals for use in controlling movement of said arm during playback.

66. In programmable manipulator apparatus for performing work operations with respect to a workpiece, the programmable manipulator apparatus having a manipulator arm controllable in a plurality of manipulator axes and having stored therein a series of command signals, each of said command signals representing the projected dynamic manipulator parameters of said manipulator arm in said plurality of manipulator axes to accomplish said work operation, said projected manipulator arm positions being calculated in a teaching phase in accordance with a predetermined set of dynamic manipulator arm parameters including velocity and acceleration components, the combination of:

means for reading out said command signals in a predetermined manner;

means responsive to two successive command signals for generating a predetermined number of sequential position, velocity and acceleration control signals for each of said manipulator axes; and means responsive to said control signals for moving said manipulator arm in accordance with movement of said workpiece.

67. In a programmable manipulator provided with a manipulator arm which is movable in a plurality of axes, the programmable manipulator having means for developing position signals corresponding to the actual position of said arm in said plurality of axes and the programmable manipulator being arranged adjacent a workpiece to perform a series of operations with respect to the workpiece during an operational playback work cycle, the combination of:

means for positioning said manipulator arm during an initial teaching operation to different locations relative to a workpiece;

means for calculating signals representing the projected path of movement of said manipulator arm corresponding to movement of said arm between said initial teaching positions relative to the workpiece without exceeding predetermined dynamic operating parameters for each of said axes of said manipulator arm, said calculating means comprising means for determining the projected minimum execution time required in each of said axes for the manipulator arm to accomplish said projected path of movement between each of said initial teaching positions relative to the workpiece without exceeding said predetermined dynamic parameters, and means for comparing said minimum projected execution times in each of said axes for each of said movements between teaching positions to determine the axis requiring the largest projected execution time, said calculating means utilizing said largest execution time to determine said projected path of movement between each of said initial teaching positions; and means responsive to said signals representing said projected path of movement for use as command signals in controlling movement of said manipulator arm in said operational playback work cycle.

68. In a programmable manipulator provided with a manipulator arm which is movable in a plurality of axes, the programmable manipulator having means for developing position signals corresponding to the actual position of said arm in said plurality of axes and the programmable manipulator being arranged adjacent a workpiece to perform a series of operations with respect to the workpiece during an operational playback work cycle, the combination of:

means for positioning said manipulator arm during an initial teaching operation to different locations relative to the workpiece defining a predetermined playback work cycle;

means for calculating signals representing the projected path of movement of said manipulator arm corresponding to movement of said arm between said initial teaching positions without exceeding predetermined dynamic operating parameters for each of said axes of said manipulator arm, said calculating means comprising means for determining the limit axis for each movement of said manipulator arm between said successive teaching positions, said limit axis being defined as that axis requiring the greatest execution time during the projected path of movement of said manipulator arm between each of said successive initial teaching positions without exceeding said predetermined dynamic parameters, said calculating means utilizing each of said limit axis determinations to calculate said projected path of movement between each of said teaching positions to perform said projected playback work cycle in minimum projected execution time; and means responsive to said signals representing said projected path of movement for use as command signals in controlling movement of said manipulator arm in said operational playback work cycle.

69. The method of controlling a manipulator to perform a series of operations on a workpiece, the manipulator having an arm which is movable in a plurality of axes and encoder means for said axes operative to develop position signals corresponding to the actual position of said arm, the method comprising the steps of:

moving said arm to different positions relative to the workpiece during an initial teaching operation, said positions corresponding to desired operation of the manipulator relative to the workpiece;

determining the path of movement with respect to time of said manipulator arm corresponding to movement of said arm between successive taught positions in the minimum execution time for each movement of said arm between successive taught positions and without exceeding predetermined dynamic operating parameters for each of said axes of said manipulator arm, each of said minimum execution times being obtained by determining the minimum execution time required in each of said axes for the manipulator arm to accomplish movement between each of said successive taught positions without exceeding said predetermined dynamic parameters, and utilizing the largest axis execution time for said axes to determine the minimum execution time for each of said movements of said manipulator arm between said successive taught positions; and controlling movement of said manipulator arm to perform said derived operations of the manipulator arm relative to the workpiece in said minimum execution times in response to said determined path of movement.

70. The method of determining the minimum execution time for each movement of a manipulator arm of a manipulator between successive positions of the manipulator arm, the manipulator arm being movable in a plurality of axes and the manipulator having apparatus operative to develop position signals corresponding to the actual position of the arm, the method comprising:

determining the minimum execution time in each axis for the manipulator arm to move between each of said successive positions without exceeding predetermined dynamic operating parameters of the manipulator in each of the axes; and utilizing the largest execution time in said determining step to define the minimum execution time for the manipulator arm to move between each of said successive positions.

71. In a programmable manipulator provided with a manipulator arm which is movable in a plurality of axes, having means for developing position signals corresponding to the actual position of said arm in said plurality of axes and arranged adjacent a workpiece to perform a series of operations with respect to the workpiece during an operational playback work cycle, the combination of:

means for positioning said arm at different locations relative to the workpiece during an initial teaching operation representing taught arm positions with respect to the workpiece;

means for storing position signals during said initial teaching operation representing said taught arm positions;

workpiece deviation sensing means for generating deviation signals representing the deviation of the workpiece in a playback cycle with respect to a predetermined workpiece orientation in said initial teaching operation;

precomputing means responsive to said generated deviation signals and said stored position signals for generating precomputed command signals during said playback cycle representing positions of said arm accounting for projected workpiece movement and accounting for the deviations of the workpiece from the predetermined workpiece orientation during the teaching operations, said generated command signals representing movement of said arm between said taught positions at the maximum dynamic capabilities of said manipulator arm; and means responsive to said generated command signals for controlling movement of said manipulator arm during said playback cycle.

72. The combination of claim 71 wherein the workpiece moves along a predetermined work path during said playback work cycle.

73. The combination of claim 72 wherein said deviation signals represent the deviation of said workpiece in said playback work cycle with respect to the orientation of said workpiece about said work path, said deviation signals being equal for all of said taught arm positions.

74. The combination of claim 72 further comprising workpiece moving means for moving said workpiece along said work path and for orientating said workpiece along and with respect to said work path, said deviation signals representing incorrect registration of said workpiece with respect to said workpiece moving means and the deviation of said workpiece in directions orthogonal to said work path.

75. In a programmable manipulator provided with a manipulator arm which is movable in a plurality of axes, having means for developing position signals corresponding to the actual position of said arm in said plurality of axes and arranged adjacent a predetermined work path to perform a series of operations with respect to a workpiece moving along said work path, the combination of:

means for positioning said arm at different locations relative to a stationary workpiece during an initial teaching operation; and means for precomputing signals during said initial teaching operation representing movement of said arm between said different locations relative to the workpiece accounting for projected workpiece movement and corresponding to movement at the maximum dynamic capabilities of said manipulator arm.

76. In a programmable manipulator provided with a manipulator arm which is movable in a plurality of axes, having encoder means for said axes operative to develop position signals corresponding to the actual position of said arm and being arranged adjacent a reference axis to perform a series of operations on a workpiece moving along said reference axis, the combination of:

means for positioning said arm during an initial teaching operation with a stationary workpiece to different positions corresponding to the desired operations of the manipulator relative to the stationary workpiece;

means for calculating signals during said initial teaching operation representing positions of said arm accounting for projected workpiece movement and corresponding to movement of said arm between said taught positions at the maximum dynamic capabilities of said manipulator arm;

means for storing said position signals representing said taught arm positions; and means responsive to said stored signals for controlling movement of said arm in correlation with a moving workpiece during a playback cycle, said movement controlling means comprising means for generating signals during said playback cycle representing positions of said arm accounting for projected workpiece movement and corresponding to movement of said arm between said taught positions at the maximum dynamic capabilities of said manipulator arm.

77. The method of programming a manipulator to perform a series of operations on a workpiece while the workpiece is moving along a predetermined path, the manipulator having an arm which is movable in a plurality of axes and encoder means for said axes operative to develop position signals corresponding to the actual position of said arm, the method comprising the steps of:

moving said arm to different positions relative to a stationary workpiece during an initial teaching operation, said positions corresponding to desired operations of the manipulator relative to the stationary workpiece;

precomputing signals during said initial teaching operation representing the path of said manipulator arm to move between successive taught positions in the minimum projected elapsed time and corresponding to positions of said arm accounting for projected workpiece movement; and storing position signals representing said taught arm positions.

78. The method of claim 77 further comprising the step of selectively advancing the workpiece during the initial teaching operation to the approximate position corresponding to the position of the workpiece accounting for projected workpiece movement.

79. The method of claim 77 further comprising the step of generating signals during a playback cycle in response to said stored position signals and representing positions of said arm accounting for projected workpiece movement and corresponding to movement of said arm between said taught positions in the minimum projected elapsed time and at the maximum dynamic capabilities of said manipulator arm.

80. The method of claim 79 further comprising the step of controlling movement of said manipulator arm during the playback cycle in accordance with said generated signals and the position of the workpiece to perform said series of operations on the workpiece.

81. The method of programming a manipulator to perform a series of operations on a workpiece while the workpiece is moving along a predetermined path, the manipulator having an arm which is movable in a plurality of axes and means for said axes operative to develop position signals corresponding to the actual position of said arm, the method comprising the steps of:

moving said arm to different positions relative to a stationary workpiece during an initial teaching operation, said positions corresponding to desired operations of the manipulator relative to the stationary workpiece; and precomputing signals during said initial teaching operation representing the path of said arm projected for playback operations of said series of operations with a moving conveyor, said signals representing the path of said arm calculated in terms of the maximum dynamic parameters of arm movement and accounting for projected workpiece movement.

* * * * *